US011328538B2

(12) United States Patent
Covington et al.

(10) Patent No.: US 11,328,538 B2
(45) Date of Patent: May 10, 2022

(54) METHOD AND SYSTEM FOR ANNOTATING GRAPHS OF VEHICLE DATA

(71) Applicant: Snap-on Incorporated, Kenosha, WI (US)

(72) Inventors: Joshua C. Covington, San Juan Bautista, CA (US); Patrick S. Merg, Hollister, CA (US); Jacob G. Foreman, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 358 days.

(21) Appl. No.: 16/171,927

(22) Filed: Oct. 26, 2018

(65) Prior Publication Data

US 2020/0134934 A1 Apr. 30, 2020

(51) Int. Cl.
*G07C 5/00* (2006.01)
*G07C 5/08* (2006.01)
*G10L 15/26* (2006.01)

(52) U.S. Cl.
CPC ............. *G07C 5/002* (2013.01); *G07C 5/008* (2013.01); *G07C 5/0825* (2013.01); *G10L 15/26* (2013.01)

(58) Field of Classification Search
CPC ...... G07C 5/002; G07C 5/008; G07C 5/0825; G10L 15/26
See application file for complete search history.

(56) References Cited

U.S. PATENT DOCUMENTS

2004/0172177 A1* 9/2004 Nagai .................... G07C 5/085
701/33.4
2008/0236275 A1* 10/2008 Breed ................... B60N 2/2806
73/290 V (Continued)

FOREIGN PATENT DOCUMENTS

EP 2866230 A1 4/2015
GB 2521377 A 6/2015

OTHER PUBLICATIONS

"TouchScan / OBDwiz Professional Add-On." OCTech, TouchScan/OBDwiz, Mar. 23, 2016, www.obdsoftware.net/software/professionaladdon. (Year: 2016).*

(Continued)

*Primary Examiner* — Hunter B Lonsberry
*Assistant Examiner* — Elizabeth Yang
(74) *Attorney, Agent, or Firm* — McDonnell Boehnen Hulbert & Berghoff LLP

(57) ABSTRACT

An example method includes receiving, at a computing system, a first user input from a user interface during operation of a vehicle and responsive to receiving the first user input, determining a time of reception for the first user input. The method further includes receiving a first set of parameters from the vehicle that correspond to a first parameter identifier (PID). The method also includes determining a time of reception for each parameter, and based on the time of reception for the first user input and the time of reception for each parameter of the first set of parameters, determining a first temporal position for an indicator configured to represent the first user input on a graph of the parameters corresponding to the first PID. The method further includes displaying, on a display interface, the graph of the parameters corresponding to the first PID with the indicator in the first temporal position.

18 Claims, 21 Drawing Sheets

(56) References Cited

U.S. PATENT DOCUMENTS

| | | | |
|---|---|---|---|
| 2011/0227744 A1* | 9/2011 | Shibata | G07C 5/085 340/679 |
| 2013/0103253 A1* | 4/2013 | Thompson | G01M 15/05 701/32.9 |
| 2014/0277912 A1* | 9/2014 | Fish | G06F 3/048 701/31.4 |
| 2014/0277918 A1* | 9/2014 | Kim | G07C 5/008 701/31.5 |
| 2016/0080666 A1* | 3/2016 | Stuart | G01R 15/125 348/135 |
| 2016/0124605 A1 | 5/2016 | Covington | |
| 2019/0339697 A1* | 11/2019 | Kapuria | B60W 60/0053 |
| 2019/0385057 A1* | 12/2019 | Litichever | H04L 63/14 |
| 2020/0134933 A1 | 4/2020 | Covington et al. | |
| 2020/0168009 A1 | 5/2020 | Jingle et al. | |
| 2020/0219335 A1* | 7/2020 | Gintz | G07C 5/008 |

OTHER PUBLICATIONS

International Search Report and Written Opinion for corresponding PCT application No. PCT/US2019/057193, dated Feb. 5, 2020.

Auto Techcelerators, LLC; Test Drive CoPilot; downloaded from the World Wide Web at https://www.testdrivecopilot.com/ on Sep. 17, 2020.

Auto Techcelerators, LLC; Test Drive CoPilot Features list; downloaded from the World Wide Web at https://www.testdrivecopilot.com/features on Sep. 17, 2020.

Auto Techcelerators, LLC; Test Drive CoPilot Features list; downloaded from the World Wide Web at https://www.testdrivecopilot.com/FAQ on Sep. 17, 2020.

Auto Techcelerators, LLC; Test Drive Copilot Drive Report; downloaded from the World Wide Web at https://s3.amazonaws.com/kajabi-storefronts-production/sites/65478/themes/1499168/downloads/mO4kAZUQkXUpMth48igw_Test_Drive_Report_124546.pdf on Sep. 17, 2020.

* cited by examiner 71 72 73

PID1: 1 – FUEL SYSTEM STATUS
PID2: 2 – CALCULATED ENGINE LOAD
PID3: 3 – ENGINE COOLANT TEMPERATURE
PID4: 4 – SHORT TERM FUEL TRIM – BANK 1
PID5: 5 – LONG TERM FUEL TRIM – BANK 1
PID6: 6 – FUEL PRESSURE
PID7: 7 – INTAKE MANIFOLD ABSOLUTE PRESSURE
PID8: 8 – ENGINE RPM
PID9: 9 – VEHICLE SPEED
PID10: 10 – TIMING ADVANCE
PID11: 11 – INTAKE AIR TEMPERATURE
PID12: 12 – MAF AIR FLOW RATE
PID13: 13 – COMMANDED EGR
PID14: 14 – EGR ERROR
PID15: 15 – FUEL TANK LEVEL INPUT
PID16: 16 – RELATIVE THROTTLE POSITION
PID17: 17 – FUEL TYPE
PID18: 18 – EVAPORATOR SYSTEM VAPOR PRESSURE
PID19: 19 – MASS AIR FLOW SENSOR
PID20: 20 – INTAKE AIR TEMPERATURE SENSOR
PID21: 21 – FUEL INJECTION TIMING
PID22: 22 – ENGINE OIL TEMPERATURE
PID23: 23 – BOOST PRESSURE CONTROL
PID24: 24 – EXHAUST GAS RECIRCULATION TEMPERATURE
PID25: 25 – TURBOCHARGER RPM
PID26: 26 – WASTEGATE CONTROL
PID27: 27 – ENGINE RUN TIME
PID28: 28 - FUEL PRESSURE CONTROL SYSTEM
PID29: 29 – ENGINE PERCENT TORQUE DATA
PID30: 30 – INJECTION PRESSURE CONTROL SYSTEM
PID31: 31 – RESERVED
PID32: 32 – RESERVED

| PID | PID Parameter | Time | User Input |
|---|---|---|---|
| RPM | 2000 | 12:34:58.9 | None |
| RPM | 2010 | 12:34:59.0 | None |
| RPM | 2020 | 12:34:59.1 | None |
| RPM | 2300 | 12:34:59.2 | None |
| RPM | 2500 | 12:34:59.3 | None |
| RPM | 2500 | 12:34:59.4 | None |
| RPM | 2500 | 12:34:59.5 | None |
| RPM | 2800 | 12:34:59.6 | None |
| RPM | 2820 | 12:34:59.7 | None |
| RPM | 2010 | 12:34:59.8 | None |
| None | None | 12:34:59.8 | The car just hesitated going up a steep hill. |
| RPM | 1980 | 12:34:59.9 | None |
| RPM | 2200 | 12:35:00.0 | None |
| RPM | 2250 | 12:35:00.1 | None |
| RPM | 2300 | 12:35:00.2 | None |
| RPM | 2344 | 12:35:00.3 | None |

FIG. 17

METHOD AND SYSTEM FOR ANNOTATING GRAPHS OF VEHICLE DATA

BACKGROUND

Most vehicles are serviced at least once during their useful life. In many instances, a vehicle is serviced at a facility with professional mechanics (e.g., technicians), though in other instances, technicians and/or other individuals who are servicing the vehicle can do so at other locations, such as on a shoulder of a city street or highway. A technician may refer to a repair order including symptom data regarding a vehicle condition (e.g., a perceived malfunction) described by a vehicle owner. In some cases, the repair order is a paper repair order. In other cases, the symptom data of a repair order can be displayed by a display of a computing system.

A technician and/or other individual (hereafter, a user) can use any of a variety of computerized tools and/or non-computerized tools to service (e.g., repair) any of the wide variety of mechanical and/or electronic vehicle components on a vehicle. While servicing a vehicle, a user sometimes needs information for diagnosing and/or repairing the vehicle, and for post-repair activities performed to the repaired vehicle. For example, the user may use a computing system that obtains and displays parameter identifier (PID) parameters from the vehicle under service.

A computing system configured to display PID parameters typically includes a menu with several layers that a user must navigate to be able to display the PID parameters. For example, a computing system may require the user to enter a vehicle year on an initial menu layer, a vehicle make on another menu layer, a vehicle model on another menu layer, an engine identifier on another menu layer, a vehicle system on another menu layer, and a vehicle communication function, such as select PID, on yet another menu layer. In the event the computing system includes an option to display the repair order, the user may need to navigate back to the initial menu layer to be able to access an option to display the repair order on a display of the computing system or at least one subsequent menu to access that display option.

After navigating through menus to be able to display PID parameters from a vehicle, a user may drive the vehicle. In many instances, the user drives the vehicle alone. In order to safely drive the vehicle, a user is typically encouraged to keep his or her eyes on the road and environmental outside of and proximate to the vehicle instead of looking at a computing system that displays PID parameters. During the test drive, the user might notice undesirable operation by one or multiple systems of the vehicle. As such, there exists a need for a user to be able to mark moments during operation where the vehicle performed undesirably with respect to PID parameters captured by a computing system and to have the ability to return to these moments at a subsequent time and review operation of various systems of the vehicle during the same time frame. A computing system with an improved user interface for displaying PID parameters and reviewing operation of various systems is desirable.

OVERVIEW

Several example embodiments relate to annotating graphs of vehicle data with one or more inputs. During operation of a vehicle, a user operating the vehicle, or a passenger on or in the vehicle, might wish to mark particular moments when the vehicle is operating undesirably for subsequent review. In addition, it would be advantageous to enable the user to also provide additional commentary that describes context for each moment marked for subsequent review. Techniques presented herein can enable a user to provide user inputs, including comments, via a user interface of a computing system that can mark particular times during operation of a vehicle. Particularly, the computing system can then preserve inputs and context received from the user or other sources for later review.

The computing system may also determine and associate a time with each input received. In some instances, the time associated with an input may represent the time that the computing system received the input from the source, also described herein as a time of reception. In other instances, the time associated with the input may represent the time that the source obtained the input. For example, the time may specify when a sensor captured measurements of a system of the vehicle. In further examples, the computing system may associate a time range over which a source providing the input acquired the input.

In addition to receiving inputs from sources, the computing system can further obtain vehicle data parameters (VDP) that correspond to one or more associated parameter identifiers (PIDs) values from the vehicle and subsequently display graphs and other information that include indicators representative of the VDP. The graphs may also include other indicators, such as indicators, each of which represents an input received from a source (e.g., a sensor, a user interface). The various indicators may be displayed on one or more graphs in a temporal order that accurately reflects when the inputs and VDP occurred during operation of the vehicle. These VDP indicators as well as the indicators representing inputs are selectable enabling a user to view additional information upon selection of a given indicator. For example, a user may select an indicator that represents one or more images captured during a time range by a camera positioned within and/or on the vehicle. As a result of the selection, the computing system may cause the images to display for user review.

Within example implementations, the computing system may communicate with various sensors or other sources configured to measure aspects of vehicle systems during operation. Example sensors can include microphone(s), camera(s), thermal camera(s), and/or other types of sensors. In some cases, a sensor may begin capturing sensor data about a vehicle system upon being triggered by another source (e.g., the user, another sensor, the computing system). The different sensors and sources used may be part of the vehicle or physically separate and positioned by the user to obtain information during a test drive of the vehicle.

Viewed from one aspect, an example embodiment takes the form of a method comprising receiving, at a computing system, a first input from a first source during operation of a vehicle, and responsive to receiving the first input, determining a time of reception for the first input. The method may additionally include receiving, at the computing system, a first set of parameters from the vehicle, wherein the first set of parameters correspond to a first parameter identifier (PID), and responsive to receiving the first set of parameters, determining a time of reception for each parameter of the first set of parameters. The method may further include, based on the time of reception for the first input and the time of reception for each parameter of the first set of parameters, determining, by the computing system, a first temporal position for a first indicator configured to represent the first input on a graph of the first set of parameters corresponding to the first PID, and displaying, by the computing system on a display interface, the graph of the first set of parameters corresponding to the first PID with the first indicator in the first temporal position.

Viewed from another aspect, an example embodiment takes the form of a system comprising a display interface, one or more processors, a non-transitory computer readable medium, and program instructions stored on the non-transitory computer readable medium. The program instructions may be executable by the one or more processors to receive a first input from a first source during operation of a vehicle, and responsive to receiving the first input, determine a time of reception for the first input. The program instructions may be further executable by the one or more processors to receive a first set of parameters from the vehicle, wherein the first set of parameters correspond to a first parameter identifier (PID), and responsive to receiving the first set of parameters, determine a time of reception for each parameter of the first set of parameters. The program instructions may also be executable by the one or more processors to, based on the time of reception for the first input and the time of reception for each parameter of the first set of parameters, determine a first temporal position for a first indicator configured to represent the first input on a graph of the first set of parameters corresponding to the first PID. The program instructions may further be executable by the one or more processors to display, on a display interface, the graph of the first set of parameters corresponding to the first PID with the first indicator in the first temporal position.

Viewed from yet another aspect, an example embodiment takes the form of a non-transitory computer readable medium having stored therein instructions executable by one or more processors to cause a computing system to perform functions. The functions include receiving a first input from a first source during operation of a vehicle, and responsive to receiving the first input, determining a time of reception for the first input. The functions may also include receiving a first set of parameters from the vehicle, wherein the first set of parameters correspond to a first parameter identifier (PID), and responsive to receiving the first set of parameters, determining a time of reception for each parameter of the first set of parameters. The functions may also include, based on the time of reception for the first input and the time of reception for each parameter of the first set of parameters, determining a first temporal position for an indicator configured to represent the first input on a graph of the first set of parameters corresponding to the first PID. The functions may also include displaying, on a display interface, the graph of the first set of parameters corresponding to the first PID with the indicator in the first temporal position.

Viewed from another aspect, an example embodiment takes the form of a method comprising receiving, at a computing system from a first source operatively connected to the computing system, a first input captured by the first source during operation of a vehicle, wherein the first input corresponds to a particular system of the vehicle and responsive to receiving the first input, determining a first time range for the first input. The method additionally includes receiving, at the computing system from a second source operatively connected to the computing system, a second input captured by the second source during operation of the vehicle, wherein the second input corresponds to the particular system of the vehicle, and wherein the second source differs from the first source. The method includes responsive to receiving the second input, determining a second time range for the second input and receiving, at the computing system, a first set of parameters from the vehicle, wherein the first set of parameters correspond to a first parameter identifier (PID) associated with operation of the particular system of the vehicle during a third time range, and wherein the third time range comprises the first time range and the second time range. The method also includes determining a graph representing the first set of parameters corresponding to the first PID associated with operation of the particular system of the vehicle during the third time range and a set of indicators, wherein the set of indicators includes a first indicator that represents at least a portion of the first time range of the first input and a second indicator that represents at least a portion of the second time range of the second input. The method includes displaying, by the computing system on a display interface, the graph representing the first set of parameters corresponding to the first PID with the set of indicators.

Viewed from a further aspect, an example embodiment takes the form of a system. The system comprises a display interface and a computing system. The computing system is configured to receive, from a first source operatively connected to the computing system, a first input captured by the first source during operation of a vehicle, wherein the first input corresponds to a particular system of the vehicle. The computing system is further configured to determine a first time range for the first input responsive to receiving the first input and receive, from a second source operatively connected to the computing system, a second input captured by the second source during operation of the vehicle, wherein the second input corresponds to the particular system of the vehicle, and wherein the second source differs from the first source. The computing system is also configured to determine a second time range for the second input responsive to receiving the second input and receive a first set of parameters from the vehicle, wherein the first set of parameters correspond to a first parameter identifier (PID) associated with operation of the particular system of the vehicle during a third time range, and wherein the third time range comprises the first time range and the second time range. The computing system is also configured to determine a graph representing the first set of parameters corresponding to the first PID associated with operation of the particular system of the vehicle during the third time range and a set of indicators, wherein the set of indicators includes a first indicator that represents at least a portion of the first time range of the first input and a second indicator that represents at least a portion of the second time range of the second input. The computing system is further configured to display, on the display interface, the graph of the first set of parameters corresponding to the first PID with the first indicator and the second indicator.

Viewed from yet another aspect, an example embodiment takes the form of a non-transitory computer readable medium having stored therein instructions executable by one or more processors to cause a computing system to perform functions. The functions include receiving, from a first source, a first input captured by the first source during operation of a vehicle, wherein the first input corresponds to a particular system of the vehicle. The functions also include, responsive to receiving the first input, determining a first time range for the first input and receiving, from a second source, a second input captured by the second source during operation of the vehicle, wherein the second input corresponds to the particular system of the vehicle, and wherein the second source differs from the first source. The functions also include, responsive to receiving the second input, determining a second time range for the second input, and receiving a first set of parameters from the vehicle, wherein the first set of parameters correspond to a first parameter identifier (PID) associated with operation of the particular system of the vehicle during a third time range, and wherein the third time range comprises the first time range and the second time range. The functions also include determining a graph representing the first set of parameters corresponding to the first PID associated with operation of the particular system of the vehicle during the third time range and a set of indicators, wherein the set of indicators includes a first indicator that represents at least a portion of the first time range of the first input and a second indicator that represents at least a portion of the second time range of the second input. The functions further include displaying, on a display interface, the graph of the first set of parameters corresponding to the first PID with the first indicator and the second indicator.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 7 shows an example PID index.

FIG. 17 is a table depicting example data pertaining to test driving a vehicle.

DETAILED DESCRIPTION

I. Introduction

Figure 1:
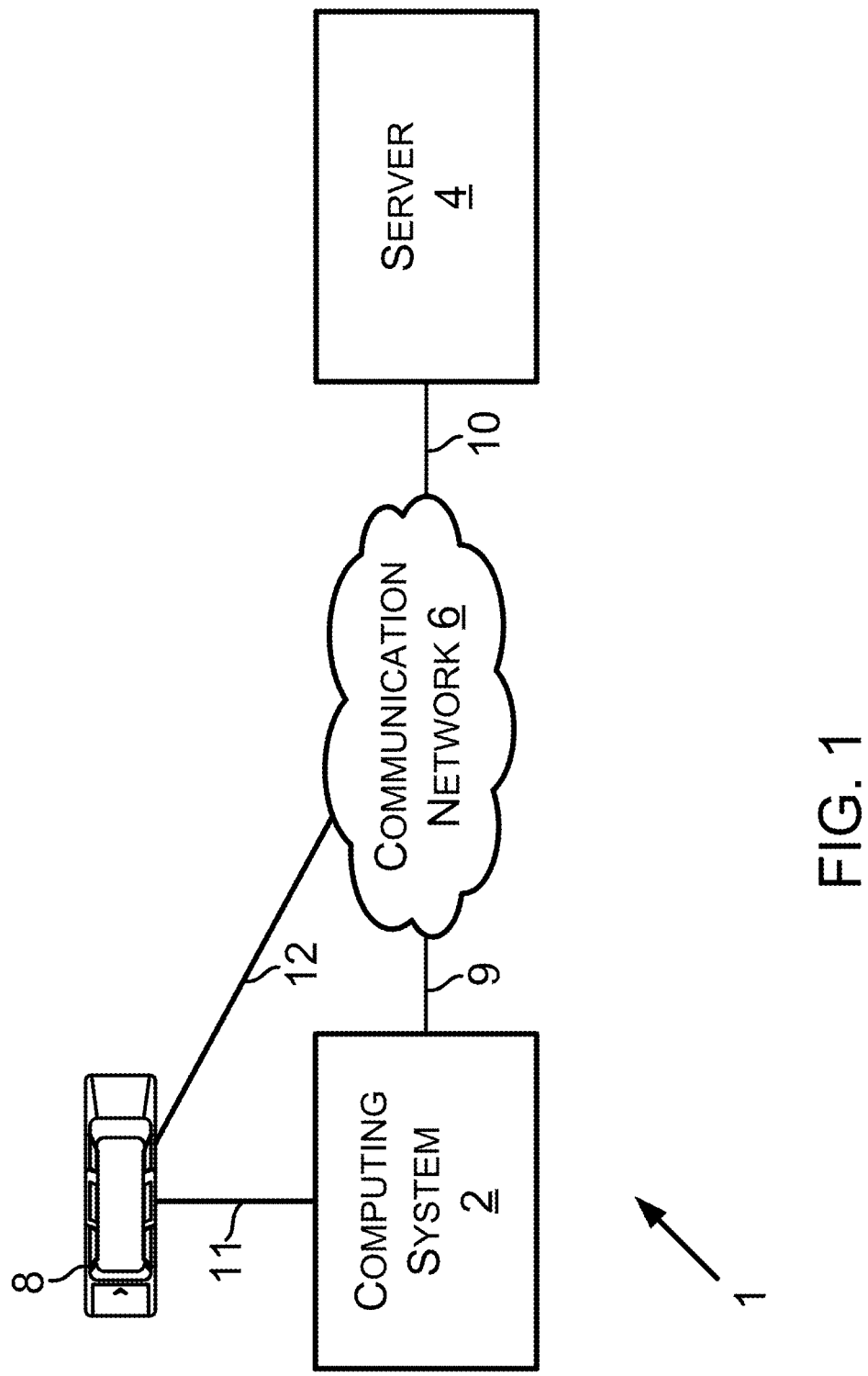
FIG. 1 is a diagram showing an example operating environment in which the example embodiments can operate.

This description describes several example embodiments including, but not limited to, example embodiments that pertain to annotating graphs of vehicle data with multiple inputs. When preparing to service a vehicle, a user may often drive the vehicle to gain an overall understanding of the current conditions of the vehicle. A test drive can enable a user and other sensors to measure operations in real-time as the vehicle navigates a path of travel. During the test drive, a computing system can receive inputs from the user and other sources, such as sensors, passengers of the vehicle, and other sources. The computing system can then annotate graphs and other visuals using the inputs received from the different sources for the user or a technician to analyze when subsequently working on the vehicle.

Example embodiments herein relate to techniques for annotating graphs of vehicle data with multiple inputs. During operation of a vehicle, a computing system configured to annotate graphs of vehicle data can receive inputs from various sources, such as user interfaces, sensors, and other computing systems. For example, the computing system may enable a user to mark moments during operation of the vehicle and provide context with each marked moment for subsequent review. The computing system may also receive inputs from other sources, such as vehicle sensors or external sensors configured to measure aspects of one or more systems of the vehicle during operation. As such, during a test drive of the vehicle, the computing system may receive one or numerous inputs from one or more sources that the user wishes to review subsequent to the test drive.

Upon receiving an input from a source, the computing system may associate a time with that input. For example, the computing system may associate a time that the input was received from the source. The time that the input was received at the computing system may be referred herein as a time of reception. In some examples, the time of reception may also represent the particular time that the input was captured or obtained by the source. For instance, the time of reception may specify when a camera captured an image or when a sensor measured a level of operation of a system of the vehicle.

In further examples, the computing system may determine a time range for an input received from a source. Particularly, the time range may represent the duration over which the source captured the input. For example, the computing system may determine a time range over which a series of images were captured by a camera. In another example, the time range may represent the duration over which a microphone captured audio from the user or a system of the vehicle. The computing system can also determine a time of reception (or in other words, a reception time) for each parameter in the VDP obtained from the vehicle. As such, the time range may vary in duration for each input.

To illustrate an example embodiment, a computing system may receive inputs from different sources during operation of a vehicle. For instance, a user operating the vehicle might want to mark moments where the vehicle operated undesirably during a test drive, such as a particular time when the engine of the vehicle stalled. The computing system may enable the user to mark moments and provide additional context that the computing system will store with an associated time stamp (e.g., a time of reception or a time range) for subsequent review. The computing system may receive inputs that originate from a user or another passenger via various types of input interfaces, such as microphones, tactile buttons, graphical user interfaces, cameras, etc. The computing system may also receive inputs from other sources, such as sensors configured to measure operation of particular systems of the vehicle. Similar to user inputs, the computing system may also associate times (e.g., a time of reception or a time range) for each input received from other sources. The computing system may also obtain VDP related to PIDs and other vehicle information from the vehicle. The VDP may correspond to one or multiple PIDs and can represent operation of various systems of the vehicle during the prior operation of the vehicle.

In some embodiments, a source may capture an input in response to another source capturing an input. For example, a sensor may capture sensor data or modify operation in response to a triggering event, such as a signal from another sensor, a signal originating from an input from the user at the computing system, a signal from the computing system receiving the inputs, etc.

Upon receiving inputs from various sources (e.g., the user, sensors, the vehicle), the computing system may arrange the inputs for analysis by the user (or other people), by the computing system itself, or another computing system. Particularly, the computing system may arrange information contained within the inputs for clear and concise review.

In some examples, the computing system may arrange the inputs in a temporal order for subsequent analysis. The computing system may determine and display the information within one or more graphs viewable on displays. For example, the computing system may determine a graph representing parameters corresponding to a PID. In some examples, the computing system may determine multiple graphs or arrange information in other ways using inputs received from one or more sources. Various types of graphs could be displayed by the computing system, including line graphs, bar graphs, frequency distributions, histograms, etc.

When determining a graph based on inputs received from the vehicle (e.g., VDP related to a PID) or other sources, the computing system may further determine indicators displayable on the graph. Particularly, an indicator may represent an input received from a source. For instance, a first indicator may represent a user input received from a graphical user interface and a second indicator may represent a sensor data input received from a sensor. As such, the computing system may display indicators representing inputs on one or more graphs. For example, The computing system may display the indicators on a graph based on a temporal order determined using time associated with each indicator. For example, on a graph representing a set of parameters corresponding to a PID, the computing system may include a set of indicators arranged in a particular temporal order. The particular temporal order may depend on when each input was received at the computing system, when each input was received by the respective source capturing the input, time ranges over which inputs were captured by sources, or a combination of time associations with each input. By displaying the indicators in a temporal order, the computing system can convey to the user reviewing the graph the order that each input relates temporally to vehicle parameters and other inputs.

In some embodiments, the indicators may be selectable by a user or another person reviewing the information obtained during operation of the vehicle. When an indicator is selected, the computing system may display information represented by the indicator. For example, when an indicator representing an input from a camera is selected, the computing system may display one or more images represented by the indicator in response. Displaying indicators representing received user inputs on graphs corresponding to PIDs can allow the user to view and/or review the operating conditions of the vehicle systems during the moments when the user initially provided each user input during operation of the vehicle.

In further examples, the computing system may further display a graph view slider and symbols that enable the user to adjust graphs being displayed, such as the period of time displayed by the graphs as well as select symbols to view information related to that symbol. For instance, each user input may have a corresponding, selectable symbol that the computing system may display on the display interface. Upon selection of a given symbol, the computing system can further display information related to that user input and operation of vehicle systems that correspond to the same time frame as the user input, including a time and date when the user input was initially received and recorded at the computing system.

In addition, the computing system may also provide other options for displaying vehicle information and user inputs. For instance, the computing system may include filtering options that enable the user to modify the vehicle information and user inputs displayed by the computing system. Some example filtering options may include an option to display only user inputs such that the user can clearly and quickly find and identify inputs that he or she provided during operation of the vehicle. Other techniques of filtering and customizing displaying vehicle information and user inputs corresponding to the prior operation of the vehicle are possible within examples. For instance, the computing system can enable a user to provide a variety of annotations (e.g., add text, markings, etc.) to graphs and other displays of vehicle operation measurements and inputs. The customization enabled by the computing system can allow a user to resize graphics, move around visuals in a single or multiple visual formats on a graphical interface, and provide inputs that assist the user understand and analyze the operations of the vehicle.

In some example embodiments, the computing system may further provide details along with marking a moment of time via a user input during operation of a vehicle. For instance, the computing system may capture and record a vocal input from the user during operation of the vehicle. The vocal input from the user can specify a variety of information regarding operation of the vehicle, including things that the user may notice or feel at that particular time of operation. For instance, example vocal inputs may specify when the engine of the vehicle stalls, driving conditions that may be causing problems for the vehicle (e.g., the vehicle is struggling to operate uphill or downhill smoothly), and weather conditions, among other information that can assist the user during future servicing of the vehicle.

In some embodiments the computing system may also determine corresponding text representing the vocal input using speech recognition and subsequently store the text in memory for the user to review along with graphs representing the various operations of vehicle systems during the same times as the user inputs. For example, the text representing the vocal input or the vocal input in general may be represented as a selectable indicator on one or multiple VDP graphs that correspond to the test drive of the vehicle. When the selectable indicator is selected by the user, the computing system may enable the user to listen to the vocal input as originally recorded by the computing system and/or display the text in an editable popup box that may further allow the user to edit the text or add further commentary regarding the original vocal input.

In additional embodiments, the computing system can further communicate with other devices (e.g., sensors) configured to capture information related to operation of systems of the vehicle. For instance, the computing system may communicate with a camera or camera system that can monitor gauges, other operations of the vehicle, or the road of travel of the vehicle. As a result, when the computing system receives a user input from the user during operation of the vehicle, the computing system may further trigger the camera to record a current state of the gauges or other information representative of one or multiple systems of the vehicle. The computing system may subsequently enable the user to access the images or video captured by the camera when the user opts to review the associated user input. This way, the user may obtain further information about operations of the vehicle during the duration that the user provided the user input. For example, the user may review the current path of travel of the vehicle during the moments marked by user inputs. In other examples, the computing system may communicate with other devices, such as various types of sensors (e.g., microphones, thermal sensor).

In some embodiments, the computing system can communicate with one or more external cameras. For example, a camera can be positioned inside the vehicle to monitor reactions of the driver. The camera can operate in sync with a microphone system that also captures audio from the camera. As such, the computing system can receive images or video as well as audio representing actions of the user during a test drive of the vehicle.

In further embodiments, devices configured to capture information related to operation of one or more systems of the vehicle can operate as a system through communication. For example, a thermal camera or another type of camera could be positioned nearby a microphone system positioned in the vehicle. The microphone system may include one or more microphones, which may include an omni-directional microphone. As such, the microphone system could detect sound emanating from a particular direction and cause the camera to capture measurements of the particular direction. In some instances, the camera may be mounted on a self-adjusting mount that enables the camera to turn and focus on a component located in the particular direction.

In some embodiments, the computing system can associate incoming inputs with one or multiple timers that can indicate when the inputs are captured or received at the computing system. Further, the computing system can also associate incoming inputs with a current position and/or orientation of the vehicle during the test drive. In particular, the computing system can receive inputs and associate the inputs with measurements provided by a global positioning system (GPS) and/or measurements from an inertial measurement unit (IMU). As such, the computing system can further supplement received inputs with a general position and orientation of the vehicle during the path of travel. This way, the computing system can also generate and display a path of travel in a map or another format via a graphical interface that enables the user to view inputs captured during a particular portion of the route.

II. Example Systems

FIG. 1 is a diagram showing an example operating environment 1 in which the example embodiments can operate. As shown, the operating environment 1 includes a computing system 2, a server 4, a communication network 6, a vehicle 8, and communication links 9, 10, 11, 12, but may include more or fewer elements within other example embodiments.

The computing system 2 can take various forms, such as a specialty computing system specifically configured in whole or in part for the purpose of servicing vehicles (e.g., the vehicle 8). In some instances, a specialty computing system can include unique elements for facilitating servicing of vehicles or can otherwise be uniquely configured in such a way that distinguishes the specialty computing from another type of computing system. In some examples, a specialty computing system can be configured to perform various functions associated with servicing vehicles, can include communication interfaces with other systems/servers/networks associated with servicing vehicles, and can be configured to send and receive data over those interfaces in accordance with one or more protocols associated with servicing vehicles. Alternatively, in some examples, the computing system 2 can be a general purpose, non-specialty computing system, such as a general purpose smart phone, desktop computer, laptop computer, or the like. As a general matter, the computing system 2—specialty or general purpose—can take the form of a hand-held device, laptop computer, desktop computer, and/or another type of device.

The operating environment 1 further includes the server 4 connected to the computing system 2 via the communication network 6. As such, the server 4 can take various forms as well, such as a specialty server specifically/uniquely configured for the purpose of servicing vehicles, or a general-purpose server. In some examples, the server 4 can be scaled so as to be able to serve any number of devices, such as one computing system (as shown in FIG. 1), one hundred computing systems, one thousand computing systems, or some other number of computing systems.

The communication network 6 can include the communication links 9, 10, 11, 12 as well as other communication links (not shown in FIG. 1). The communication network 6 and the communication links 9, 10, 11, 12 can include various network elements such as switches, modems, gateways, antennas, cables, transmitters, and receivers. The communication network 6 can comprise a wide area network (WAN) that can carry data using packet-switched and/or circuit-switched technologies. The WAN can include an air interface and/or wire to carry the data. The communication network 6 can comprise a network or at least a portion of a network that carries out communications using a Transmission Control Protocol (TCP) and the Internet Protocol (IP), such as the communication network commonly referred to as the Internet. Additionally or alternatively, the communication network can comprise a local area network (LAN), private or otherwise.

The operating environment 1 further includes the vehicle 8 shown in communication with the computing system 2 and the communication network 6. A vehicle, such as vehicle 8, is a mobile machine that can be used to transport a person, people, and/or cargo. As an example, any vehicle described herein can be driven and/or otherwise guided along a path (e.g., a paved road or otherwise) on land, in water, in the air, and/or outer space. As another example, any vehicle described herein can be wheeled, tracked, railed, and/or skied. As yet another example, any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, and/or a farm machine.

As an example embodiment, the vehicle 8 can be guided along a path and can include a van (such as a dry or refrigerated van), a tank trailer, a platform trailer, or an automobile carrier. As still yet another example, any vehicle discussed herein can include or use any appropriate voltage or current source, such as a battery, an alternator, a fuel cell, and the like, providing any appropriate current or voltage, such as about 12 volts, about 42 volts, and the like. As still yet another example, any vehicle discussed herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle discussed herein can include an electronic control unit (ECU), a data link connector (DLC), and a vehicle communication link that connects the DLC to the ECU.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (e.g., a four cylinder internal combustion engine) within the vehicle. A person skilled in the art will understand that other features in addition to or as an alternative to "engine type" can be used to identify a vehicle using particular vehicle identifying information. These other features can be identified in various manners, such as a regular production option (RPO) code, such as the RPO codes defined by the General Motors Company LLC, Detroit Mich.

A vehicle communication link within a vehicle (e.g., the vehicle 8) can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle. The computing system 2 or another computing system can include a vehicle communication transceiver 25 connectable to a vehicle communication link and a processor to transmit and receive vehicle communications via the vehicle communication link.

As indicated above, any vehicle described herein can include an electronic control unit (ECU), a data link connector (DLC), and a vehicle communication link that connects the DLC to the ECU. An ECU can control various aspects of vehicle operation or components within a vehicle. For example, the ECU can include a powertrain (PT) system ECU, an engine control module (ECM) ECU, a supplemental inflatable restraint (SIR) system (e.g., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. Performance of a functional test can or a reset procedure with respect to an ECU can comprise the computing system 2 transmitting a VDM to a vehicle. A VDM received by an ECU can comprise a PID request. A VDM transmitted by an ECU can comprise a response comprising the PID and a PID data value for the PID.

The DLC can include an on-board diagnostic (OBD) II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Delphi Automotive LLP of Troy, Mich. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication link such that the DLC is communicatively connected to the ECU.

The computing system 2 and/or the vehicle 8 can be located at the same location as one another or remotely from one another at separate, distinct locations. For example, both the computing system 2 and the vehicle 8 can be located at a repair shop. As another example, both the computing system 2 and the vehicle 8 can be located out on the road. As yet another example, the computing system 2 can be located at a repair shop and the vehicle 8 can be located out on the road. One or more of these locations can also include various computerized shop tools (CSTs) and/or non-computerized shop tools, such as a battery charger, torque wrench, brake lathe, fuel pressure gauge, wheel balancer, etc. Further, one or more of the shop tools and/or the computing system 2 can be operable outside of a repair shop. For example, the computing system 2 can be operable within the vehicle 8 as the vehicle 8 is driven on roads outside of the repair shop for any of a variety of purposes.

The vehicle 8 can transmit various data to the computing system 2, such as OBD data (e.g., diagnostic trouble codes (DTCs), measurements read by a shop tool from a VDM, real-time and/or non-real-time electrical measurements (e.g., sensor readings), and/or other types of data. For example, the vehicle 8 can transmit data directly to the computing system 2 over communication link 11. As another example, the vehicle 8 can transmit data indirectly to the computing system 2 by transmitting the data over communication link 12, communication network 6, and communication link 10 to the server 4, after which the server 4 can transmit the data over communication link 10, communication network 6, and communication link 9 to the computing system 2. The vehicle 8 can perform such an indirect transmission of data with or without specifying the computing system 2 as a destination for the data. For instance, the vehicle 8 (and perhaps other vehicles in communication with the server 4) can transmit data to the server 4, specifying only the server 4 as the destination for the data. Thereafter, the computing system 2 can transmit to the server 4 a request for the data, the server 4 can assemble the data and transmit the data to the computing system 2 in response to the request.

The computing system 2, the server 4, and/or the vehicle 8 can transmit data to (and receive data from) other devices on the communication network 6 as well, such as one or more databases (not shown) to which the computing system 2, the server 4, and/or the vehicle 8 have access.

For any given computer system discussed herein, such as the computing system 2, the server 4, and/or the vehicle 8, data received by that device can be stored within a computer-readable medium for use by that device. Further, for any given computer system discussed herein, such as the computing system 2, the server 4, and/or the vehicle 8, data received by that device can be stored locally in memory at that device and/or can be stored remotely at a storage location accessible by that device (e.g., a remote server or remote database).

One or more computing systems and/or one or more vehicles can be connected by a network established by those devices, such as a vehicle-to-client network, or the like. Such a network can comprise a personal area network (PAN). The PAN can be configured according to any of a variety of standards, protocols, and/or specifications. For example, the PAN can be configured according to a universal serial bus (USB) specification 2.0, 3.0, or 3.1 developed by the USB Implementers Forum. As another example, the PAN can be configured according to an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15.3, 802.15.4, or 802.15.5) for wireless PAN.

In example operating environment 1, there can be a scenario in which the computing system 2 transmits to the server 4 a request for a download of information (e.g., information associated with a vehicle component for a particular vehicle). Such a request can include, for example, a YMM of a particular vehicle and a name of a particular vehicle component. As another example, the request can include a YMME of a particular vehicle and an indication (e.g., a description or code) of a particular symptom associated with a particular vehicle component. As yet another example, the request can include data received from the vehicle for which the information is being requested, and such data can include a vehicle identification number (VIN) of the vehicle, a DTC indicative of a particular vehicle component of the vehicle, an image of a particular vehicle component, among other possibilities.

In this scenario, upon receipt of the request, the server 4 can assemble the download. For instance, upon receipt of the request, the server 4 can retrieve some or all of the computing system-requested information from memory at the server 4. Additionally or alternatively, upon receipt of the request, the server 4 can in turn transmit to one or more databases located remotely from the server 4 a request for some or all of the computing system-requested information and then receive some or all of the computing system-requested information from the one or more databases. Upon assembling the download including the computing system-requested information, the server 4 can transmit the download to the computing system 2.

Figure 2:
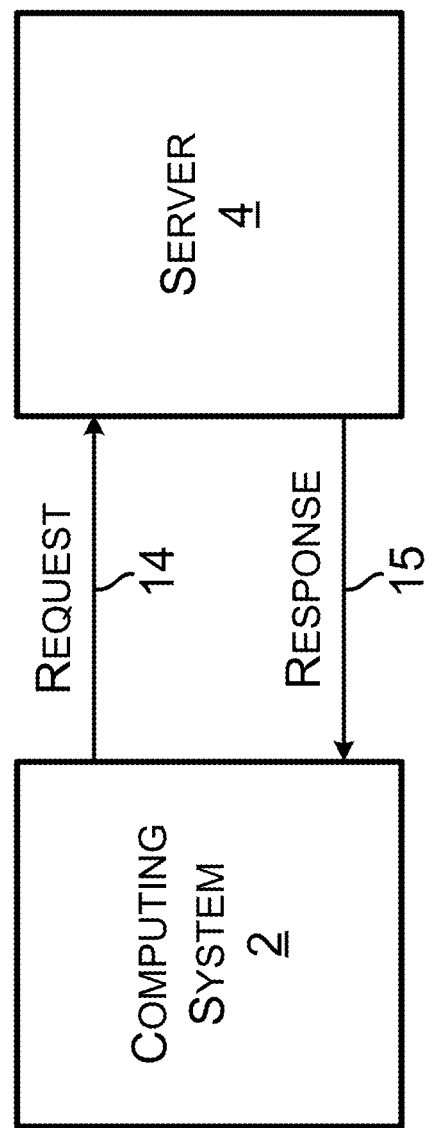
FIG. 2 is a communication flow diagram.

Next, FIG. 2 illustrates an example communication workflow between a computing system and a server. More specifically, the computing system 2 may communicate with the server 4 to assist a user with the servicing of the vehicle 8. For instance, the computing system 2 may send a request 14 over a communication network (e.g., the communication network 6) to the server 4. The request 14 may include information describing the vehicle 8 (e.g., a YMM or a YMME) and related to operation of the vehicle 8 (e.g., symptoms). Upon receiving the request 14, the server 4 may transmit a response 15 to the request 14 back to the computing system 2. The response may include various information that the computing system 2 may utilize. For example, the server 4 may transmit a threshold, multiple thresholds, or other information related to one or more PIDs that correspond to the vehicle 8. As such, the response 15 to the request 14 provided by the server 4 may allow the computing system 2 to display contextually relevant pieces of data or information about the vehicle 8, such as vehicle data parameter (VDP) graphs indicative of various PIDs, a list of PIDs, or a test to perform to service a vehicle with respect to a PID that breached a PID threshold. The list of PIDs can include an indexed list of PIDs applicable to the vehicle and operation of the vehicle described in the request 14. The VDP graphs provided in the response 15 can be based on PIDs that the computing system 2 provided to the server 4 before transmission of the request 14. The test within the response 15 can be a single test or a test within an indexed list of tests, such as an indexed list of component tests, an indexed list of functional tests, or an indexed list of reset procedures.

Figure 3:
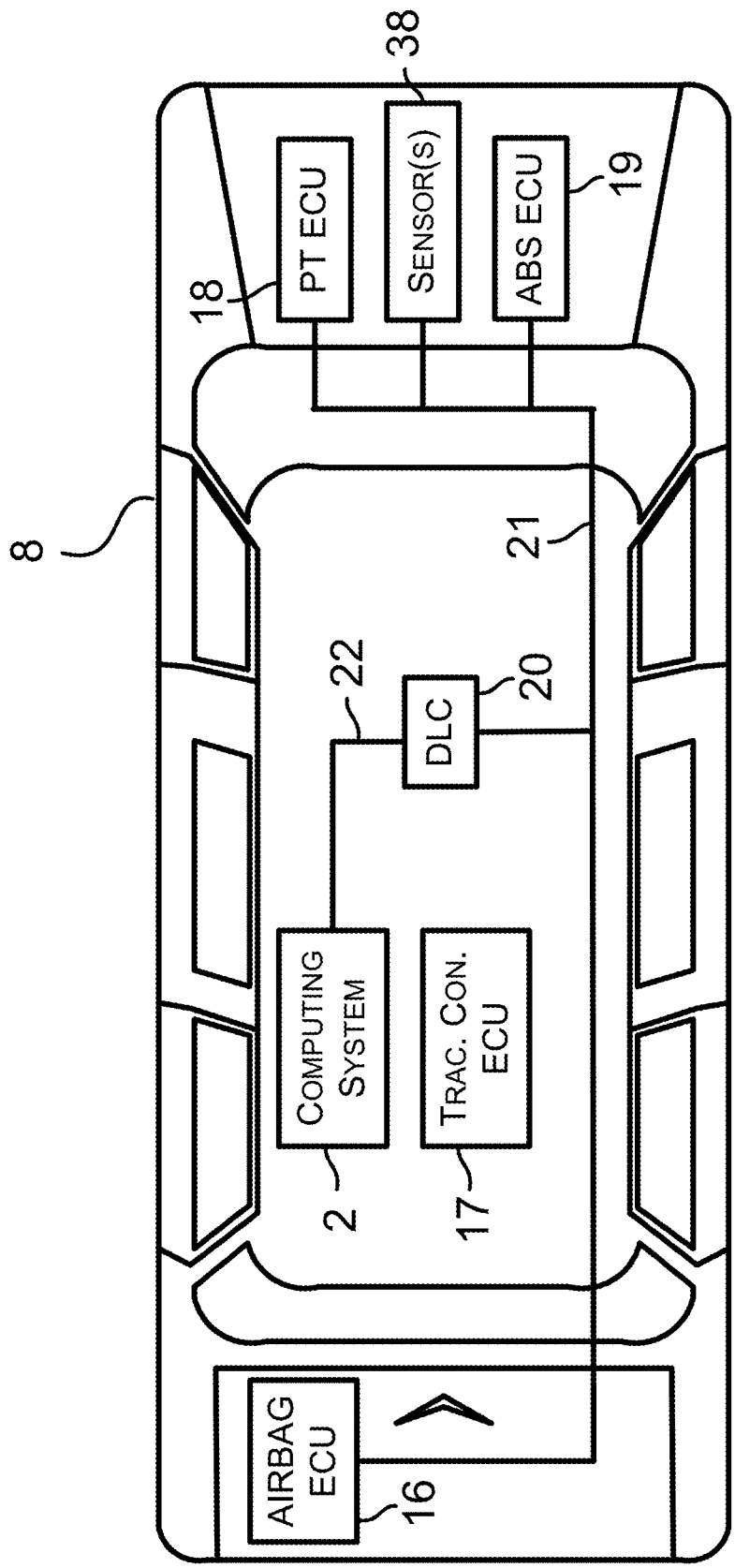
FIG. 3 is a diagram of a vehicle showing example placement of a computing system.

Next, FIG. 3 shows example details of the vehicle 8 and example placement of the computing system 2 within the vehicle 8. Particularly, the vehicle 8 is shown with an airbag system ECU 16, a traction control system ECU 17, a powertrain system (PT) ECU 18, an anti-lock brake system (ABS) ECU 19, a DLC 20, and sensor(s) 38 each of which is connected to a vehicle communication link 21. Other examples of the ECU within the vehicle 8 are also possible.

The DLC 20 can have various positions within the vehicle 8. For example, the DLC 20 can be located within a passenger compartment of the vehicle 8, within an engine compartment of the vehicle 8, or within a storage compartment within the vehicle 8. Particularly, the computing system 2 can include and/or connect to the DLC 20 via a DLC-to-display-device communication link 22. As such, the computing system 2 can be removed after the vehicle 8 has been serviced at a repair shop. In that way, the computing system 2 can be used to diagnose other vehicles, such as vehicle that subsequently arrive at a repair shop. As discussed above, the DLC 20 can comprise a connector such as an OBD I connector, an OBD II connector, or some other connector. Particularly, the DLC 20 can include one or more conductor terminals that connect to a conductor of the vehicle communication link such that the DLC 20 is communicatively connected to the ECU within the vehicle 8.

Sensor(s) 38 can represent various types of sensors that may measure operations of systems of the vehicle 8, including systems illustrated in FIG. 3. In some examples, one or more sensors 38 may communicate with the computing system 2 through the DLC 20 using the vehicle communication link 21 and/or the DLC-to-display-device communication link 22. In further examples, one or more sensors 38 may communicate directly with the computing system 2 through a wireless connection.

Figure 4:
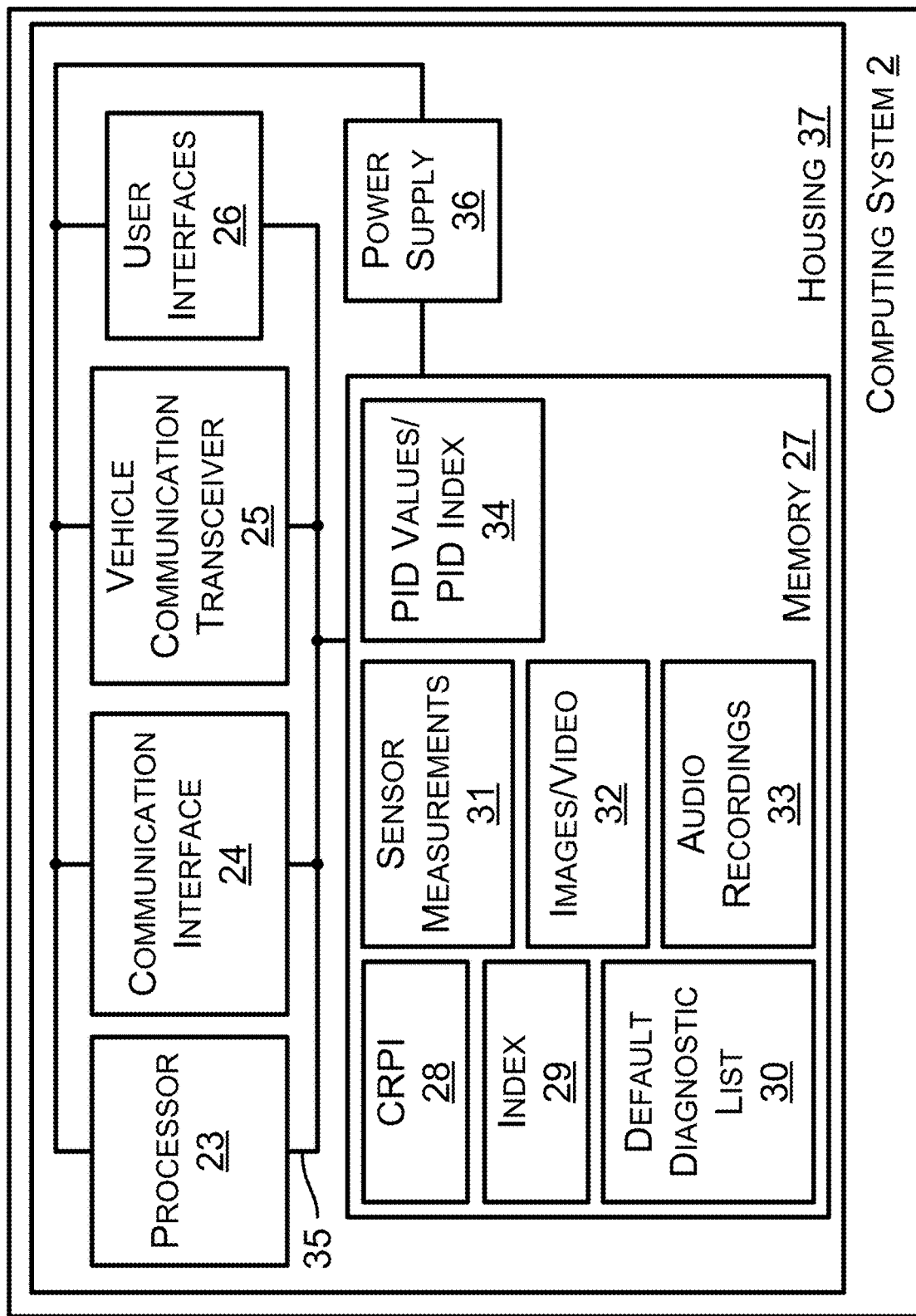
FIG. 4 is a block diagram of an example computing system.

FIG. 4 is a block diagram of the computing system 2. As indicated above, in some examples, the computing system 2 may operate as a vehicle diagnostic tool, scanner, or other type of VST. In other examples, the computing system 2 may be a tablet computing system, a cellular phone (e.g., smartphone), a laptop or desktop computer, a head-mountable device (HMD), a wearable computing system, or a different type of fixed or mobile computing system. The configuration and type of computing system can vary within examples. For instance, the computing system 2 can have various physical designs and additional components within other examples.

As shown in FIG. 4, the computing system 2 includes a processor 23, a communication interface 24, a vehicle communication transceiver (VCT) 25, user interfaces 26, and memory 27. Two or more of these components as well as other components can be communicatively coupled or linked together via a system bus, network, or other connection mechanism 35. The computing system 2 can include more or fewer components within other examples.

The processor 23 (as well as any other processor discussed in this description, such as the processor 60 shown in FIG. 6)) can include one or more processors, such as one or more of the processors discussed below. In some implementations, the processor 23, 60 can include a general purpose processor, such as an INTEL® single core microprocessor or an INTEL® multicore microprocessor. A general purpose processor can be configured for operating within and/or can be disposed within a general purpose computer, such as a personal computer (PC).

In some implementations, the processor 23, 60 can include a special purpose processor, such as a neural network processor, a graphics processor, or an embedded processor. A special purpose processor can, but need not necessarily, be configured as an application specific integrated circuit (ASIC) processor.

An embedded processor refers to a processor with a dedicated function or functions within a larger electronic, mechanical, pneumatic, and/or hydraulic device, and is contrasted with a general purpose computer. In some implementations, the embedded processor can execute an operating system, such as a real-time operating system (RTOS). As an example, the RTOS can include the SMX® RTOS developed by Micro Digital, Inc., such that the processor 23, 60 can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLD-FIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

In some implementations, the processor 23, 60 can be configured to execute computer-readable program instructions (CRPI) 28 stored in the memory 27. The CRPI configured to carry out functions discussed in this disclosure, such as the CRPI 28, 64, can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. The processor 23, 60 can also be configured to execute hard-coded functionality in addition to or as an alternative to software-coded functionality (e.g., via CRPI 28). Within example implementations, the processor 23 can be programmed to perform any function or combination of functions described herein as being performed by the computing system 2. Likewise, the processor 60 can be programmed to perform any function or combination of functions described herein as being performed by the server 4.

The communication interface 24 of the computing system 2 can include one or more communication interfaces. Each communication interface can include one or more transmitters configured to transmit data onto a network, such as the communication network 6. As such, the data transmitted by the communication interface 24 can comprise any data described herein as being transmitted, output, and/or provided by the computing system 2. Moreover, each communication interface can include one or more receivers configured to receive data carried over a network, such as the communication network 6. The data received by the communication interface 24 can comprise any data described herein as being received by the computing system 2, such as vehicle identifying information or a DTC.

The VCT 25 can include (a) a transmitter configured for transmitting a VDM to the vehicle 8 and/or to an ECU within the vehicle 8, and (b) a receiver configured for receiving a VDM transmitted by the vehicle 8 and/or by the ECU. As an example, the transmitter and the receiver of the VCT 25 can be integrated into a single semiconductor chip. As another example, the transmitter and the receiver of the VCT 25 can be separate semiconductor chips.

The VCT 25 can include and/or be connected to a wiring harness. The wiring harness can be configured to provide a wired connection between the computing system 2 and the vehicle 8. In some embodiments, the wiring harness can be removably connectable to the DLC 20 within the vehicle 8. In those embodiments, the DLC 20 can provide the computing system 2 with an indirect connection to an ECU, such as an ECU that provides PID parameters. In some other embodiments, the wiring harness can provide the computing system 2 with a direct connection to the ECU. The VCT 25 can include and/or connect to one or more connectors, one of which can be located at the end of the wiring harness.

The VCT 25 can be configured to communicate with the vehicle 8 and/or an ECU within the vehicle 8 wirelessly. The VCT 25 that communicates wirelessly can transmit radio signals carrying data or a communication, such as a request for PID parameters, and can receive radio signals carrying data or a communication, such as a response including PID parameters.

The VCT 25 can be configured to transmit VDM according to a VDM protocol and to receive VDM according to the VDM protocol. In one implementation, the VCT 25 can be configured to transmit VDM according to multiple VDM protocols and receive VDM according to multiple VDM protocols. As an example of that implementation, the VCT 25 can include multiple semi-conductor chips, each semi-conductor chip dedicated for transmitting and receiving VDM according to at least one VDM protocol.

The user interfaces 26 can include one or more display interfaces and other potential elements configurable to display information to a user. For instance, the user interfaces 26 can represent a type of user interface that allows users to interact with the computing system 2 through graphical icons and visual indicators. The user interface 26 can also enable the user to use the computing system 2 to communicate with other devices (e.g., sensors) measuring aspects of the vehicle. Various example graphical user interfaces are described below with regards to FIG. 5.

The user interfaces 26 can also include various types of interfaces configurable to receive users' inputs and other information. For example, the user interfaces 26 may include one or more microphones configured to detect and receive vocal input from users and/or other sounds. In some examples, the microphones can detect and receive any sound as the sound occurs (e.g., when the user provides a vocal input, the microphone captures it). Alternatively, the microphones can be configured to only detect audio in response to the user pushing a button, using an associated application, or some other form of activation technique. In some examples, the microphones may operate as physically separate devices from the computing system 2.

In further examples, the user interfaces 26 can include buttons, switches, joysticks, or other physical structures configurable to receive inputs from one or multiple users. For example, the computing system 2 can include a button that a user can use to record a date and time of the button push, such as recording button pushes during the operation of a vehicle. The user interfaces 26 can include other mechanical structures that enable a user to provide inputs to the computing system 2. For example, the user interfaces 26 can include a motion sensor configured to detect and measure movements of the user.

The memory 27 can include one or more types of memories. A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For instance, the memory 27 can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

The memory 27 stores computer-readable data, such as the CRPI 28, an index 29, and a default diagnostic list 30. The CRPI 28 can comprise a plurality of program instructions and can also include data structures, objects, programs, routines, or other program modules that can be accessed by a processor and executed by the processor to perform a particular function or group of functions and are examples of program codes for implementing steps for methods described in this description. In general, the CRPI 28 can include program instructions to cause the computing system 2 to perform any function described herein as being performed by the computing system 2 or to cause any component of the computing system 2 to perform any function herein as being performed by that component of the computing system 2. As an example, the CRPI 28 can include program instructions to perform the set of functions 180 described herein or similar functions.

The index 29 may include a listing of PIDs, component tests, functional tests, and/or reset procedures, among other possible information. In some examples, the index 29 may also include additional associated information. For example, as part of a PID index (e.g., PID index 70 described in FIG. 7), PID descriptors may also be stored for display by the computing system 2. As a further example, information indicating how to communicate a request for each PID value to the vehicle 8 may also be stored as part of a PID index.

The default diagnostic list 30 may indicate particular PIDs, functional tests, component tests, and/or reset procedures to display for a given symptom or set of symptoms for the vehicle 8. In other examples, the default diagnostic list 30 may indicate which PIDs, functional tests, component tests, and/or reset procedures to display for any symptom when a symptom-based filter list is unavailable from the server 4.

The memory 27 may further store sensor measurements 31, images/video 32, audio recordings 33, and PID values/PID index 34, among other possible information. Sensor measurements 31 may correspond to sensor data provided by various sensors that can communicate with the computing system 2. For example, the computing system 2 may communicate and store temperature measurements from a thermal sensor. In further examples, the computing system 2 can communicate with other sensors that can measure aspects of operation of the vehicle.

In some examples, the computing system 2 may include or communicate with digital oscilloscopes to obtain sensor data. A digital oscilloscope may display voltage over a period time, which can help identify a vehicle fault associated with a vehicle symptom, such as an engine knock, an engine misfire, or a pulsing vehicle brake. In other examples, the computing system 2 may receive sensor data from a pulse sensor configured to measure pressure fluctuations for exhaust, intake, crankcase, and fuel rail of the vehicle 8. Similarly, the computing system 2 may communicate with pressure transducers that can measure pressure related data from the vehicle 8. In some examples, the computing system 2 may communicate with a laser thermometer, a sniffer configured to detect certain smells (e.g., richness) in the exhaust, coolant, etc.

In addition, the computing system 2 may communicate with a microphone system (e.g., the Blue-point® electronic squeak and rattle finder). The microphone system can include microphones capable of connecting to various parts of the vehicle 8. For example, a user can position microphones nearby the engine and other components of the vehicle 8. The microphone system can enable the user to listen to gears, bearings, and suspension while the vehicle 8 is under load so that problems can be more accurately pin-pointed. In some examples, upon hearing a noise, the microphone system may provide an alert to the user through the computing system 2. For example, a microphone may receive a sound wave above a certain decibel (dB) level or within a certain frequency range and cause the computing system 2 to drop a flag to mark that moment. The microphone system may also detect an audible signal and provide the signal to processing circuitry for capture and comparison to known audible signals. The comparison may result in the computing system 2 dropping a flag to mark the time of capture of the audible signal capture.

As an example, the microphone system may detect a "knocking sound" originating from the engine. In response, the computing system 2 can trigger an oil pressure sensor measurement to determine if the oil pressure sensor or an oil pump requires a replacement. In another example, the microphone system may be placed in proximity to brakes of the vehicle 8, detect sounds coming from the brakes as the vehicle 8 travels uphill, and responsively cause the computing system 2 to drop a flag for subsequent review as a result. In a further example, the microphone system may detect for turbocharge boost leaks via high pitch sounds.

In other examples, other communication can occur between devices operating in the vehicle. For example, the user can use the computing system 2 to trigger operation of one or more sensors measuring aspects of operation of one or more vehicle systems. For instance, the user may provide a vocal command or physical input to the computing system 2 that causes the computing system 2 to trigger operation of one or more sensors. In some instances, triggering operation of one or more sensors may involve causing the computing system 2 or another system to record sensor measurements from the one or more sensors starting at that time period. The time period may end when the computing system 2 transmits a stop signal or after a predetermined duration. Further, some examples may involve a sensor similarly triggering one or more sensors to capture information regarding operation of one or more systems of the vehicle for later review by the user.

In some implementations, a sensor can connect to an analog or digital input of the processor 23. In those or other implementations, a sensor can connect to an analog-to-digital converter connected to a digital input of the processor 23. As an example, a sensor can output an analog voltage signal between zero volts and five volts. As another example, a sensor can output a pulse-width modulated signal between zero volts and twelve volts. Other examples of sensor outputs and sensor output voltage ranges are possible.

Images/video 32 may correspond to images and/or video captured by a camera or camera systems associated with a vehicle (e.g., the vehicle 8). For example, the computing system 2 can activate and send instructions to a camera or camera system associated with a vehicle. The camera may capture images or video of gauges, the interior of the vehicle, the exterior of the vehicle, or a path of travel in response to receiving instructions from the computing system 2, for instance.

Audio recordings 33 may correspond to audio inputs captured by one or multiple microphones associated with the computing system 2. For instance, the computing system 2 may receive audio input from a user while the user test drives the vehicle 8. In some examples, the computing system 2 may cause a microphone to record audio in response to detecting a particular word or phrase. In other examples, the computing system 2 may cause a microphone to record audio in response to detecting a user motion or input (e.g., a button push).

PID values/PID index 34 may include information indicating specified values of parameters associated with a vehicle component (e.g., sensor values) as well as PIDs arranged in indices. The computing system 2 may acquire PID values from a vehicle (e.g., the vehicle 8) or another device (e.g., the server 4). In some examples, upon acquiring PID values from the vehicle 8, the computing system 2 may arrange the PID values into PID indices within the PID values/PID index 34.

The computing system 2 can also include a power supply 36. A power supply such as the power supply 36 or any other power supply discussed in this disclosure can include (1) a connection to an external power source, and (2) circuitry to provide an electrical current to electrically-operable component(s) connected to the power supply. As an example, the external power source can include a wall outlet at which a connection to an alternating current can be made. As another example, the external power source can include an energy storage device (e.g., a battery) or an electric generator. As yet another example, the processor 23, the communication interface 24, the VCT 25, the user interfaces 26, and/or the memory can be and electrically-operable component.

Additionally or alternatively, a power supply such as the power supply 36 or any other power supply discussed in this disclosure can include (1) a connection to an internal power source, and (2) power transfer circuitry to provide an electrical current to flow to electrically-operable component(s) connected to the internal power source. As an example, the internal power source can include an energy storage device, such as a battery.

Furthermore, a power supply such as the power supply 36 or any other power supply discussed in this disclosure can include a circuit protector and/or a signal conditioner.

The computing system 2 can include a housing 37 that provides support for the processor 23, the communication interface 24, the VCT 25, the user interfaces 26, the memory, the connection mechanism 35, and/or the power supply 36. The support provided by the housing 37 can be direct support in which another component of the computing system 2, such as a display of the user interfaces 26 directly contacts the housing 37. Alternatively and/or additionally, the support provided by the housing 37 can be indirect support in which another component of the computing system 2 is located upon or within another component of the computing system 2 that directly contacts the housing 37. For instance, the computing system 2 can include a circuit board or other substrate that directly contacts the housing 37 and upon which the processor 23, the communication interface 24, the VCT 25, the user interfaces 26, the memory, the connection mechanism 35, and/or the power supply 36 is disposed.

Figure 5:
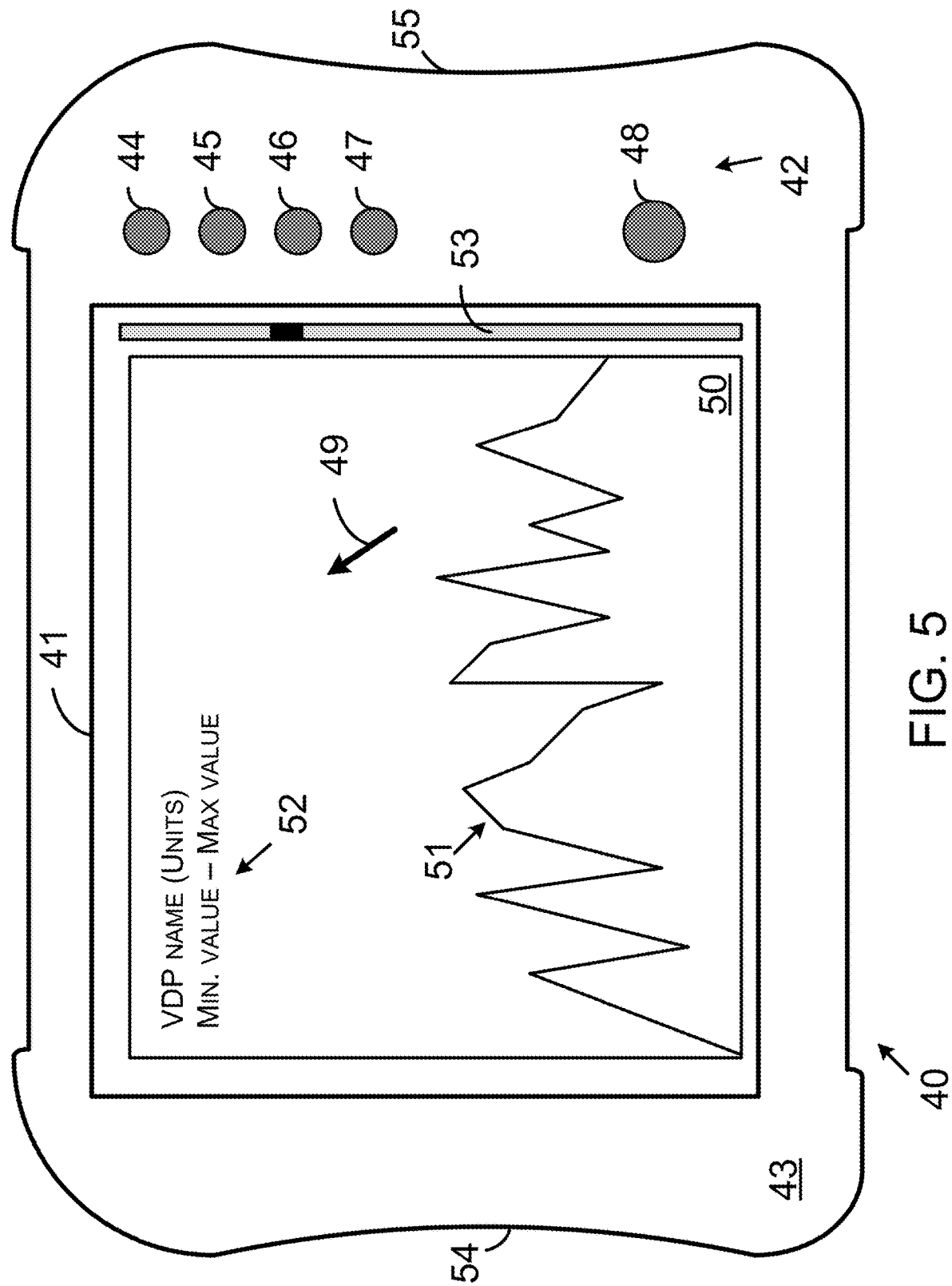
FIG. 5 is a diagram of an example VST with a display in accordance with the example embodiments.

Next, FIG. 5 is an illustration of an example vehicle service tool in accordance with the example embodiments. The VST 40 can operate utilizing the computing system 2 shown in FIG. 4 or utilizing another computing system. In some examples, the VST 40 can represent a physical configuration of the computing system 2. As such, the VST 40 includes a display 41, a user input section 42, and a housing 43 with the display 41 and the user input section 42 making up a part of a user interface configured to receive input from a user and provide output to the user of the VST 40.

In some examples, the display 41 of the VST 40 can include a touchscreen interface/display, such as a color touchscreen used on the MODIS™ ultra integrated diagnostic system (reference number EEMS328 W) available from Snap-on Incorporated of Kenosha, Wis. or another type of touch-screen interface. In other examples, the display 41 can include a backlit color liquid crystal display (LCD) having a capacitive, resistive, or infrared touchscreen interface or panel or a plasma display or a light emitting diode (LED)

display. In further examples, the display 41 can include a display like those used as part of a tablet device (such as an IPAD® tablet device from Apple Inc., or a SAMSUNG GALAXY TAB tablet device from Samsung Electronics Co., Ltd.). As another example, the display 41 can include a display like displays used on a smartphone (such as an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea). Other examples of the display 41 on the VST 40 are also possible.

As shown in FIG. 5, the display 41 can have a rectangular-like shape, such as a rectangle with square corners or a generally rectangular shape with rounded corners, but the display 41 is not limited to such shapes. For instance, the display 41 can have a circular or triangular shape within other examples. Further, in other examples, the VST 40 may include multiple displays (e.g., a front display and a back display).

The VST 40 further includes the user input section 42, which can include various types of input mechanisms for enabling a user to communicate with the VST 40. For instance, as shown in FIG. 5, the user input section 42 can include one or more input selectors, such as input keys 44, 45, 46, 47, and 48. The user input keys can be arranged in any of a variety of configurations. For instance, input key 44 can represent an up-direction selection, input key 45 can represent a right-direction selection, input key 46 can represent a down-direction selection, input key 47 can represent a left-direction selection, and input key 48 can represent an enter selection. Pressing one of the input keys can cause a display pointer 49 to move in a direction represented by the input key being pressed. Pressing the input key 48 can cause selection of a displayed data element to which the display pointer 49 is pointing. In other examples, the user input section 42 may include input controls arranged in other configurations, such as joysticks, touchpads, or other button layouts (e.g., a directional pad). In further examples, the VST 40 may include other components for receiving input from a user, such as a microphone to receive verbal commands or a camera for detecting motions of the user.

The processor 23 shown in the computing system 2 in FIG. 4 can execute program instructions of the CRPI 28 to cause the display 41 of the VST 40 to display one or more vehicle data parameter (VDP) graph windows or other information. A VDP graph window can represent information corresponding to one or more PIDs obtained from the vehicle 8. For instance, the VDP graph window can include a VDP line graph that represents parameters relating to a particular PID. The display 41 can display one or more VDP graphs using different size windows that are adjustable by a user. For instance, as shown in FIG. 5, the VST 40 can cause the display 41 to display VDP graph 50 shown in a rectangular window. In other examples, the display 41 can display vehicle parameters as digital values. Other examples are also possible.

The VDP graph 50 can include various elements, such as VDP line graph 51 representing parameters corresponding to a PID. The VDP graph 50 can also show graph text 52, which may include information such as a name of a parameter represented by the VDP line graph 51, a units identifier identifying the units of the VDP line graph 51 (e.g., volts, percent, or counts), and threshold ranges (e.g., minimum and maximum thresholds associated with a particular PID). In some instances, the minimum and maximum ranges can be restricted to the minimum and maximum values of the VDP line graph 51 currently displayed within the VDP graph 50. For instance, memory 27 can store minimum and maximum values for one or more vehicle parameters and use those stored minimum and maximum values to populate the graph text 52 when a parameter associated with minimum and maximum values is displayed by the display 41 on the VST 40.

The processor 23 can execute program instructions of the CRPI 28 to cause the display 41 to display one or more scroll bars, such as the scroll bar 53. The scroll bar 53 can be used to scroll through multiple graphs of parameters corresponding to various PIDs or other information displayable on the display 41. In further examples, the processor 23 can execute program instructions of the CRPI 28 to cause the display 41 to display a graph view slider that is configurable to modify a view of the graph of parameters corresponding to a given PID on the display 41.

The housing 43 can provide support or protection of components of the VST 40. As such, in some examples, the housing 43 can include hand grips 54, 55 to enable a user to hold the VST 40. The housing 43 can include one or more port openings (not shown) for connecting one or more communication links, such as the communication links 9, 11. In other examples, the housing 43 can have other configurations.

Figure 6:
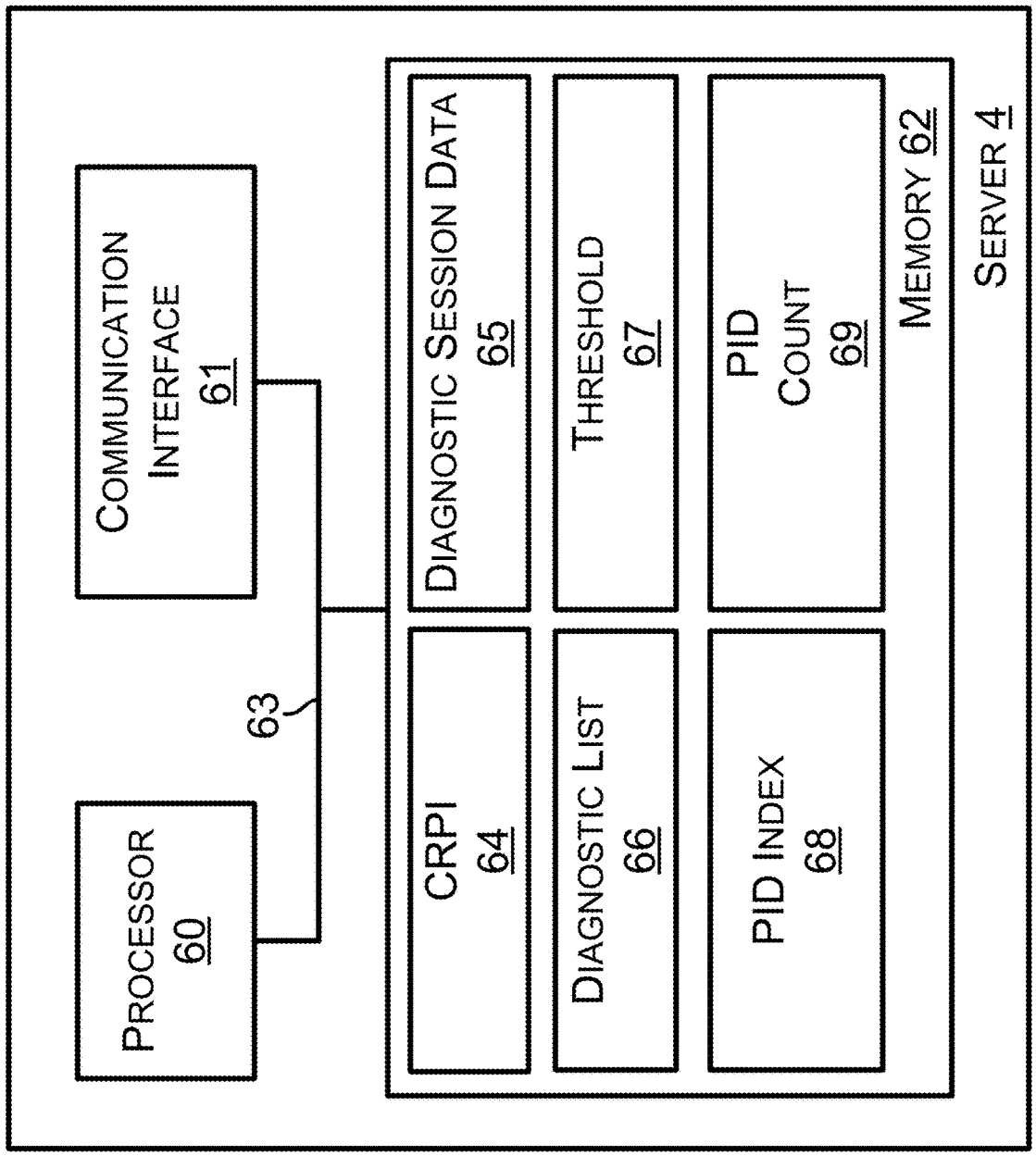
FIG. 6 is a block diagram of an example server.

Next, FIG. 6 is a block diagram of the server 4. Particularly, the server 4 comprises a processor 60, a communication interface 61, and a memory 62. Two or more of those components can be communicatively coupled or linked together via a system bus, network, or other connection mechanism 63. In other examples, the server 4 can include more or fewer components. The server 4 can include a power source. At least one of processor 60, the communication interface 61, and/or the memory 62 can comprise an electrically-operable component connected to the power source in the server 4.

The processor 60 can be configured to execute computer-readable program instructions (CRPI), such as CRPI 64 stored in the memory 62. The processor 60 can be configured to execute hard-coded functionality in addition to or as an alternative to software-coded functionality (e.g., via CRPI 64), and can be programmed to perform any function or combination of functions described herein as being performed by the server 4. Examples of the processor 60 are discussed above.

The memory 62 stores computer-readable data, such as the CRPI 64, diagnostic session data (DSD) 65, a diagnostic list 66, a threshold 67, PID index 68, and PID count 69. The memory 62 may correspond to various types of memory and may store other information within examples.

The DSD 65 can comprise data the server 4 can use to determine an operating state of the computing system 2. The data the server 4 uses to determine an operating state of the computing system 2 can include vehicle identifying information, data indicating an elapsed time since the server 4 last received a communication from the computing system 2, data indicating the most recent type of diagnostic list requested by and/or transmitted to the computing system 2, and/or data indicating a repair has been made to the particular vehicle.

The DSD 65 can comprise data indicative of the determined operating state of the computing system 2. Examples of the operating state include (i) the computing system 2 is connected to the server 4, (ii) the computing system 2 is not connected to the server 4 (i.e., disconnected from the server 4), (iii) the computing system 2 is connected to a particular vehicle (e.g., the vehicle 8), (iv) the computing system 2 is no longer connected to the particular vehicle (i.e., disconnected from the particular vehicle), (v) the computing system 2 is in a request and/or display diagnostic list mode for the particular vehicle, (vi) the computing system 2 has exited the request and/or display diagnostic list mode for the particular vehicle, and (vii) the computing system 2 has returned to the request and/or display diagnostic list mode for the particular vehicle.

The DSD 65 can also comprise data indicating a diagnostic session at the computing system 2 is active or inactive. The server 4 can determine a new diagnostic session is active upon receiving vehicle identifying information for a particular vehicle while the DSD 65 does not include data indicating a diagnostic session is active for the particular vehicle. The server 4 can determine an active diagnostic session for a particular vehicle has transitioned to inactive upon receiving vehicle identifying information for a different particular vehicle. The server 4 can determine an active diagnostic session for a particular vehicle has transitioned to an inactive session upon determining a threshold amount of time has elapsed since a particular activity of the active diagnostic session. As an example, the particular activity can comprise receiving a request from the computing system 2, receiving a communication indicating the computing system 2 is connected to the communication network 6 and/or transmitting a response with a diagnostic list 66 to the computing system 2. Other examples of the particular activity are also possible. The diagnostic list 66 may include OBD data or other information from the vehicle or vehicles. For instance, the diagnostic list 66 may indicate particular PIDs, functional tests, component tests, and/or reset procedures to display for a given symptom or set of symptoms for the vehicle 8. In other examples, the diagnostic list 66 may indicate which PIDs, functional tests, component tests, and/or reset procedures to display for any symptom.

The threshold 67 can comprise thresholds for PIDs. The thresholds for each PID can comprise a maximum data value and a minimum data value. The threshold 67 can comprise one or more thresholds for PIDs from each set of vehicles identifiable by some particular vehicle identifying information. In this way, the server 4 can provide the computing system 2 with applicable thresholds with respect to a particular vehicle connected to the computing system 2.

In one respect, the threshold 67 can comprise thresholds defined by a vehicle manufacturer. For a particular PID associated with a DTC, the vehicle manufacturer may define the maximum data value as the greatest data value for the particular PID an ECU would output while the associated DTC is set to inactive, and the vehicle manufacturer may define the minimum data value as the lowest data value for the particular PID the ECU would output while the associated DTC is set to inactive. In another respect, the threshold 67 can comprise thresholds determined by the server 4 from PID data values received within communications that include PID data values. The server 4 can store the received PID data values within the threshold 67 and determine the maximum and minimum data values for each PID for each set of vehicles identifiable by particular vehicle identifying information.

PID index 68 can include an indexed list of PIDs applicable to one or multiple vehicles and operation of the one or more vehicles. For instance, PID index 68 may include a variety of PIDs arranged according to one or more parameters associated with the PIDs. In some examples, the server 4 may store PIDs in the PID index 68 for a vehicle (e.g., the vehicle 8).

The server 4 can maintain a PID count 69 that indicates how many PID data values have been received and/or stored for a particular PID. The server 4 can compare the PID count to a first threshold PID count value stored in the threshold 67. If the server 4 determines that the PID count is less than the first threshold PID count value, the server 4 can produce a first threshold for the particular PID. As an example, the server 4 can determine the first threshold for the PID to be a mean maximum PID data value plus X standard deviations of the mean maximum PID data value and a mean minimum PID data value minus X standard deviations of the mean minimum PID data value. The mean maximum PID data value is the mean of maximum PID data values for the particular PID across vehicles identifiable by the particular vehicle identifying information with all DTC from the ECU that provides the particular PID set to inactive. The mean minimum PID data value is the mean of minimum PID data values for the particular PID across vehicles identifiable by the particular vehicle identifying information with all DTC from the ECU that provides the particular PID set to inactive.

As the server 4 continues to receive PID data values for the particular PID, the server 4 can determine the quantity of received PID data values for the particular PID exceeds the first threshold PID count value, but is less than a second threshold PID count value. In this situation, the server 4 can produce a second threshold for the particular PID. As an example, the server 4 can determine the second threshold for the PID to be a mean maximum PID data value plus X−1 standard deviations of the mean maximum PID data value and a mean minimum PID data value minus X−1 standard deviations of the mean minimum PID data value. The first threshold can be referred to a loose threshold with respect to the second threshold. The second threshold can be referred to as a tighter threshold with respect to the first threshold.

The server 4 can determine loose and tight thresholds in other manners. For example, before the server 4 has received a number of PID data values for the particular PID that exceeds the first threshold PID count value, the server 4 can add a first percentage of the mean maximum PID data value for the particular PID to that mean maximum PID data value or a first percentage of the maximum PID data value for the particular PID to that maximum PID data value. Furthermore, before the server 4 has received a number of PID data values for the particular PID that exceeds the first threshold PID count value, the server 4 can subtract a first percentage of the mean minimum PID data value for the particular PID from that mean minimum PID data value or a first percentage of the minimum PID data value for the particular PID from that minimum PID data value.

As the server 4 continues to receive PID data values for the particular PID, the server 4 can determine the quantity of received PID data values for the particular PID exceeds the first threshold PID count value, but is less than a second threshold PID count value. In this situation, the server 4 can add a second percentage of a mean maximum PID data value for the particular PID to that mean maximum PID data value or a second percentage of a maximum PID data value for the particular PID to that maximum PID data value, and the server 4 can subtract a second percentage of a mean minimum PID data value for the particular PID from that mean minimum PID data value or a second percentage of a minimum PID data value for the particular PID from that minimum PID data value. The second percentage can be smaller than the first percentage so that the thresholds determined using the second percentage is typically a tighter threshold range as compared to the thresholds determined using the first percentage.

The server 4 can provide the computing system 2 with a threshold or multiple thresholds for the particular PID without any tolerance values so that the computing system 2 does not need to calculate a threshold or thresholds to be displayed on a graphical interface of the computing system 2. Alternatively, the server 4 can provide the computing system 2 with a threshold or multiple thresholds for the particular PID with at least one tolerance value. The at least one tolerance value could, for example, be the first percentage or second percentage discussed above, or a value of the X standard deviations or the X−1 standard deviations. Other examples of the at least one tolerance value are also possible.

The CRPI 64 can comprise a plurality of program instructions. The CRPI 64 and any other CRPI described in this description can include data structures, objects, programs, routines, or other program modules that can be accessed by a processor and executed by the processor to perform a particular function or group of functions and are examples of program codes for implementing steps for methods described in this description. In general, the CRPI 64 can include program instructions to cause the server 4 to perform any function described herein as being performed by the server 4 or to cause any component of the server 4 to perform any function herein as being performed by that component of the server 4.

As another example, the CRPI 64 can include program instructions to perform session management with respect to the computing system 2. The processor 60 can use the DSD 65 to determine the operating state of the computing system 2. Upon and/or in response to determining the computing system 2 is in the request and/or display diagnostic list mode for the particular vehicle, the processor 60 can determine the requested diagnostic list and provide the computing system 2 with a response including the requested diagnostic list.

Upon and/or in response to determining the computing system 2 has exited the request and/or display diagnostic list mode for the particular vehicle and that a repair has been made to the particular vehicle, the processor 60 can provide a session-change response to the computing system 2 to direct the computing system 2 to display previously-displayed data, such as a diagnostic list 66. The session-change response can include the previously-displayed diagnostic list or the different diagnostic list.

Upon and/or in response to determining the computing system 2 has returned to the request and/or display diagnostic list mode for the particular vehicle, the processor 60 can provide a session-change response to the sever 4 or a display device to direct the computing system 2 to display a previously-displayed diagnostic list or a different diagnostic list.

A communication interface such as the communication interface 61 or any other communication interface discussed in this description can include one or more communication interfaces. Each communication interface can include one or more transmitters configured to transmit data onto a network, such as the communication network 6. The data transmitted by the communication interface 61 can comprise any data described herein as being transmitted, output, and/or provided by the server 4. Moreover, each communication interface can include one or more receivers configured to receive data carried over a network, such as the communication network 6. The data received by the communication interface 61 can comprise any data described herein as being received by the server, such as PIDs and PID data values and any request described herein.

A transmitter can transmit radio signals carrying data and a receiver can receive radio signals carrying data. A communication interface with that transmitter and receiver can include one or more antennas and can be referred to as a "radio communication interface," an "RF communication interface," or a "wireless communication interface." The radio signals transmitted or received by a radio communication interface can be arranged in accordance with one or more wireless communication standards or protocols such as an IEEE 802.15.1 standard for WPANs, a Bluetooth version 4.1 standard developed by the Bluetooth Special Interest Group (SIG) of Kirkland, Wash., or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (e.g., one or more signals or one or more electrical waves) carrying or representing data onto a wire (e.g., one or more wires) and a receiver can receive via a wire a signal carrying or representing data over the wire. The wire can be part of a network, such as the communication network 6. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a communication interface can include a destination identifier or address of a network device to which the data is to be transmitted. The data transmitted by a communication interface can include a source identifier or address of the system component including the communication interface. The source identifier or address can be used to send a response to the network device that includes the communication interface that sent the data.

A communication interface that is configured to carry out communications over the communication network 6, such as the communication interface 61, can include a modem, a network interface card, and/or a chip mountable on a circuit board. As an example the chip can comprise a CC3100 Wi-Fi® network processor available from Texas Instruments, Dallas, Tex., a CC256MODx Bluetooth® Host Controller Interface (HCI) module available from Texas instruments, and/or a different chip for communicating via Wi-Fi®, Bluetooth® or another communication protocol.

Next, FIG. 7 shows an example PID index 70, which comprises an ordered list of PIDs. Particularly, three example representations of PIDs are shown within the PID index 70, which represents the PIDs using PID numbers 71, index values 72, and PID names 73 (e.g., at least one word describing a PID). A different PID index (for use with the example embodiments) may represent PIDs using only one of those three example representations, a combination of any two of those three example representations, or with a different example PID representation. The VST 40 may use PID index 70 to display parameters related to a set of associated PIDs on the display 41.

The index values 72 can, for example, comprise decimal, hexadecimal, or numbers of some other base to represent the PIDs within the PID index 70. Other example PID indexes may comprise multiple PID indices, such as a separate PID index for each of multiple different set of particular identifying information (e.g., a separate PID index for each Y/M/M or Y/M/M/E). As such, the separate PID index can be arranged like the PID index 70 or in another manner. The PID index 70 can comprise or be associated with particular vehicle identifying information. The server 4 can provide a PID index to the computing system 2 for identifying suggested PIDs to request from the vehicle 8 to diagnose the vehicle 8.

III. Example Display Presentations

Figure 8:
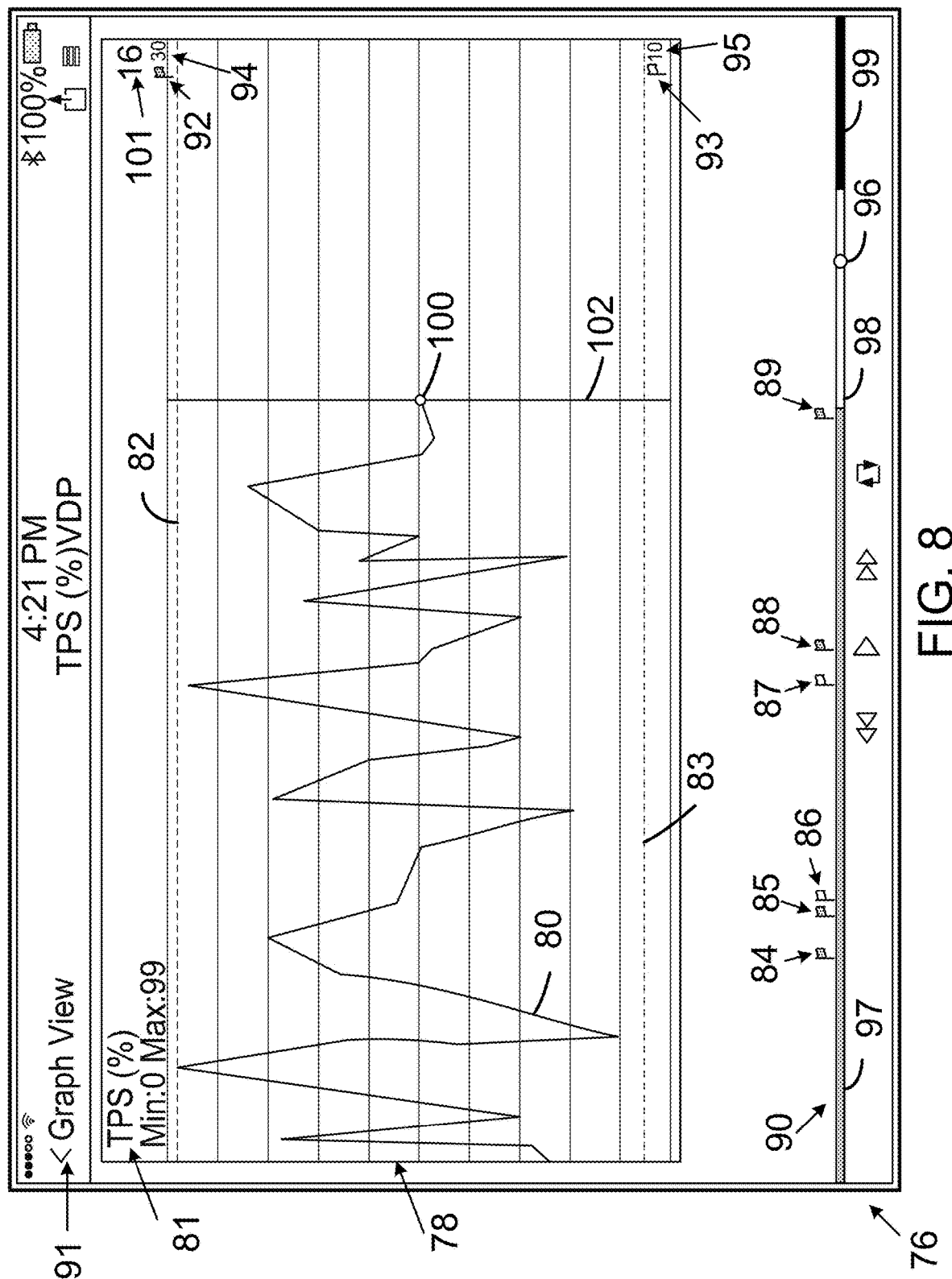
FIG. 8 is a diagram depicting an example display presentation.

Next, FIG. 8 is a diagram depicting an example display presentation (DP) 76 that the VST 40 can display on the display 41. The DP 76 is shown in a landscape orientation, but can have a vertical orientation in other examples. As such, the DP 76 includes a VDP graph window 78 with a VDP line graph 80, VDP graph text 81, and VDP threshold indicators 82, 83 placed on the VDP line graph 80. The DP 76 also displays vehicle operating condition indicators 84, 85, 86, 87, 88, and 89 along with a time-based indicator 90, and further includes a view selector 91 for selecting different views for a set of VDP, at least one of which can include a currently displayed VDP. Besides the graph view depicted in FIG. 8, other views can include, but are not limited to, a digital view and a list view.

The VDP line graph 80 is an example of a line graph in which the area below the line graph is not shaded. The VDP line graph 80 can represent parameters related to a particular PID, such as a first PID that is part of a set of associated PIDs. The VDP line graph 80 can include or be displayed with other information related to operation of the vehicle 8. That other information can comprise VDP graph text 81, for example. In general, the VDP graph text 81 can include graph text pertaining to any VDP associated with or from the vehicle 8. As an example, the VDP graph text 81 can comprise text indicative of a threshold that pertains to a particular vehicle component (e.g., a throttle position sensor (TPS) position) or a PID associated with that vehicle component. The threshold can specify its units, such as a percentage, volts or amperes.

The VDP threshold indicator 82 shown positioned above the VDP line graph 80 in the VDP graph window 78 may represent an upper VDP threshold associated with a TPS position percentage shown in the VDP graph text 81. Similarly, the VDP threshold indicator 83 may represent a lower VDP threshold associated with a TPS position percentage. In some example implementations, the VDP threshold indicators 82 and 83 can include visual indicators (e.g., horizontal lines) indicative of the thresholds. A VDP indicator, such as VDP threshold indicator 82 or 83, can also include a vehicle operating condition (VOC) indicator. A VOC indicator can have unique characteristics to distinguish it from a different type of VOC indicator. In addition, the VDP graph window 78 includes an upper threshold indicator 94 that indicates a numeric value of the upper threshold of the VDP displayed in the VDP graph window 78. The VDP graph window 78 includes a lower threshold indicator 95 that indicates a numeric value of the lower threshold of the VDP displayed in the VDP graph window 78.

As further shown in FIG. 8, the VOC indicator of the VDP threshold indicator 82 includes a dark-colored flag icon 92, whereas the VOC indicator of the VDP threshold indicator 83 includes a light-colored flag icon 93. The dark-colored flag icon 92 and the light-colored flag icon 93 are further discussed with respect to FIG. 10.

The time-based indicator 90 depicted in the DP 76 can represent various time segments on a display of the VST 40. In other examples, the time-based indicator 90 can have other positions or configurations. As shown, the time-based indicator 90 can include a cursor positioner 96 and time segments 97, 98, and 99 to convey time information to a user of the VST 40. The cursor positioner 96 can correspond to a cursor 100 positioned in the VDP graph window 78 and may also correspond to a digital VDP value 101 that indicates a current value of the VDP at the cursor 100. The DP 76 shows the time-based indicator near a bottom of the DP 76. The time-based indicator 90 could be displayed at other locations within a DP.

The time segment 97 provides an indication of an amount time or percentage that frames or data values for the displayed VDP were captured prior to the frames or data values of the VDP currently displayed within the VDP graph window 78, relative to the time segments 98 and 99. The time segment 98 provides an indication of an amount of time or percentage represented by the VDP values displayed within the VDP graph window 78, relative to the time segments 97 and 99. The time segment 99 provides an indication of an amount of time or percentage that the VST can receive additional frames or data values of the VDP before prior instances of the received VDP are overwritten or otherwise deleted for storage of additional frame or data values of the VDP, relative to the time segments 97 and 98.

The VDP line graph 80 can be zoomed in or out within the VDP graph window 78 via a user interface of the VST 40. As an example, the cursor positioner 96 can be moved in a first direction (e.g., to the right) in order to zoom in on the VDP line graph 80 and moved in a second direction (e.g., to the left) in order to zoom out on the VDP line graph 80. As another example, the cursor 100 or a cursor bar 102 could be moved in the first and second directions to zoom in and zoom out, respectively, of the VDP line graph 80. As another example, zooming in on a VDP line graph can include decreasing the time represented horizontally within the VDP graph window 78 and zooming out on a VDP line graph can include increasing the time representing horizontally with the VDP graph window 78. Alternatively, repositioning the cursor 100 or the cursor bar 102 can include representing a current value of a VDP at another position within the VDP graph window 78.

Figure 9:
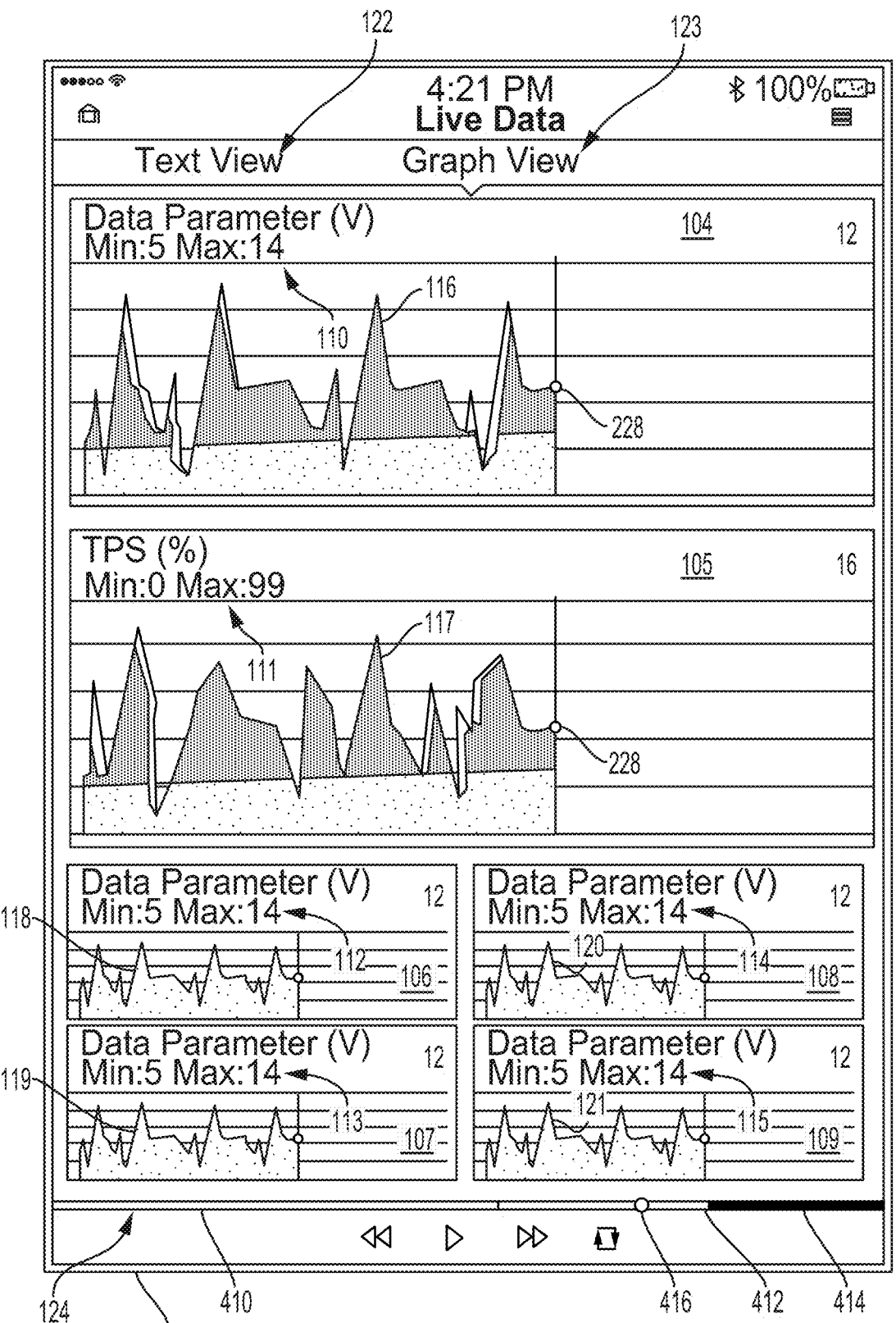
FIG. 9 is a diagram depicting another example display presentation.

Next, FIG. 9 is a diagram depicting another example display presentation 103 that the VST 40 may display on the display 41. The DP 103 is shown in a portrait orientation, but can be displayed in another orientation (e.g., landscape) within other examples. As such, the DP 103 displays VDP graph windows 104, 105, 106, 107, 108, and 109 that include VDP graph lines 116, 117, 118, 119, 120, and 121, and VDP graph text 110, 111, 112, 113, 114, and 115, respectively. Other examples are possible.

The VDP graph text 110-115 may provide text that identifies a different PID for each VDP graph window shown in the DP 103. For instance, the VDP graph text 110 may be associated with a particular PID and can specify units for the data values of the VDP graph line 116 and at least one of a minimum data value and a maximum data value. The minimum and maximum data values can indicate a low VDP threshold and a high VDP threshold, respectively, but are not so limited. For example the minimum and maximum data values can indicate a minimum data value and a maximum data value of the VDP currently displayed within the VDP graph window including or associated with the VDP graph text.

The DP 103 further includes a text view selector 122 and a graph view selector 123. While the display 41 of the VST 40 is displaying VDP graph windows in a graph view as shown in FIG. 9, the text view selector 122 can be selected by the display pointer, or otherwise (e.g., via a touchscreen interface or a voice command), to cause the display to begin displaying the VDP shown in one or more of the VDP graph windows 104, 105, 106, 107, 108, and 109, or the data represented therein, in a textual format. While the display is displaying VDP in a textual format, the graph view selector 123 can be selected by the display pointer or otherwise (e.g., via a touch screen, voice input) to cause the display to begin displaying the VDP graph windows 104, 105, 106, 107, 108, and 109.

The DP 103 includes the time-based indicator 124 with time segments 410, 412, 414, a cursor positioner 416, and a cursor 228 within each of the VDP graph windows 104, 105, 106, 107, 108, and 109. The cursor positioner 416 can be moved in either direction along the time-based indicator 124 to cause uniform movement of the cursor 228 within each of the VDP graph windows 104, 105, 106, 107, 108, and 109.

Figure 10:
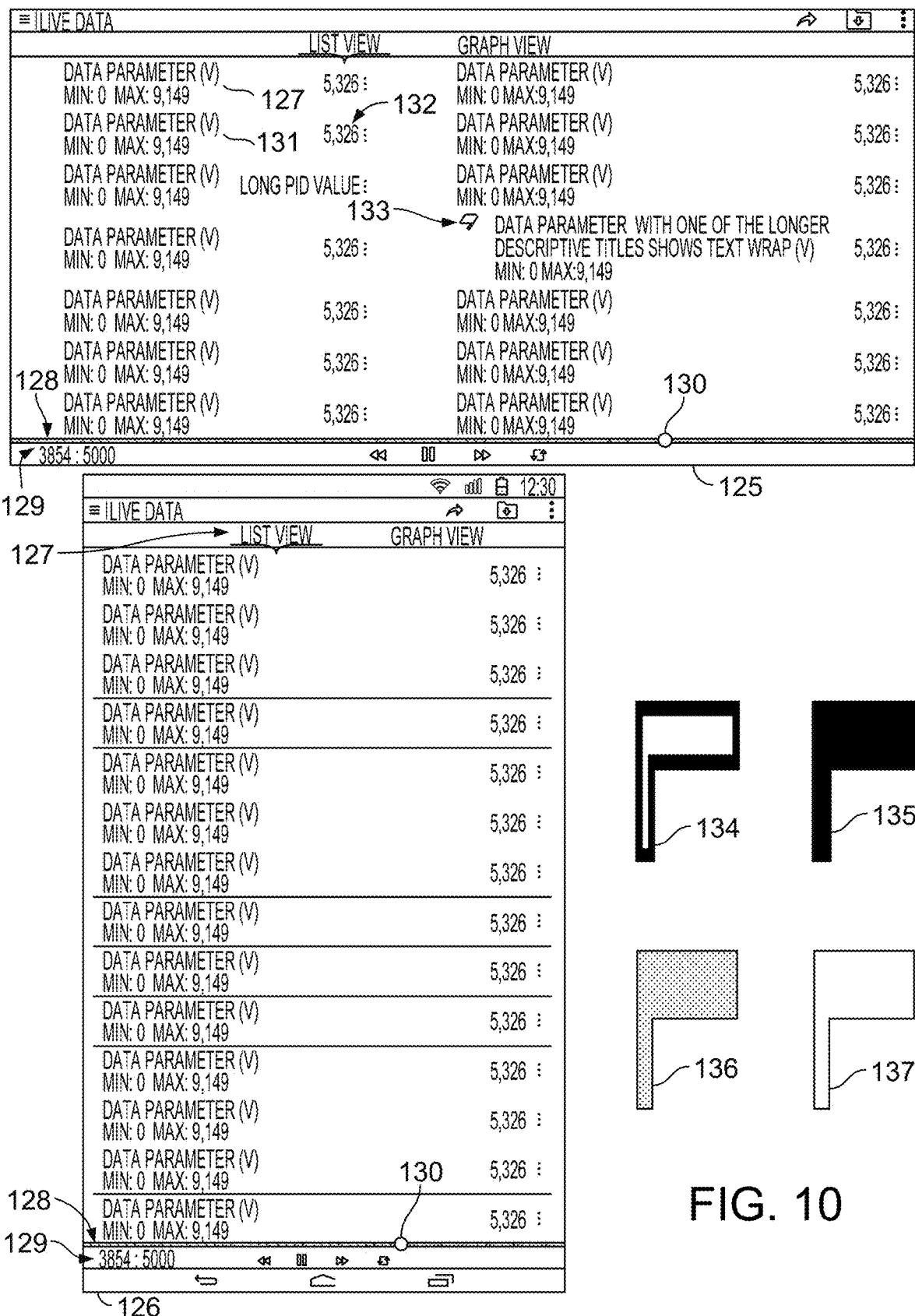
FIG. 10 is a diagram depicting multiple example display presentations.

Next, FIG. 10 is a diagram depicting example display presentations 125 and 126 that can be provided by a device via a display or graphical user interface. For instance, example devices that may display DPs 125, 126 can include the VST 40, a smartphone, or another type of device with a graphical user interface. The DPs 125, 126 include the DP selector 127 that can enable viewing a different VDP display presentation or displaying other information (e.g., a list of PIDs by selecting "LIST VIEW" or a graph of PIDs by selecting the "GRAPH VIEW". For instance, a selection of DP selector 127 causes DP 126 to display a different VDP display presentation (e.g., a list view presentation or graph view presentation). Either one of the DP 125 and the DP 126 may be entered from another type of view, such as a graph view or a digital view, by selection of the list view from a DP selector 127 in the other type of view.

Each of the DP 125 and the DP 126 include the time-based indicator 128 and a frame or data value indicator 129. As an example, the frame or data value indicator 129 indicates 3,834 of 5,000 frames or data values. In some cases, the VST 40 may have received an identical number of data values for each VDP identified in the list view of VDP. In accordance with those cases, the cursor positioner 130 can be moved to select a different frame or data value of the 5,000 frames or data values. In other instances, the VST 40 may receive a different number of data values for two or more VDP identified in a list view of VDP. In accordance with these other cases, the cursor positioner 130 can be moved to select a different frame or different value of the received frames or data values for a designated VDP. The data values for the other VDP can change to other data values in relation to the time at which the selected different frame or data value was received.

As shown in FIG. 10, a list view of VDP can include multiple VDP text identifiers (e.g., VDP text identifier 131) and multiple VDP values (e.g., VDP value 132). A VOC indicator 133 is displayed for a VDP for which data values of that VDP breeched a VDP threshold (e.g., greater than an upper threshold or lower than a lower threshold). The processor 23 can detect a drag-and-drop input of a VDP displayed in a list view and move the VDP from its initial position when the drag-and-drop input is initiated to a position that includes the location to which the VDP was dragged and dropped by the drag-and-drop input.

The DP 125 and the DP 126 can include at least one scroll bar for entry of a scroll input that causes virtual VDP values not currently displayed by the DP 125 or the DP 126 to be displayed and to cause one or more currently displayed VDP values to be repositioned as a virtual VDP value that is not currently displayed by the DP 125 or the DP 126.

The processor 23 can execute program instructions of the CRPI 28 to provide a VDP threshold selection display by the display 41. The selection display can include selection of a VDP. The selection display can include a selection of at least one VDP threshold associated with the selected VDP or the VDP threshold(s) can be selected by default upon selection of the VDP. The selection display can include a selection of a VOC indicator for a VDP or a VDP threshold or the VOC indicator selection can be selected by default upon selection of the VDP or the VDP threshold.

FIG. 10 further shows VOC indicators 134, 135, 136, and 137 as examples of VOC indicators displayable by the display 41 on the VST 40. As shown in FIG. 10 and in other figures, each VOC indicator can include a flag and flagpole icon, but the VOC indicators are not so limited. Furthermore, the display 41 can display the VOC indicators with different colors or shading to indicate various characteristics with respect to a VDP threshold or a VOC. In one respect, the VOC indicator 134 includes an outlined flag (e.g., a white flag outlined in red) and the VOC indicator 135 includes a solid flag (e.g. a red flag). An outlined flag can be displayed to indicate that a VDP threshold is armed, but that the VDP values received for the VDP have not yet breached the VDP threshold. A solid flag can be displayed to indicate that a VDP value received for the VDP has breached an associated VDP threshold that was armed. Arming a VDP threshold can occur by selecting the VDP for display, by selecting a VDP threshold for a VDP, or by another manner. Upon arming a VDP threshold, the processor 23 can compare the VDP the VST receives to determine if the VDP is associated with the VDP threshold and whether it breaches the VDP threshold.

Additionally, the display 41 can display text associated with a VDP (e.g., a PID) in proximity to a VOC indicator. The display 41 can display the associated text in various ways to further indicate whether a VDP threshold has been breached. For example, the text associated with the VDP can be blue when a VDP threshold is armed, but not yet breached, and the associated text can be red when the armed VDP threshold has been breached. The processor 23 can cause the associated text to change colors in response to detecting the VDP threshold being breached.

In another respect, the VOC indicator 137 (e.g., a white flag) can indicate that a VDP high threshold has been breached, whereas the VOC indicator 136 (e.g., a gray shaded flag) can indicate that a VDP low threshold has been breached. In yet another respect, if VDP thresholds have been set up and armed for multiple VDP, then a VOC indicator for each VDP can be associated with a respective color or respective shading to distinguish the VOC indicators for each of the multiple VDP. Other colors, visual representations, and configurations are possible.

Figure 11:
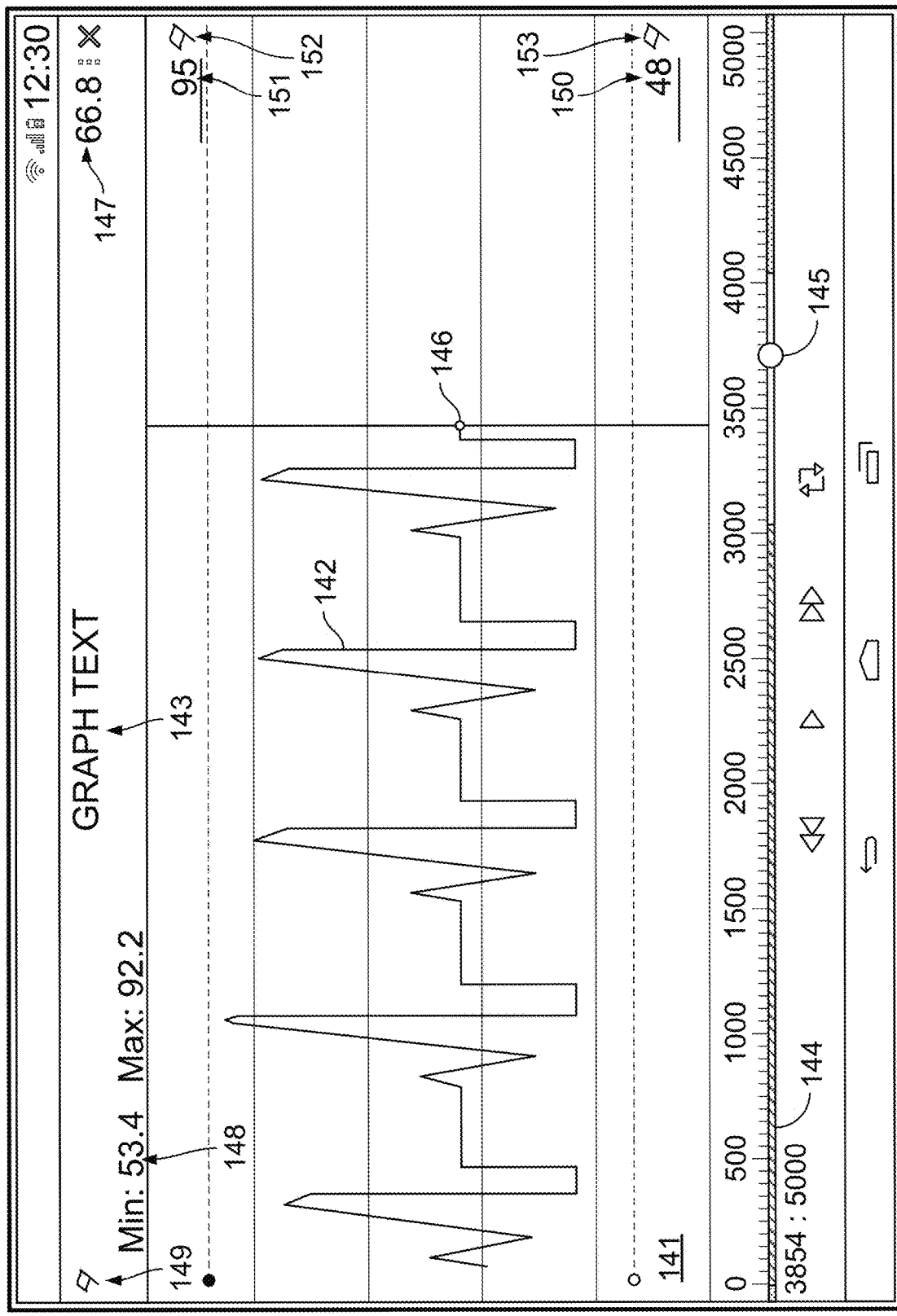
FIG. 11 is another diagram depicting an example display presentation.

Next, FIG. 11 is a diagram depicting an example display presentation 140 that can be provided by a display, such as the display 41 on the VST 40. The DP 140 includes a VDP graph window 141 with a VDP line graph 142 for a VDP identified by the VDP graph text 143. As such, the VDP graph window 141 includes the time-based indicator 144, the cursor positioner 145, and the cursor 146, and further includes a digital VDP value 147 that indicates a value of the VDP at the cursor 146. The VDP graph window includes thresholds that represent minimum and maximum values 148 of the VDP displayed in the VDP line graph 142 or of the VDP stored in the VDP for the VDP identified by the VDP graph text 143.

The VDP graph window 141 includes a threshold arm status icon 149. The threshold arm status icon 149 can include an empty flag icon (e.g., VOC indicator 134) when a threshold for the VDP indicated by the VDP graph text 143 is not armed. The processor 23 may not compare data values of the received VDP to a VDP threshold when the threshold is not armed. The VDP graph window 141 includes a lower threshold indicator 150 that indicates a numeric value of the lower threshold of the VDP displayed in the VDP graph window 141.

The VDP graph window 141 includes an upper threshold indicator 151 that indicates a numeric value of the upper threshold of the VDP displayed in the VDP graph window 141. The VDP graph window 141 includes a VOC indicator 152 associated with the upper threshold of the VDP and a VOC indicator 153 associated with the lower threshold of the VDP. Any one more other VDP graph windows described herein can include one or more of the elements included within the DP 140.

Figure 12:
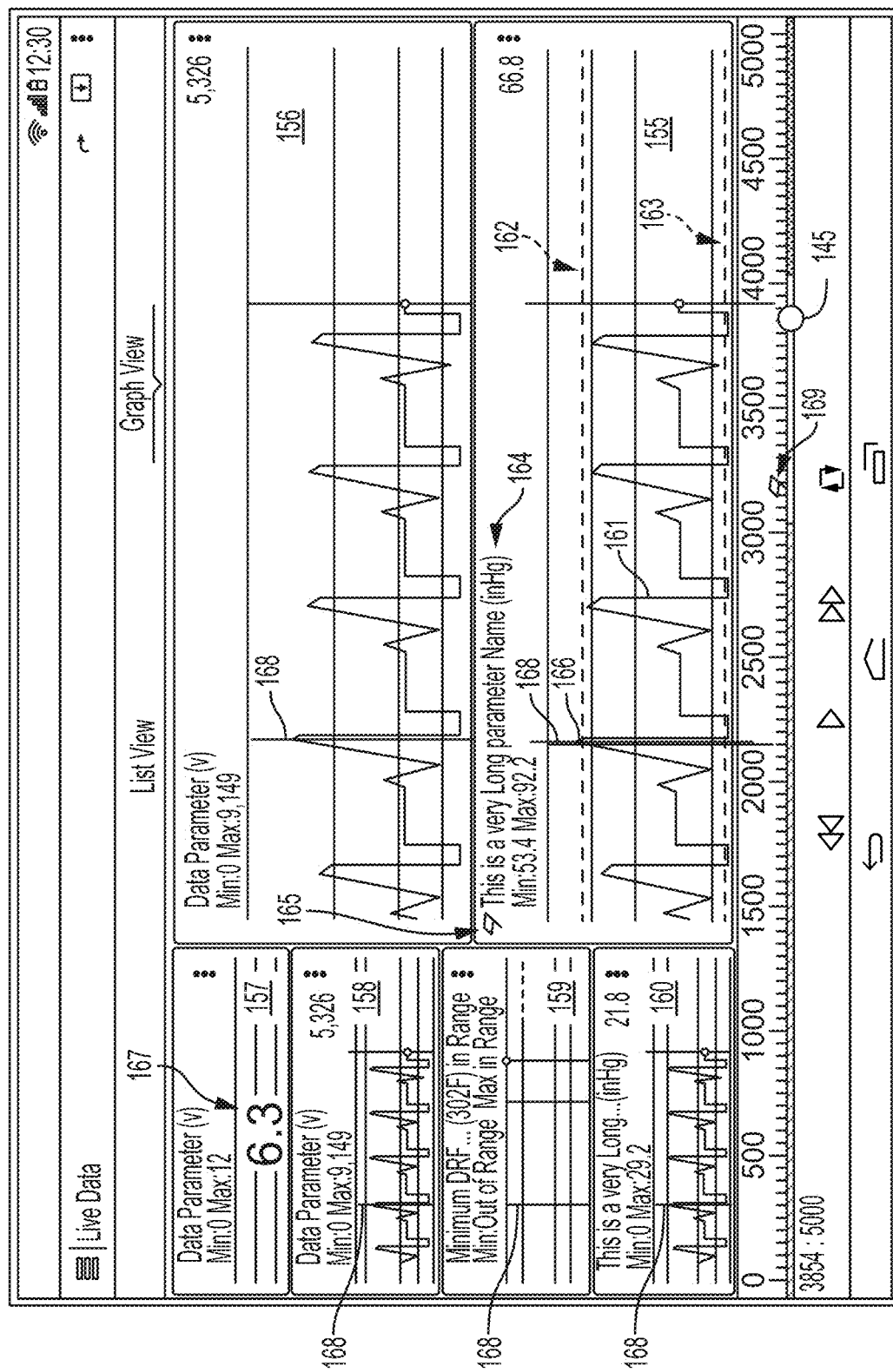
FIG. 12 is a diagram depicting another example display presentation.

Next, FIG. 12 is a diagram depicting an example display presentation 154 that can be provided by a display, such as the display 41 on the VST 40 or a graphical user interface on another computing system. The DP 154 includes the VDP graph windows 155, 156, 157, 158, 159, and 160 with corresponding VDP line graphs displaying parameters relating to a set of associated PIDs. For instance, the VDP graph window 155 includes the VDP line graph 161, the upper threshold indicator 162, and the lower threshold indicator 163, the VDP graph text 164, and the threshold arm status icon 165. In the DP 154, the threshold arm status icon 165 can include a solid (i.e., un-empty) flag of a second icon color (e.g., red) to indicate that the VDP threshold associated with the VDP represented by the VDP line graph 161 is armed and has been breached at the VDP value 166 of the VDP line graph 161.

The value and color of the digital value 167 within the VDP graph window 157 can change as the cursor positioner 145 is repositioned. For example, the color of the digital value 167 can be the same as the first color of the threshold arm status icon 165 when the VDP threshold associated with that icon is not breached and can be the same as the second color of the threshold arm status icon 165 when the VDP threshold associated with that icon is breached. In one respect, the color of the digital value can be the second color if the cursor positioner is positioned at position representing a time when the VDP threshold was initially breached. In another respect, the color of the digital value can be the second color if the cursor positioner is positioned at a position representing any time when the VDP threshold remained breached. The VDP graph text within the VDP graph window can be the same as color of the digital value 167. The DP 154 includes the time-based indicator and the cursor positioner 145.

Upon a VDP threshold for a PID being breached, a VOC indicator 169 can be displayed in proximity to the time-based indicator 144. When the VOC indicator 169 is displayed in proximity to the time segment, the VDP value is displayed within the VDP graph window along with a VOC indicator bar 168. VOC indicator bars 168 are also displayed within the VDP graph windows to indicate a location with those VDP graph windows that corresponds to a time at which the VDP threshold was breached at the VDP value. Any one more other VDP graph windows described herein can include one or more of the elements included within the DP 154.

Figure 13:
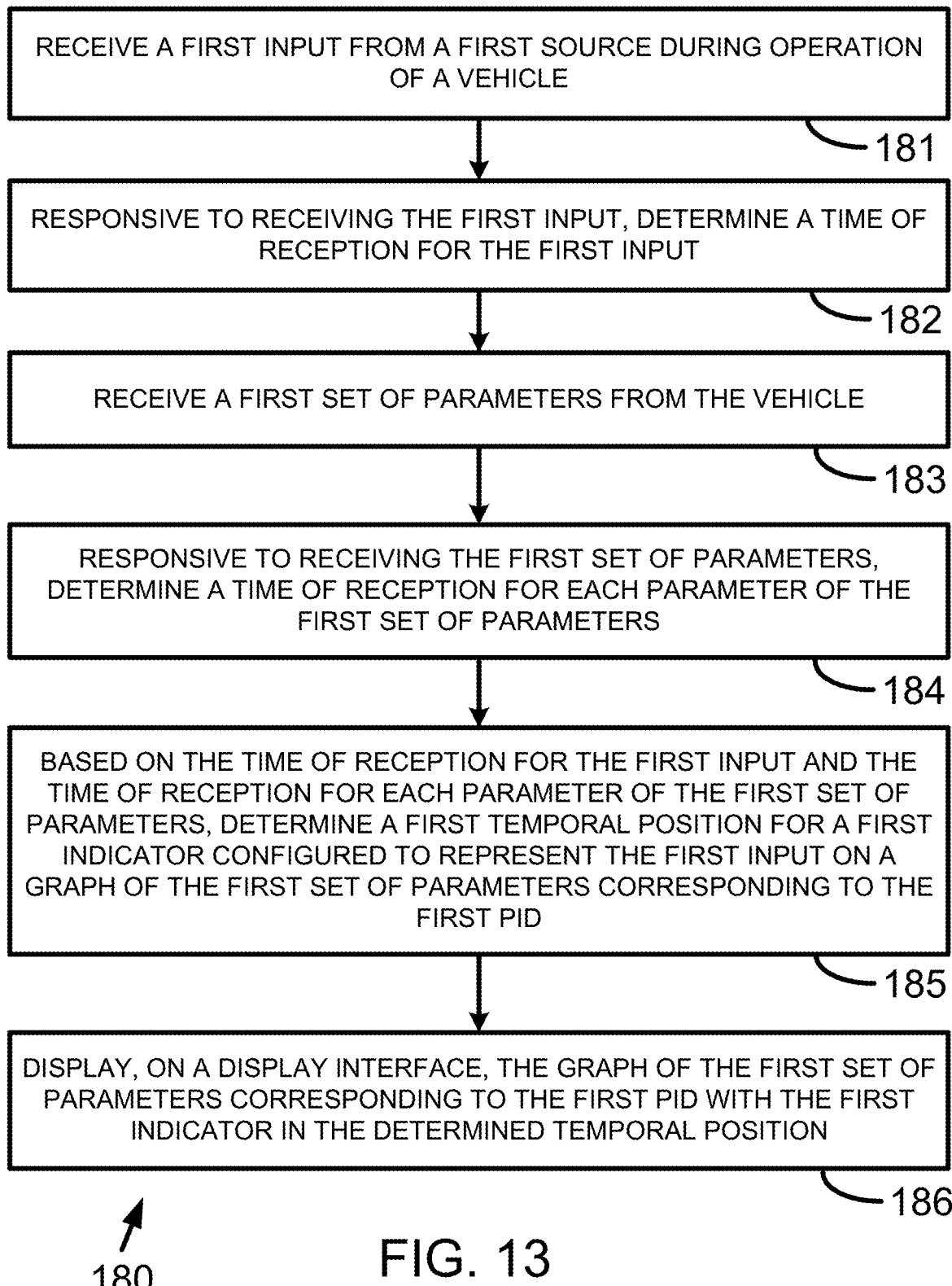
FIG. 13 is a flowchart depicting a set of functions that can be carried out in accordance with the example embodiments.

FIG. 13 shows a flowchart depicting a set of functions 180 (or more simply "the set 180") that can be carried out in accordance with the example embodiments described in this description. The set 180 includes the functions shown in blocks labeled with whole numbers 181 through 186 inclusive. The following description of the set 180 includes references to elements shown in other figures described in this description, but the functions of the set 180 are not limited to being carried out only by the referenced elements. A variety of methods can be performed using all of the functions shown in the set 180 or any proper subset of the functions shown in the set 180. Any of those methods can be performed with other functions such as one or more of the other functions described in this description.

Block 181 includes receiving a first input from a first source during operation of a vehicle. The computing system 2 or another type of computing system (e.g., smartphone, wearable computing system) may receive the first input as well as other inputs during operation of the vehicle. The first input and other inputs can correspond to user inputs, sensor data, or other forms of measurements.

The computing system 2 may receive inputs from various sources, including user interfaces, and internal and external sensors, among others sources. For example, the computing system 2 can receive electrical measurements, such as electrical current measurements or voltage measurements from one or more sensors capturing measurements during operation of the vehicle.

As such, the computing system 2 may receive inputs using various techniques within examples. For instance, in some embodiments, the computing system 2 may receive a vocal input representing the first input (and other inputs from the user) from a microphone. Particularly, the microphone may be part of the computing system 2 or a corresponding device. For instance, the microphone can be an external microphone that a user positions on or inside the vehicle to capture audio, such as audio provided by the user. As such, the computing system 2 may further determine text that represents the vocal input using speech recognition. The determined text and/or vocal input can be stored by the computing system 2 for subsequent access by the user, another user, or a system to analyze. For instance, the computing system 2 may store determined text and/or vocal inputs in audio recordings 33 in memory 27.

In some examples, receiving the first input from a first source during operation of the vehicle can involve receiving a touch input representing the first input from a touchscreen interface. Similarly, the computing system 2 may receive the first input via a button input at an input interface.

In further examples, the computing system can receive the first input from an external camera or a camera system in general. For instance, a camera can be part of a vehicle instrument panel cluster (IPC) that can capture images or video of the dash, including when a malfunction indicator lamp illuminates during the test drive. The first input can also correspond to images or video of the driver and/or a view of the path traveled (e.g., a forward facing camera). In some cases, the computing system can receive a combination of inputs from multiple cameras.

Block 182 includes, responsive to receiving the first input, determining a time of reception for the first input. The computing system 2 can determine that the time of reception for the first input corresponds to a given time when the computing system 2 receives the first input from the first source.

In some examples, determining the time of reception for the first input can depend on the method of reception for the first input. For example, when the first input corresponds to a vocal input, the computing system 2 may determine when the microphone detected and received the audio input. When the vocal input is substantial in duration (e.g., over 30 seconds), the computing system 2 may determine that the time of reception corresponds to when the microphone initially started receiving the vocal input, when the microphone completed receiving the vocal input, or a middle portion of the vocal input, for example. In further examples, the computing system 2 can include an option that allows a user to decide when the time of reception should be determined for vocal inputs that are substantial in duration.

In some instances, determining the time of reception for the first input can involve determining when the touchscreen interface associated with the computing system 2 detected the touch input from the user.

Block 183 includes receiving a first set of parameters from the vehicle. The computing system 2 can receive vehicle data parameters (VDP) from the vehicle 8 via a wired or wireless connection. As such, the VDP may represent information corresponding to a number of related PIDs that form the set of associated PIDs. In some instances, the set of associated PIDs may be based on a PID index 68 received from the server 4. In further examples, the set of associated PIDs may be based on a user selecting a set of PIDs within a request from the vehicle 8. Within examples, the association between PIDs can vary. For instance, the association between the PIDs can depend on particular vehicle operations or predefined relationships between the PIDs. Other examples are possible.

The PIDs can represent different operations of the vehicle. For instance, the PID value can include information indicating specified values of parameters associated with a vehicle component (e.g., sensor values).

In some examples, the computing system 2 can correspond to the VST 40 described in FIG. 5 and can be configured to obtain the VDP from the vehicle 8 in the form of a vehicle data message (VDM) (e.g., a serial data message). For instance, the VST 40 may use the DLC or another component to communicate with the vehicle 8 to obtain the VDP that describe operations of the vehicle 8. As an example implementation, the VST 40 may receive the VDP from the vehicle 8 in the form of an electrical signal.

In some examples, the computing system 2 can receive the first set of parameters from an on-board diagnostics (OBD) II reporting system of the vehicle operating in OBD II, mode $01. In further examples, the computing system 2 can receive the first set of parameters from an OBD reporting system of the vehicle operating in OBD II, mode $02. Particularly, the first set of parameters can include sensor data recorded at a given time of a detected fault of the vehicle. In further examples, the computing system 2 can switch between receiving the parameters from the OBD II reporting system of the vehicle operating in mode 1, mode $02, and other OBD II modes.

Block 184 includes responsive to receiving the first set of parameters, determining a time of reception for each parameter of the first set of parameters. Particularly, the computing system 2 can determine times of receptions for all (or a subset) of parameters of the first set of parameters. The time of reception for each parameter can represent when the parameter occurred during operation of the vehicle.

Block 185 includes, based on the time of reception for the first input and the time of reception for each parameter of the first set of parameters, determining a first temporal position for an indicator configured to represent the first input on a graph of the first set of parameters corresponding to the first PID. The indicator, for example, can be displayed as a vertical cursor on the graph of the first set of parameters corresponding to the first PID.

In some examples, the computing system 2 may be the VST 40 represented in FIG. 5 or communicate with the VST 40. As such, the VST 40 may determine indicators displayable on one or more VDP line graphs corresponding to the first PID. For instance, the indicators can be displayed in various representations, such as vertical cursors or other forms of indicators comprising particular information relating to PIDs. The indicators may be selectable via a cursor, touchscreen, or other method on the VST 40.

Block 186 includes displaying, on a display interface, the graph of the first set of parameters corresponding to the first PID with the indicator in the first temporal position. For example, the computing system 2 can display the indicator in the first temporal position such that the indicator is displayed at a beginning of a subset of parameters of the first set of parameters that correspond to the first PID. In another example, the computing system 2 can display the indicator in the first temporal position such that the indicator is displayed at an end of a subset of parameters of the first set of parameters that correspond to the first PID. In a further example, the computing system 2 can display the indicator in the first temporal position such that the indicator is displayed in between a subset of parameters of the first set of parameters that correspond to the first PID.

The set of 180 can further include determining a threshold for the first PID, and determining a temporal position for a second indicator that represents a parameter corresponding to the first PID breaching the threshold for the first PID. Particularly, the second indicator may correspond to a vertical line or another type of visual symbol. As such, when the computing system 2 displays the graph of the first set of parameters corresponding to the first PID with the indicator in the first temporal position, the computing system 2 may further display the graph of the first set of parameters corresponding to the first PID with the second indicator and the indicator arranged on the graph based on a temporal order that depends on the temporal position for the second indicator and the first temporal position for the indictor.

In some examples, the set 180 may further include additional operations, such as receiving a selection of the indicator configured to represent the first user input. A user servicing the vehicle may review and select previously provided user inputs. As such, in response to receiving a selection of a given indicator representing a user input (e.g., the first user input), the computing system 2 or corresponding device may display information related to the selected user input, such as text the represents the vocal input associated with the user input. For example, when the computing system 2 detects a selection of a user input that includes a corresponding text description, the computing system 2 can display the text in a popup box or another format enabling a user to review the text. The computing system 2 may further store and subsequently display edited text, which can be associated with the original user input in memory.

In further examples, displaying text associated with a user input (e.g., text determined via speech recognition from an audio input provided by a user during vehicle operation) can involve providing options to edit the text. As a result, the original user or another user can edit the text, including adding additional notes or explanation regarding the original user input. In some examples, the computing system 2 may also enable text threads to be created regarding an original user input. A text thread may allow multiple users to contribute text regarding a user input, such as a linear thread that captures dates when each addition was contributed to the text thread. This way, multiple users can review user inputs, add notes regarding the user inputs, and these notes can be saved and stored as a linear progression over time.

In some examples, the set of 180 can further involve determining a symbol that corresponds to the indicator based on determining the temporal position for the indicator configured to represent the first input on the graph of the first set of parameters corresponding to the first PID. Particularly, the symbol may represent the first input and can depend on various factors, such as information included within the first input. As such, the computing system 2 may further display the symbol relative to a graph view slider on a display interface. For instance, the computing system 2 can display the symbol at a position relative to the graph view slider that is based on the temporal position for the indicator. Further, the graph view slider can be configurable to modify a view of the graph of the first set of parameters corresponding to the first PID. As a result, the computing system 2 can receive a selection of the symbol that correspond to the indicator and responsively modify a view of the graph of the first set of parameters corresponding to the first PID such that the view of the graph displays a portion of the graph that includes the indicator that represents the first user input.

The computing system 2 can further include additional inputs. For instance, the computing system 2 can receive a second input from a second source during operation of the vehicle. Responsive to receiving the second input, the computing system 2 can determine a time of reception for the second input. As such, the computing system 2 can determine a second temporal position for a second indicator configured to represent the second input on the graph of the first set of parameters corresponding to the first PID based on the time of reception for the first input, the time of reception for the second input, and the time of reception for each parameter of the first set of parameters. As a result, the computing system 2 can display the graph of the first set of parameters corresponding to the first PID with the indicator in the first temporal position and the second indicator in the second temporal position on the display interface.

In additional examples, the computing system 2 can receive indications of particular inputs. For example, during operation of a vehicle, the computing system 2 may provide multiple options to a user to utilize to provide or capture inputs that can be stored and subsequently reviewed by the user (or another user) during servicing the vehicle. To illustrate, a touchscreen interface of the computing system 2 may include various options, such as options to specify the degree of urgency associated with each input. For instance, the interface can enable a user to specify when an input is important resulting in the computing system 2 storing the input and subsequently displaying the input with a symbol that represents the importance. Similarly, the interface can also include enable a user to specify when a input has a low degree of urgency causing the computing system 2 to later associate and display these inputs with a different symbol that represents their low level of importance.

In other examples, the computing system 2 can further include an option to review a log that represents all (or a subset) of inputs captured during one or multiple rounds of operation by a vehicle in a temporal order. As a result, the user can determine different information about a test operation of a vehicle using the log, such as whether the user or sensors provided more inputs during a particular portion of the test operation than other portions of the test operation. This can then enable the user to focus upon inputs and VDP graphs during a particular period of a test operation. In addition, the computing system 2 can provide options to associate particular tests (e.g., component tests, functional tests, and reset procedures) with inputs. For example, a user can select and assign a test to an input upon reviewing the input. In some instances, the server 4 or the computing system 2 can select and assign a test to an input after analyzing the input.

In some examples, the computing system 2 can be coupled to the vehicle during performance of one or more blocks of the set of 180. Particularly, the computing system 2 can be coupled to the vehicle via a wired connection or a wireless connection. In some instances, the computing system 2 can be coupled to the vehicle during a subset of the blocks of the set of 180.

In further examples, the computing system 2 can programmatically perform one or more functional tests on the vehicle 8. For example, the computing system 2 can perform one or more functional tests after a test drive of the vehicle 8. The functional tests performed by the computing system 2 can depend on certain conditions detected by the computing system 2 during the test drive. The computing system 2 could be configured to initiate one or more functional tests upon detecting the completion of the test drive and in response to determining that the vehicle 8 is in a state suitable for the functional tests.

In some examples, the computing system 2 can perform one or more functional tests during a test drive of the vehicle 8. For example, prior to the test drive, the computing system 2 can display a list of one or more functional tests to be performed during the test drive if the computing system 2 detects certain conditions. In this way, a driver of the vehicle can be made aware of which functional test(s) may be performed to avoid being surprised during the test drive. The certain conditions detected by the computing system 2 can include precautionary conditions that ensure the functional tests are performed safely. For example, the computing system 2 could require the vehicle 8 to be in an initial state before starting and performing a functional test (e.g., the vehicle 8 is stationary with the brakes applied). The initial state of the vehicle 8 required by the computing system 2 before performing a functional test could depend on the type of functional test performed. As such, the computing system 2 can be configured to stop performing a functional test upon detecting a change in the conditions that permits the performance of the functional (e.g., the brakes are no longer applied). The conditions can depend on sensor data from a variety of vehicle sensors or other types of sensors communicating with the computing system 2.

In addition, the computing system 2 can include a prompt to have the driver acknowledge the functional test(s) to be performed during the test drive prior to performing the functional test(s). Furthermore, the computing system 2 can be programmed such that a functional test would not be performed during a test drive when certain conditions are met (e.g., the vehicle is in motion). System software associated with the computing system 2 (e.g., instructions of the CRPI 28) can drop flags during the test drive that enable a user to review the software-initiated flags after completion of the test drive. In addition, the computing system 2 may initiate a functional test based on sensor data. For example, the computing system 2 may review and analyze sensor data and PID data (e.g., a PID threshold breach) to determine a functional test to perform. In some examples, the computing system 2 can perform a mass air flow sensor test, power on or off headlights, and/or power on or off other sensors, such as cameras, microphones, etc.

In further examples, capturing information regarding operation of one or more systems may involve a sensor or sensors analyzing wheel speed PIDs and identifying when one or more PIDs vary by a significant amount (e.g., a threshold speed). These measurements may enable a user to subsequently detect vehicle turns during review of PIDs or when tires on the vehicle have different sizes possibly due to improper tire inflation or wear.

In another example, a camera can detect a threshold breach and subsequently provide an image to the computing system 2. For example, a thermal camera can detect temperatures at a vehicle component that exceed typical temperatures for the component. As a result, the thermal camera can capture and provide thermal images to the computing system 2. The computing system 2 could note the location of the vehicle using GPS or another sensor upon receiving the thermal image from the thermal camera. This way, the user could analyze the vehicle location along with the thermal image when reviewing operation of the vehicle during the test drive. In other examples, the computing system 2 can also capture one or more related PID value(s) upon receiving the thermal image from the thermal camera. In some instances, a user may be prompted or allowed to preselect a component so that the computing system 2 selects PIDs for the component in such a situation. Further, the thermal camera or another camera could be aimed at the preselected component prior to the start of the test drive. Similar examples may involve other sensors communicating to trigger and obtain measurements and PIDs related to operations of the vehicle.

Additional methods including the functions of set 180 can be performed to display and use PID graph indicators.

A first additional method including the functions of the set 180 includes: receiving, by the computing system, a selection of the indicator configured to represent the first user input; and responsive to receiving the selection of the indicator, displaying, by the computing system on the display interface, the text that represents the vocal input. For instance, the computing system 2 can receive vocal inputs representing one or multiple user inputs and corresponding determine text to subsequently display for these user inputs.

A second additional method including the functions of the set 180 includes: (i) based on determining the temporal position for the indicator configured to represent the first user input on the graph of the first set of parameters corresponding to the first PID, determining a symbol that corresponds to the indicator; and (ii) displaying, by the computing system on the display interface, the symbol relative to a graph view slider, wherein the symbol is displayed at a position relative to the graph view slider that is based on the temporal position for the indicator, and wherein the graph view slider is configurable to modify a view of the graph of the first set of parameters corresponding to the first PID. The second additional method can further include: (i) receiving, at the computing system, a selection of the symbol that corresponds to the indicator; and (ii) responsive to the receiving the selection of the symbol, modifying a view of the graph of the first set of parameters corresponding to the first PID such that the view of the graph displays a portion of the graph that includes the indicator that represents the first user input.

A third additional method including the functions of the set 180 includes: (i) determining, by the computing system, a threshold for the first PID; (ii) determining, by the computing system, a temporal position for a second indicator that represents a parameter corresponding to the first PID breaching the threshold for the first PID; and (iii) wherein displaying, by the computing system on the display interface, the graph of the first set of parameters corresponding to the first PID with the indicator in the first temporal position comprises: displaying the graph of the first set of parameters corresponding to the first PID with the second indicator and the indicator arranged on the graph based on a temporal order that depends on the temporal position for the second indicator and the first temporal position for the indictor.

Figure 14:
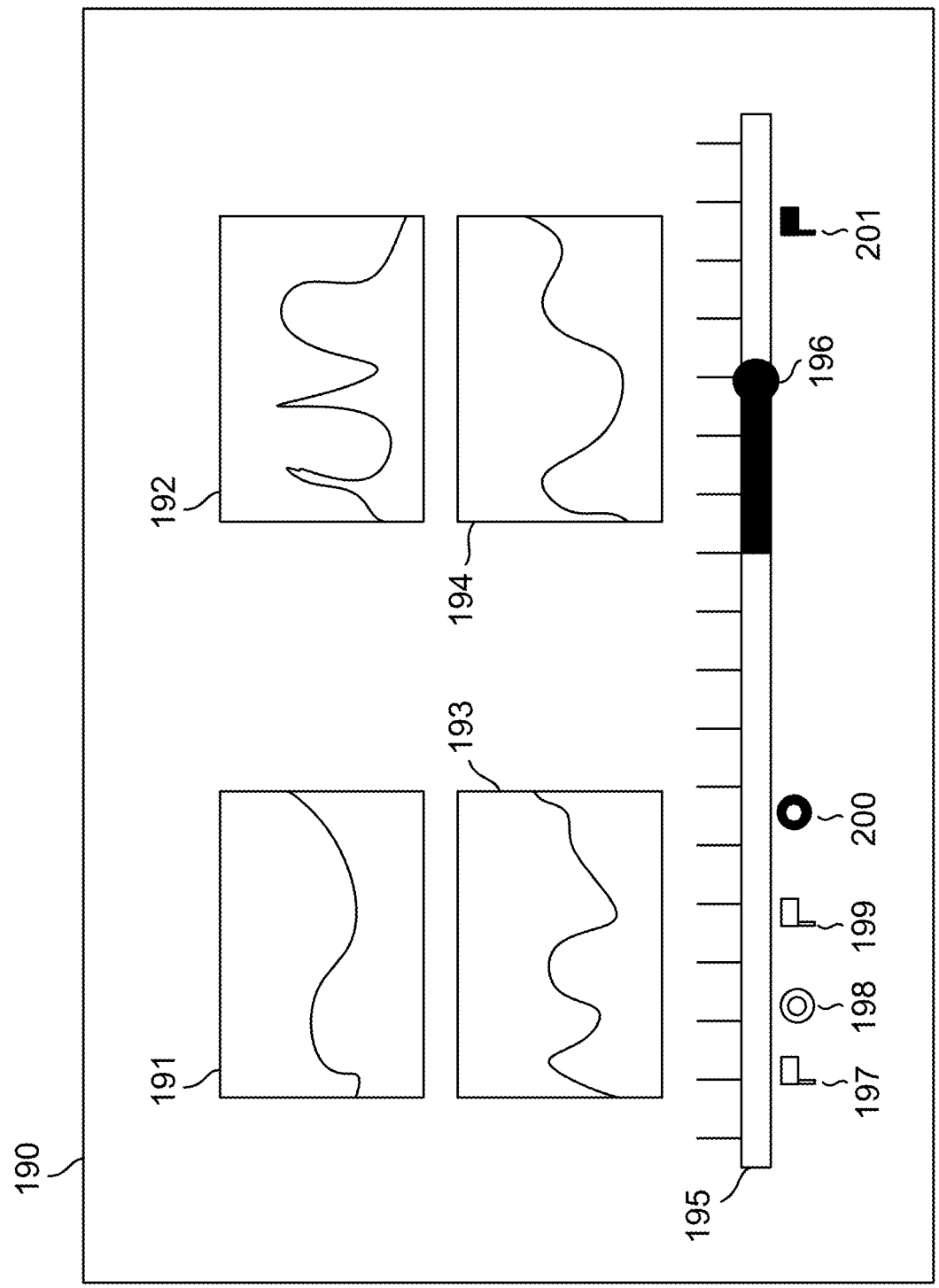
FIG. 14 is a diagram depicting an example display presentation.

FIG. 14 is a diagram representing depicting an example display presentation 190. As shown, the display presentation 190 includes a first VDP line graph 191, a second VDP line graph 192, a third VDP line graph 193, and a fourth VDP line graph 194. The display presentation 190 also includes a graph view slider 195 with a selector 196 that enables a user to modify a view of the VDP line graphs 191-194. In addition, the display presentation 190 also includes symbol indicators 197-201.

The display presentation 190 can represent a display that the computing system 2 might display via performing one or more blocks of the set 180. For example, the computing system 2 can receive user inputs during operation of a vehicle and responsively formulate the display presentation 190 for the user after obtaining VDP from the vehicle. In particular, the computing system 2 can determine a temporal position for each symbol indicator (e.g., symbol indicator 198, 200) that represents user inputs relative to other symbol indicators (e.g., symbol indicators 197, 199, 201) that represent vehicle information related to PIDs (e.g., threshold breaches).

The display presentation 190 shows multiple VDP line graphs 191-194. Each VDP line graph can represent different PIDs corresponding to various systems of a vehicle. In other examples, VDP line graphs 191-194 can all represent different aspects of the same PID or same vehicle system. Other examples are possible.

Each VDP line graph 191-194 can express vehicle information (e.g., VDP) related to a duration of time. Particularly, the VDP line graphs 191-194 can all represent different VDP or vehicle information that correspond to the same time frame of operation of the vehicle. The graph view slider 195 can modify the view of all (or a subset) of the VDP line graphs 191-194 by adjusting the position of the selector 196. For example, sliding the selector 196 forward (i.e., to the right) on the graph view slider 195 can cause all (or a subset) of the VDP line graphs 191-194 to display VDP or other vehicle information at a more recent time period than the time period currently represented by the VDP line graphs 191-194. Similarly, sliding the selector 196 backward (i.e., to the left) on the graph view slider 195 can cause all (or a subset) of the VDP line graphs 191-194 to display VDP or other vehicle information at a prior time period than the time period currently represented by the VDP line graphs 191-194. In some examples, the computing system 2 can enable a user to select a particular VDP line graph to only modify the view of the selected VDP line graph using the selector 196 and the graph view slider 195.

In some examples, the symbol indicators 197-201 can each have a corresponding indicator positioned on a VDP line graphs 191-194 at a given time that each symbol indicator 197-201 represents. For example, the symbol indicator 197 might represent a threshold breach of a threshold determined for a given PID. As such, on the VDP graph representing the PID, the symbol indicator 197 can have an indicator (e.g., a vertical line) when the breach occurred. In turn, the computing system 2 could automatically display an indicator on a VDP line graph (e.g., modify the time period represented by the VDP line graph to display a time frame that includes the indicator) in response to detecting a selection of the corresponding symbol indicator by the user. For instance, in response to detecting a selection of symbol indicator 199 representing a breach, the computing system 2 can modify the time frame of one or multiple VDP line graphs such that the indicator representing the time of occurrence of the breach is shown on the one or more VDP line graphs.

In further examples, selection of a symbol indicator representing a user input (e.g., symbol indicator 198, 200) can cause the computing system 2 to modify the view displayed by one or more VDP line graphs 191-194. For example, the computing system 2 can detect a selection of the symbol indicator 200 by a user and responsively cause the VDP line graphs 191-194 to display a time frame that encompasses the time of reception of the user input represented by the symbol indicator 200. Similarly, detection of a user selection of the symbol indicator 198 representing a different user input can cause the computing system 2 to modify the VDP line graphs 191-194 (or a subset of the VDP line graphs) to display a time frame that encompasses the time of reception of that user input. This way, a user can quickly review user inputs. In further examples, selection of symbol indicators representing user inputs (e.g., the symbol indicators 198, 200) can cause text, audio, or other information related to the original user input to be displayed (e.g., in a popup box).

Figure 15:
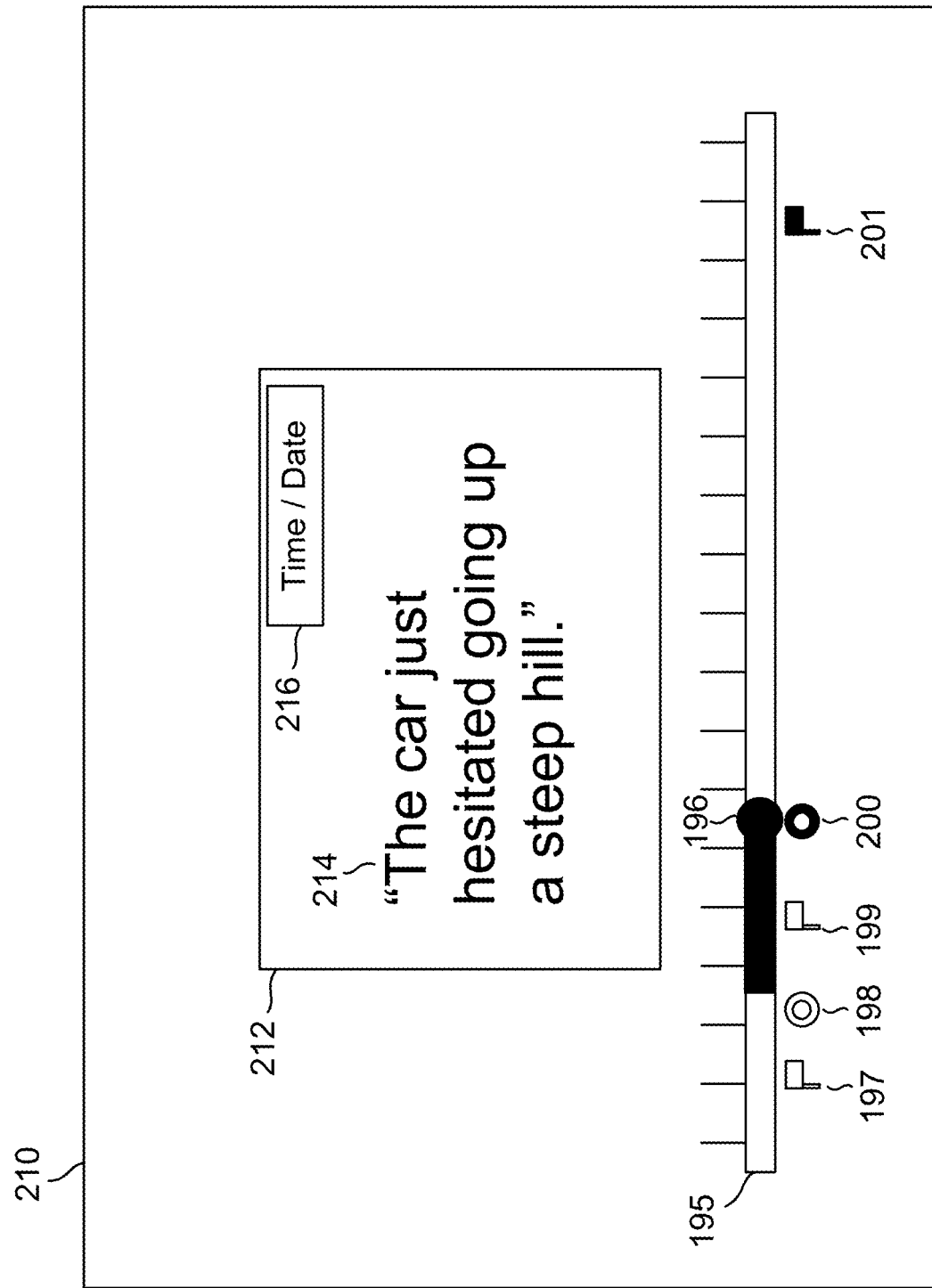
FIG. 15 is a diagram of another example display presentation.

FIG. 15 is a diagram representing depicting another example display presentation 210. Particularly, the display presentation 210 can be displayed in response to a user sliding the selector 196 of the graph view slider 195 shown in the display presentation 190 of FIG. 14 to show the symbol indicator 200 representing a user input. As a result, the display presentation 210 is displaying the popup box 212 that includes text 214 and a time of capture 216. In some instances, the popup box 212 may be displayed on the display presentation 210 while one or more VDP graphs are also displayed on the display presentation 210. Alternatively, the computing system 2 can present the display presentation 210 in response to detecting a selection of the symbol indicator 200 representing the user input. More specifically, in response to detecting the selection (e.g., via a touchscreen interface), the computing system 2 can cause the selector 196 to switch positions on the graph view slider 195 to reflect the selection of the symbol indicator 200 along with causing the popup box 212 to display.

The popup box 212 represents an example implementation of the computing system 2 displaying information relating to a user input. As discussed above, user inputs can be provided to the computing system (or an associated device) by a user during a test drive of the vehicle or at another point (e.g., by a user after the user services the vehicle). The popup box 212 can include various information related to the user input, including text 214 provided by the user and the time of capture 216 for the user input (e.g., when the computing system 2 or associated device initially received the user input represented by the symbol indicator 200). The text 214 can represent text manually provided by the user at the time of capture 216 or can correspond to text formulated via speech recognition based on a vocal input provided by the user. For instance, the user can provide a vocal input during operation of the vehicle that the computing system 2 can use speech recognition to determine the text 214 based on the vocal input. In further examples, the popup box 212 can include an option to replay the vocal input or other form of user input.

Figure 16:
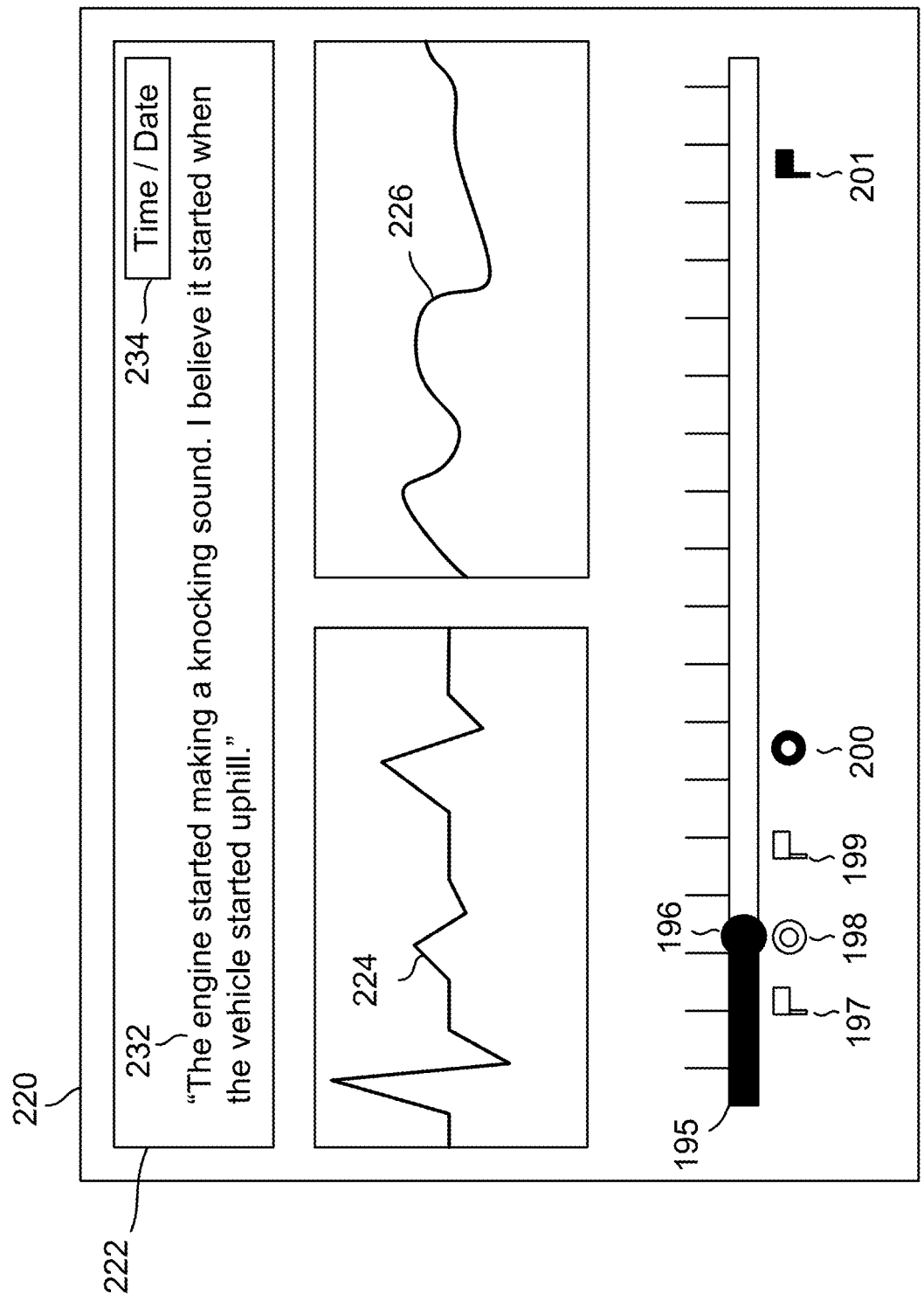
FIG. 16 is a diagram of a further example display presentation.

FIG. 16 is a diagram depicting a further example display presentation 220. The display presentation 220 may be displayed in response to a user sliding the selector 196 of the graph view slider 195 shown in the display presentation 190 of FIG. 14 or the display presentation 210 of FIG. 15 to show information corresponding to the symbol indicator 198 representing a user input. As a result, the display presentation 220 is displaying information related to a time period associated with the symbol indicator 198. The time period may cover an amount of time represented by the black part of the selector 196 of the graph view slider 195. In another example, the time period may cover a time period that encompasses the vocal input corresponding to text 232, which is represented by the symbol indicator 198. For example, the time period may begin at the time of capture of the vocal input and end when the vocal input was completed. The time period may also include some buffer time around the time that the vocal input was received. The display presentation 220 further includes a popup box 222, a first VDP line graph 224, and a second VDP line graph 226.

The popup box 222 includes text 232 and a time of capture 234. In some instances, the popup box 222 may be displayed in the display presentation 220 to represent text 232 corresponding to an audio input received at a microphone of the computing system 2 and/or a microphone system connected to the computing system 2. As such, the popup box 222 represents an example implementation of the computing system 2 displaying information relating to a user input.

As discussed above, user inputs can be provided to the computing system (or an associated device) by a user during a test drive of the vehicle or at another point (e.g., by a user after the user services the vehicle). The popup box 222 can include various information related to the user input, including text 232 provided by the user and the time of capture 234 for the user input (e.g., when the computing system 2 or associated device initially received the user input represented by the symbol indicator 198). The text 232 can represent text manually provided by the user at the time of capture 234 or can correspond to text formulated via speech recognition based on a vocal input provided by the user. For instance, the user can provide a vocal input during operation of the vehicle that the computing system 2 can use speech recognition to determine the text 232 based on the vocal input. In further examples, the popup box 222 can include an option to replay the vocal input or other form of user input.

The first VDP line graph 224 and the second VDP line graph 226 represent information related to PIDs or other vehicle operations that correspond to a time period starting at the time of capture 234 associated with the user input represented by the symbol indicator 198. A user may review the first VDP line graph 224 and the second VDP line graph 226 to analyze vehicle operations during the time period that the user also provided the user input corresponding to the symbol indicator 198. In other examples, the display presentation 220 may display additional graphs, including providing options for a user to adjust which VDP graphs are displayed.

FIG. 17 is a table 250 depicting example PID 252, PID parameters 254, reception times 256, and user inputs 258 that can be stored in a memory, such as the memory 27, 62.

In particular, the memory 27 can, but need not necessarily, store at least some of the data within the table 250 within the PID Values/PID Index 34, and/or the memory can, but need not necessarily, store at least some of the data within the table 250 within the diagnostic list 66. The processor 23, 60 can parse VDM received from the vehicle 8 to obtain the PID and PID parameters and determine a reception time indicating when each VDM including the PID and PID parameter was received at the computing system 2. The processor 23, or more generally the computing system 2, can include a clock to determine the reception time(s) for receiving the VDM as well as any user inputs to be associated with a VDM and/or a PID and PID parameter. The table 250 show the PID 252, the PID parameters 254, and the reception times 256 as decimal values and the user inputs 258 as alphanumeric characters. The memory 27, 62 can store PID, PID parameters, reception times and/or user inputs in some other format, such as binary and/or hexadecimal values. A memory can, but need not necessary, store PID, PID parameters, reception times, and/or user inputs in a tabular format.

The user inputs 258 include a user input 260 corresponding to a reception time 12:34.59.8. In some examples, reception times 256 may correspond to start times when the PID or user input was initially received. For example, the time "12:34.59.8" listed in a column with the reception times 256 for the user input 260 may represent the starting moment when the beginning of the user input 260 was provided. In other examples, the times listed in the reception times 256 may correspond to an average time that indicates an average of when the PID or user input occurred. Further, the times listed in the reception times 256 may represent when the PID or the user input was fully-received. The computing system 2 can store other data as part of a reception time, such as data representing a day, month, and year.

The computing system 2 can receive and generate the user input 260 based on use of the user interfaces 26. For example, the user input 260 can correspond to a vocal input that is transcribed to text using speech recognition. Additionally and/or alternatively, the user input 230 can correspond to other forms of input, such as a button push, a detected motion, or text. After receiving the user input 260, the computing system 2 can output the user input 230 on the display 41 so that a user can view the user input 260 with respect to a reception time and PID and PID parameters received proximate to that reception time.

Figure 18:
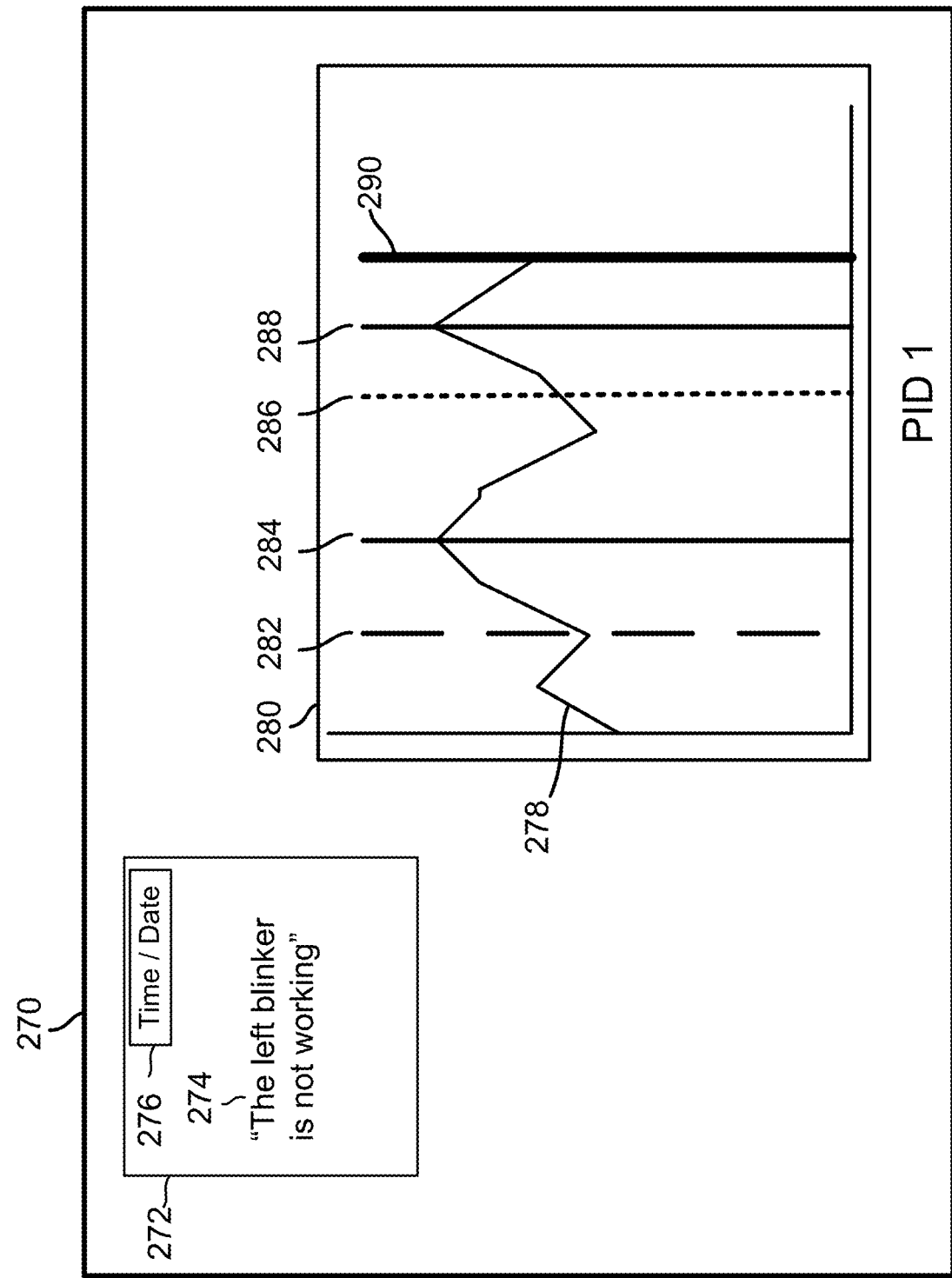
FIG. 18 is a diagram of a further example display presentation.

FIG. 18 is a diagram of a further example display presentation 270. The display presentation 270 includes a VDP window 280 that includes VDP line graph 278 corresponding to PID 1. The VDP line graph 278 includes multiple indicators, such as indicator 282, indicator 284, indicator 286, and indicator 288, and further includes a cursor bar 290. In some examples, the color or style of the indicators 282-288 can depend on which PID each indicator pertains to, or whether a given indicator represents a user input, a threshold breach, or other vehicle information, etc.

The display presentation 270 further includes popup box 272 shown positioned to the side of the VDP window 280. The computing system 2 (e.g., the VST 40) may display the popup box 272 automatically or can display it in response to a selection of an indicator on the VDP line graph 278. For instance, the computing system 2 can modify the information displayed in the popup box 272 in response to detecting a selection of the indicator 282 in an example where the indicator 282 corresponds to a user input. After receiving the selection of the indicator 282, the computing system 2 can cause the popup box 272 to be displayed on a display interface (e.g., the display 41 of the VST 40) to show information corresponding to the user input (e.g., text 274 representing the user input and a time of capture 276.

The indicators 282-288 can each represent a variety of information related to the vehicle, such as breaches of PID 1 or another PID or user inputs previously provided by a user. As such, selection of one of the indicators 282-288 can modify the information displayed in the display presentation 270. Further, the cursor bar 290 may be a movable cursor that a user can select and move to alter the time frame depicted by the VDP line graph 278. In addition, the computing system 2 may further display the indicators with corresponding VOCs (e.g., flags) that represent information associated with each indicator. For instance, the VOCs may signal breaches of a threshold associated with the displayed PID or another PID.

Figure 19:
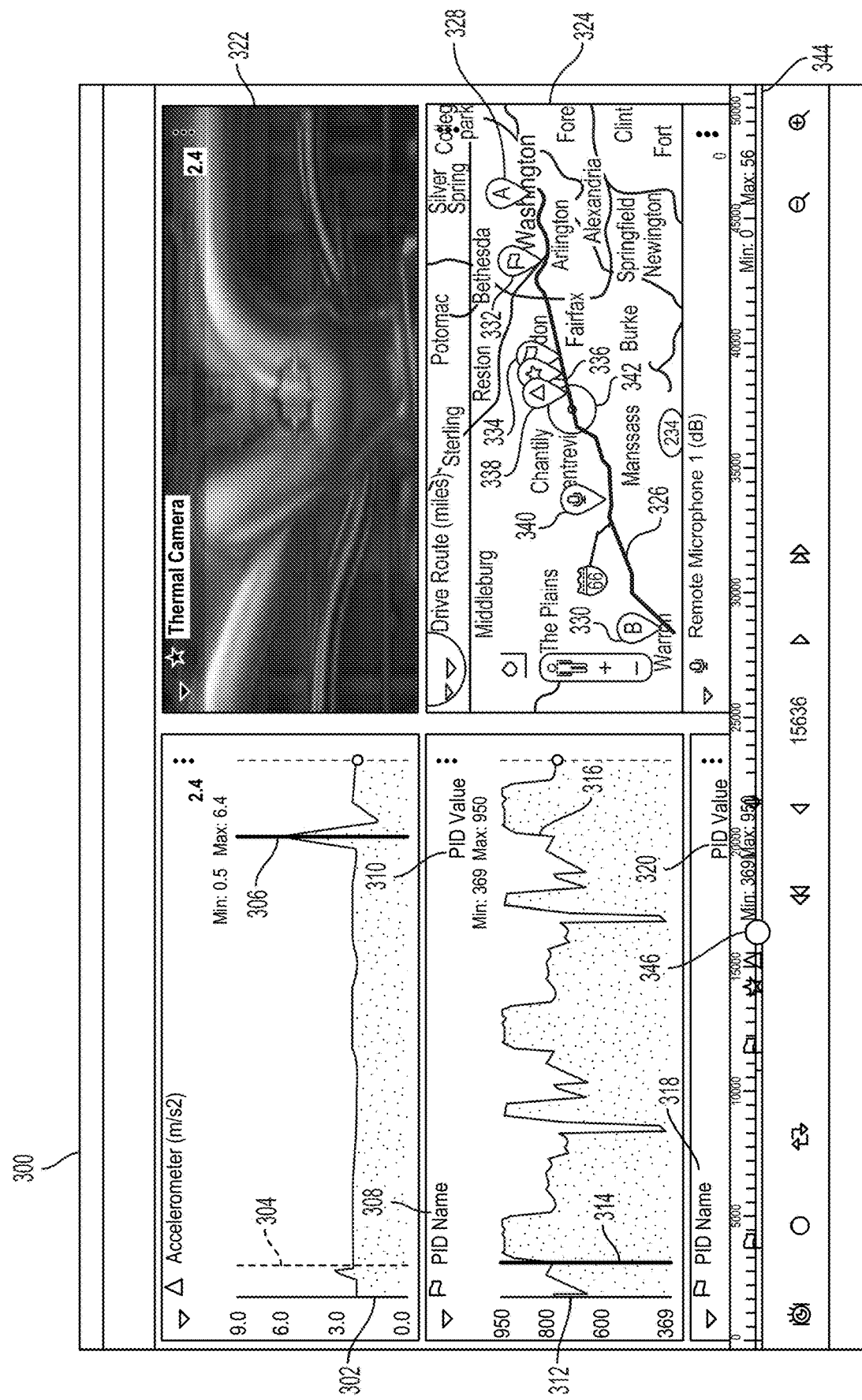
FIG. 19 is a diagram depicting another example display presentation.

FIG. 19 is a diagram depicting another example display presentation 300. The display presentation 300 includes VDP line graph 302, VDP line graph 312, thermal camera image 322, and map display 324. The display presentation 300 further includes the graph view slider 344 configured to modify the time period and corresponding vehicle information shown in display presentation 300.

The VDP line graph 302 may represent information related to PID name 308 and is shown with indicators 304, 306 and corresponding PID description (i.e., PID name 308 and PID value 310). The VDP line graph 302 may further show information corresponding to sensor measurements captured by an accelerometer. An accelerometer is a sensor configured to measure acceleration of the vehicle. The indicators 304, 306 can each represent a variety of information related to the vehicle, such as breaches of PID name 308 or another PID or user inputs previously provided by a user. Similarly, the VDP line graph 312 may represent information related to PID name 318 and is shown with indicator 314 and corresponding PID information (i.e., PID name 318 and PID value 320).

In some examples, the VDP line graph 302 and the VDP line graph 312 may represent information related to PID name 308 and PID name 318, respectively, during the same time frame. As a result, VDP line graph 302 and VDP line graph 312 can be compared directly to determine information related to operation of the vehicle during that time. For example, VDP line graph 312 includes spike 316 that occurs at the same time of indicator 306 in VDP line graph 302.

Thermal camera image 322 represents images that can be captured by a thermal camera during operation of the vehicle. Thermal camera image 322 can represent thermal data captured during the test drive related to the engine or other components of the vehicle. In some examples, other sensor data may be displayed in display presentation 300. For example, the display presentation 300 may include audio links (e.g., selectable icons for listening to previously recorded sounds from a microphone system or audio inputs from the user), images from cameras, or specialized sensor measurements.

Map display 324 includes information related to route 326 driven during the test drive. Map display 324 includes route 326 that starts from start point 328 and ends at end point 330. Route 326 further shows vehicle position 342 that represents a location of the vehicle during the time represented by VDP line graph 302 and VDP line graph 312. As such, a user may select another vehicle position on map display 324 or an icon to view vehicle information that occurred at that time. Map display 324 may help identify particular portions of route 326 that vehicle may operate less desirably. For example, icons 334, 336, and 338 may represent locations where the vehicle struggled to perform adequately due to road conditions (e.g., uphill travel).

Map display 324 can incorporate GPS measurements to indicate a position of the vehicle throughout the route 326. For instance, the GPS measurements can specify when the computing system 2 should place icons 332, 334, 336, 338, and 340 representing inputs received at the computing system 2 during operation of the vehicle. The computing system 2 can also incorporate time stamps along with the GPS measurements when receiving inputs for further annotation of graphs and displaying measurements in other formats.

As shown in FIG. 19, route 326 further includes icons 332, 334, 336, 338, and 340. Each icon 332-340 represents the location of the vehicle on route 326 when the event represented by the given icon occurred. For example, icon 340 represents where the vehicle was in route 326 when a user provided a voice input to computing system 2. Selection of icon 340 by a user may cause computing system 2 to display PID information, the voice input, thermal camera images, or other sensor information that corresponds to operations of the vehicle at the time the voice input was provided. A user may select any of the icons 332-340 or another portion of the route 326 or map display 324 to cause the display presentation 300 to display information related to the selection, which may involve displaying information related to a particular time of capture during operation of the vehicle.

To further illustrate, icon 332 can represent a PID flag. As such, selection of icon 332 can cause the computing system 2 to display information for a time period during route 326 when vehicle operation caused a PID threshold breach corresponding to icon 332. In another example, icon 332 or another icon may represent user flags or other information that occurred during the test drive of the vehicle.

Icons 332-340 further include corresponding icons positioned on the graph view slider 344. The graph view slider 344 can modify the view of all (or a subset) of the VDP line graphs 302, 312 (or other VDP line graphs, sensor images, etc.) by adjusting the position of the selector 346. For example, sliding the selector 346 forward (i.e., to the right) on the graph view slider 344 can display presentation 300 to display VDP or other vehicle information at a more recent time period than the time period currently represented. Similarly, sliding the selector 346 backward (i.e., to the left) on the graph view slider 344 can cause all (or a subset) of the VDP or other vehicle information at a prior time period to be displayed than the time period currently represented. In some instances, the selector 346 can correspond to a single session time (e.g., one test drive route driven by the vehicle). As such, the computing system 2 can enable the user to select other selectors to view other sessions during which the computing system 2 received inputs representing operations of the vehicle. In some examples, the computing system 2 can enable a user to select a particular time or one of the icons 332-340 to modify the time period of vehicle information displayed.

In other words, changing a position of the graph view slider 344 can change a display presentation from showing information associated with a first time and first time period to showing information associated with a second time and second time period. As an example, changing a position of the graph view slider 344 can cause a display presentation to show a second thermal image instead of a first thermal image, to indicate a second position on the map display 324 instead of a first position, and/or to show VDP graphs for PIDs associated with PID names 308, 318 covering the second time period instead of the first time period.

Figure 20:
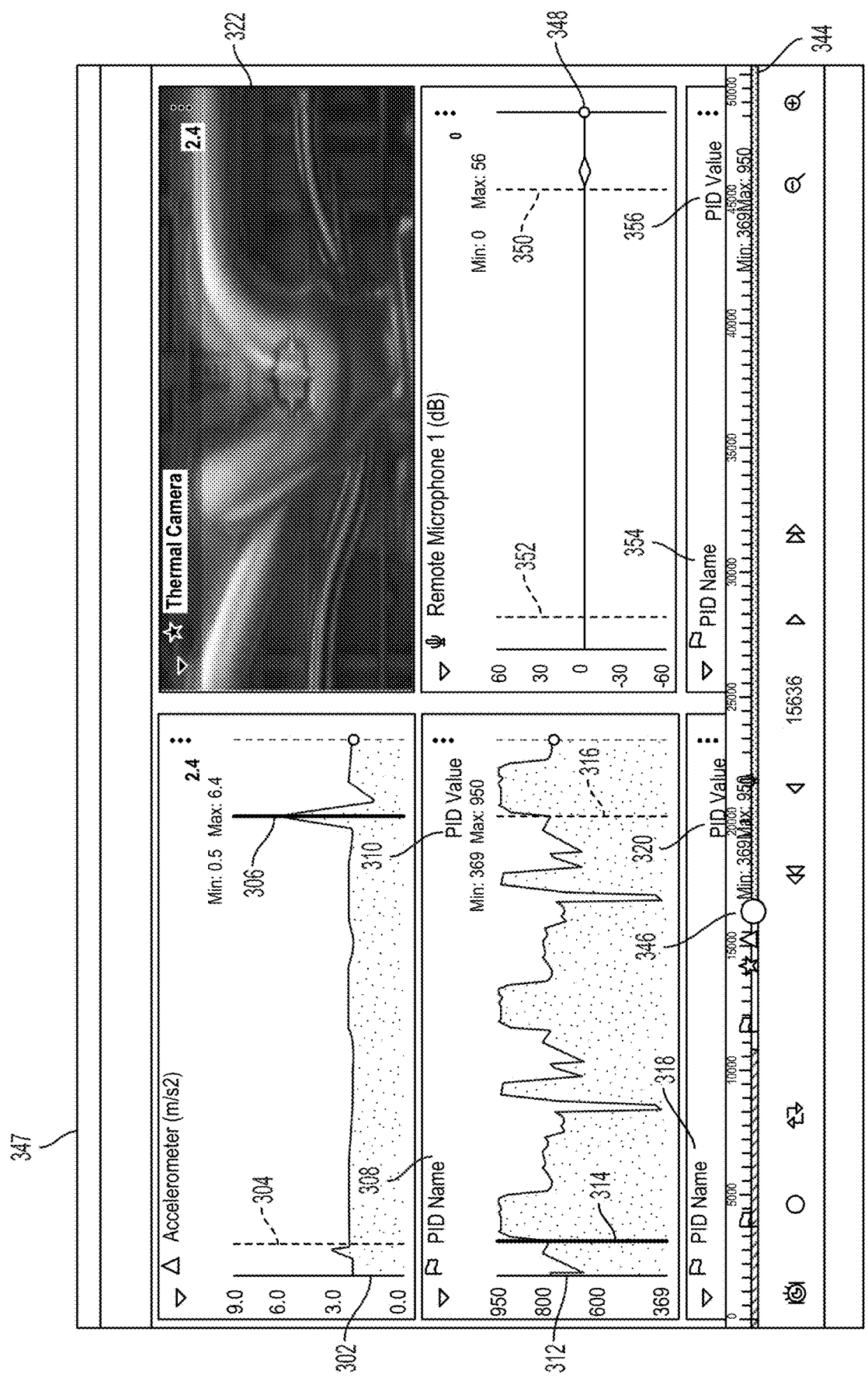
FIG. 20 is a diagram depicting a further example display presentation.

FIG. 20 is a diagram depicting a further example display presentation 347. The display presentation 347 is similar to the display presentation 300 depicted in FIG. 19, but includes microphone data 348 rather map display 324. Similar to the display presentation 300, the display presentation 347 shown in FIG. 20 also includes the graph view slider 344 configured to modify the time period and corresponding vehicle information shown in display presentation 347. Other display presentations may include any of the information shown in the display presentation 300 and the display presentation 347 arranged in other configurations.

The computing system 2 may enable different sections displayed in the display presentation 347 to be modified. Particularly, the modifications can occur automatically or based on inputs provided by a user. For instance, the computing system 2 can provide an interface that enables a user to provide inputs to move around each section, resize the sections, remove or add sections from the display presentation 347. In addition, the computing system 2 may provide an option or multiple options that enable user inputs containing annotations to be provided on the display presentation 347 and other graphs or measurements displayed by the computing system 2. For instance, the computing system 2 can provide interface tools that enable a user to provide inputs to highlight, add text, provide other graphical annotations upon the various inputs, graphs, and other information displayed.

In addition, the computing system 2 can receive additional data that can serve to supplement inputs received from various sources. For example, the computing system 2 can receive data that indicates times of capture for the inputs and where the vehicle was positioned according to GPS coordinates when the inputs were captured. The additional data can also indicate how to play back or display inputs. For instance, the computing system 2 can receive data that associates a thermal camera image with a time stamp indicating when the thermal image was captured. Further, if the thermal camera image was part of a video, the additional data can indicate time stamps in the video that specify changes in the thermal camera images in the video. The computing system 2 can provide an interface that enables a user to provide inputs to quickly change between different images in the video using the variety of time stamps or the selector 346. In response to receiving an input, the computing system 2 may alternate the information displayed, including switching between different images or sensor measurements provided by one or more sources.

The microphone data 348 corresponds to audio data captured by one or more microphones associated with the computing system 2. For example, the microphone data 348 can correspond to audio data captured by a microphone system positioned in a portion of the vehicle (e.g., the Blue-point® electronic squeak and rattle finder). The microphone data 348 can represent different audio captured during a test drive, such as engine knocking or sounds originating from the shocks or other parts of the vehicle, etc. In other instances, the microphone data 348 could represent audio inputs provided by a user during a test drive.

As shown in FIG. 20, the microphone data 348 further includes indicators 350, 352 that can represent a time period associated with other PIDs displayed in the display presentation 347. The indicators can correspond to the time of capture of sound measurements by one or more microphones. In other examples, the indicators can represent to moments during audio capture by the microphone(s) where the audio exceeded a threshold decibel level. Further, the microphone data 348 also shows PID information (i.e., PID name 354 and PID value 356). The PID information can assist a user when reviewing the microphone data 348 along with other information presented in the display presentation 347. In some examples, the computing system 2 can enable the user to change which PID the microphone data 348 represents through selection of the PID name 354 and selecting another PID or by modifying the position of the indicators 350, 352 to modify the audio represented in the microphone data 348.

Figure 21:
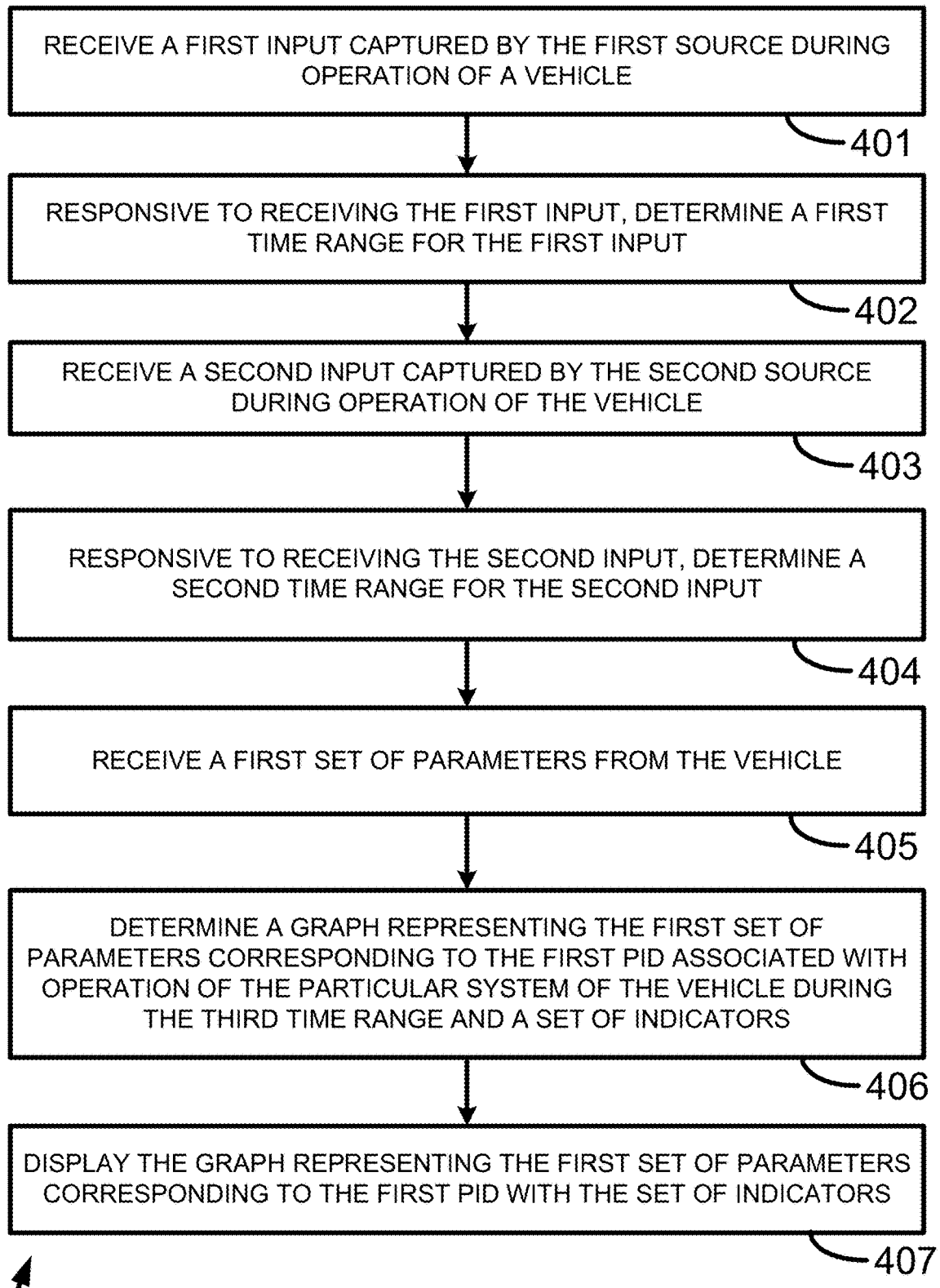
FIG. 21 is a flowchart depicting a set of functions that can be carried out in accordance with the example embodiments.

FIG. 21 shows a flowchart depicting a set of functions 400 (or more simply "the set 400") that can be carried out in accordance with the example embodiments described in this description. The set 400 includes the functions shown in blocks labeled with whole numbers 401 through 407 inclusive. The following description of the set 400 includes references to elements shown in other figures described in this description, but the functions of the set 400 are not limited to being carried out only by the referenced elements. A variety of methods can be performed using all of the functions shown in the set 400 or any proper subset of the functions shown in the set 400. Any of those methods can be performed with other functions such as one or more of the other functions described in this description.

Block 401 includes receiving a first input captured by the first source during operation of a vehicle. The computing system 2 or another type of computing system (e.g., smartphone, wearable computing system, or the VST 40) may receive the first input as well as other inputs during operation of the vehicle. The first input and other inputs can correspond to user inputs, sensor data, or other forms of inputs provided by one or more sources. These inputs may correspond to measurements and information that differ from VDP received from a vehicle data bus, such as an OBD II bus.

The computing system 2 may receive inputs from various sources, including user interfaces, and internal and external sensors, among others sources. The various sources may include sources are that operatively connected to the computing system 2. Operatively connected may indicate that a sensor and another type of source is capable of communicating with the computing system 2, but not necessarily in fixed communication with the computing system 2. These sources may be wirelessly or wired connected. In some examples, the sources may be operatively coupled by a technician or another user. As such, the first source may provide various inputs to the computing system 2. For example, the computing system 2 can receive electrical measurements, such as electrical current measurements or voltage measurements from one or more sensors capturing measurements during operation of the vehicle.

In some examples, receiving the first input captured by the first source during operation of the vehicle includes receiving an indication of the particular system of the vehicle. Particularly, the indication may derive from the first source capturing the first input. For example, the indication may specify the particular system based on the location of the first source, the sensor data obtained by the first source, an initial set up by the user, or another factor. The computing system 2 may also determine the particular system measured by the first input based on an analysis of the information within the first input.

Block 402 includes responsive to receiving the first input, determining a first time range for the first input. The computing system 2 or another system may determine the first time range for the first input received from the first source. The time range for the first input may be the duration over which the first input was captured by the first source. For instance, when the first source is a microphone and the first input is audio captured by the microphone, the first time range may correspond to the time over which the microphone captured the audio.

Block 403 includes receiving a second input captured by the second source during operation of the vehicle. The computing system 2 may receive the second input from a second source operatively connected to the computing system 2. The second input may correspond to the particular system of the vehicle. As a result, the first input and the second input may both specify information regarding operation of the same particular system of the vehicle.

In some embodiments, the second source may differ from the first source. For example, the first source may be a temperature sensor and the second source may be a thermal camera. In another example, the first source may be a microphone system and the second source may be a portable camera. In a further example, the first source is a user interface and the second source is a vehicle sensor. In other examples, the second source and the first source may be the same source.

In some embodiments, the second source may capture the second input in response to a triggering event. The triggering event may derive from the computing system 2, the first source, or another component associated with the vehicle. For instance, the computing system 2 may transmit a signal to the second source to trigger capture of the second input. The computing system 2 may transmit the signal in response to receiving the first input. The signal may include the indication of the particular system of the vehicle. This way, the second source may actively measure the particular system to obtain the second input. In some examples, the computing system 2 may receive an indication of the particular system of the vehicle along with the second input captured by the second source. This way, the computing system 2 may identify that the first input and second input measure aspects of the same particular system of the vehicle. In other examples, the second source may capture the second input in response to the first source capturing the first input. For example, the second source may receive an indication from the first source to capture an input. In another example, the computing system 2 may cause the second source to capture the input in response to the first source providing the first input to the computing system 2.

Block 404 includes responsive to receiving the second input, determining a second time range for the second input. The computing system 2 or another system may determine the second time range for the second input. The second time range may represent the duration over which the second input was captured by the second source.

In some examples, the second time range may overlap the first time range. In such a situation, the first source may be capturing the first input while the second source is capturing the second input. In other examples, the second time range does not overlap with the first time range. In such a situation, the first source may complete obtaining the first input prior to the second source starting to capture the second input.

Block 405 includes receiving a first set of parameters from the vehicle. The first set of parameters may correspond to a first parameter identifier (PID) associated with operation of the particular system of the vehicle during a third time range. The third time range may include the first time range and the second time range. Particularly, the third time range may be a duration of time long enough to include at least part of the first time range associated with the first input and the second time range associated with the second input. This way, the computing system may determine a temporal order for the first input and the second input relative to the different parameters that correspond to the PID.

In some examples, the computing system 2 may receive the first set of parameters from the vehicle during operation of the vehicle. As such, the computing system 2 may receive the first set of parameters, the first input, and the second input during a duration represented by the third time range.

Block 406 includes determining a graph representing the first set of parameters corresponding to the first PID associated with operation of the particular system of the vehicle during the third time range and a set of indicators. The set of indicators may include a first indicator that represents at least a portion of the first time range of the first input and a second indicator that represents at least a portion of the second time range of the second input.

The computing system 2 may determine multiple graphs or other arrangements to show information captured within the inputs and the first set of parameters. The indicators may be determined and used to represent inputs. For instance, a first indicator may represent the first input received from the first source and may have a position on the graph that aligns with the first time range. The first indicator may be positioned to represent the beginning of the first time range, the middle, or the end of the first time range. In some examples, the first indicator may include another corresponding indicator to represent the first input. In such an example, the first indicator may represent the beginning of the first time range and the corresponding indicator may representing the end of the first time range on the graph. The second input may be similarly represented by one or more indicators on the graph as well. Further, in embodiments involving additional inputs (e.g., a third input, a fourth input), more indicators may be determined and displayed on the graph to represent the inputs.

Each indicator may be selectable such that selection of the indicator results in the computing system displaying information related to the input represented by the selected indicator. For example, selection of the first indicator may trigger the computing system to show information corresponding to the first input, such as measurements of the first input, text, images, or audio associated with the first input, and an indication of the first source. Other information can be shown in response to the selection of an indicator.

Block 407 includes displaying the graph representing the first set of parameters corresponding to the first PID with the set of indicators. The computing system 2 may display the graph on a display interface. For example, the computing system 2 may display a graph as shown in FIG. 20.

In some examples, the computing system 2 may further receive a selection of the first indicator. Based on receiving the selection of the first indicator, the computing system 2 may display a representation of the first input on the display interface. For example, the computing system 2 may display images captured by the first source. The representation of the first input may include an indication of the first source. In some examples, the computing system 2 may also receive a second selection of the second indicator. In response, the computing system 2 may display a second representation of the second input on the display interface. The second representation of the second input may include a second indication of the second source. In some instances, the second representation of the second input is displayed simultaneously with the representation of the first input.

IV. Conclusion

Example embodiments have been described above. Those skilled in the art will understand that changes and modifications can be made to the described embodiments without departing from the true scope and spirit of the present invention, which is defined by the claims. For instance, although many of the example embodiments are described with respect to a vehicle and a vehicle service tool, the person skilled in the art will understand that the vehicle referred to herein can be replaced by some other serviceable device such as, but not limited to, medical equipment, appliances (e.g., refrigerators or washing machines), or televisions. In such instance, the vehicle service tools described herein can be referred to more simply as a "service tool."

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions. The intent of using the conjunction "or" within a described list of at least two terms is to indicate any one of the listed terms or any combination of two or more of the listed terms.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

Embodiments of the present disclosure may thus relate to one of the enumerated example embodiments (EEEs) listed below.

EEE 1 is a method comprising: receiving, at a computing system, a first input from a first source during operation of a vehicle; responsive to receiving the first input, determining a time of reception for the first input; receiving, at the computing system, a first set of parameters from the vehicle, wherein the first set of parameters correspond to a first parameter identifier (PID); responsive to receiving the first set of parameters, determining a time of reception for each parameter of the first set of parameters; based on the time of reception for the first input and the time of reception for each parameter of the first set of parameters, determining, by the computing system, a first temporal position for a first indicator configured to represent the first input on a graph of the first set of parameters corresponding to the first PID; and displaying, by the computing system on a display interface, the graph of the first set of parameters corresponding to the first PID with the first indicator in the first temporal position.

EEE 2 is the method of EEE 1, wherein receiving, at the computing system, the first input from the user interface during operation of the vehicle comprises: receiving a vocal input representing the first input from a microphone; based on receiving the vocal input, determining text that represents the vocal input using speech recognition; and storing the determined text with the first input.

EEE 3 is the method of any one of EEE 1 and 2, further comprising: receiving, by the computing system, a selection of the first indicator configured to represent the first input; and responsive to receiving the selection of the first indicator, displaying, by the computing system on the display interface, the text that represents the vocal input.

EEE 4 is the method of EEE 3, wherein displaying the text that represents the vocal input comprises: displaying the text that represents the vocal input in a popup box.

EEE 5 is the method of EEE 3, wherein displaying the text that represents the vocal input further comprises: providing an option that enables editing the text that represents the vocal input; receiving one or more edits to the text that represents the vocal input; and displaying the edited text.

EEE 6 is the method of any one of EEE 1 to 5, further comprising: based on determining the first temporal position for the first indicator configured to represent the first input on the graph of the first set of parameters corresponding to the first PID, determining a symbol that corresponds to the first indicator, wherein the symbol is based on the first source; and displaying, by the computing system on the display interface, the symbol relative to a graph view slider, wherein the symbol is displayed at a position relative to the graph view slider that is based on the first temporal position for the first indicator, and wherein the graph view slider is configurable to modify a view of the graph of the first set of parameters corresponding to the first PID.

EEE 7 is the method of EEE 6, further comprising: receiving, at the computing system, a selection of the symbol that corresponds to the first indicator; and responsive to the receiving the selection of the symbol, modifying a view of the graph of the first set of parameters corresponding to the first PID such that the view of the graph displays a portion of the graph that includes the first indicator that represents the first input.

EEE 8 is the method of any one of EEE 1 to 7, wherein the first indicator is displayed as a vertical cursor on the graph of the first set of parameters corresponding to the first PID.

EEE 9 is the method of any one of EEE 1 to 8, further comprising: determining, by the computing system, a threshold for the first PID; determining, by the computing system, a temporal position for a second indicator that represents a parameter corresponding to the first PID breaching the threshold for the first PID; and wherein displaying, by the computing system on the display interface, the graph of the first set of parameters corresponding to the first PID with the first indicator in the first temporal position comprises: displaying the graph of the first set of parameters corresponding to the first PID with the second indicator and the first indicator arranged on the graph based on a temporal order that depends on the temporal position for the second indicator and the first temporal position for the first indicator.

EEE 10 is the method of any one of EEE 1 to 9, wherein receiving, at the computing system, the first input from the first source during operation of the vehicle comprises: receiving a touch input representing the first input from a touchscreen interface; and wherein responsive to receiving the first input, determining the time of reception for the first input comprises: determining that the time of reception for the touch input corresponds to a given time when the touchscreen interface detects the touch input.

EEE 11 is the method of any one of EEE 1 to 10, wherein receiving, at the computing system, the first input from the first source during operation of the vehicle comprises: receiving a button input representing the first input from an input interface of the computing system; and wherein responsive to receiving the first input, determining the time of reception for the first input comprises: determining that the time of reception for the button input corresponds to a given time when the input interface detects the button input.

EEE 12 is the method of any one of EEE 1 to 11, wherein responsive to receiving the first input, determining the time of reception for the first input comprises: determining that the time of reception for the first input corresponds to a given time when the computing system receives the first input from the first source.

EEE 13 is the method of any one of EEE 1 to 12, wherein displaying, by the computing system on the display interface, the graph of the first set of parameters corresponding to the first PID with the first indicator in the first temporal position comprises: displaying the first indicator in the first temporal position such that the first indicator is displayed at a beginning of a subset of parameters of the first set of parameters that correspond to the first PID.

EEE 14 is the method of any one of EEE 1 to 13, wherein displaying, by the computing system on the display interface, the graph of the first set of parameters corresponding to the first PID with the indicator in the first temporal position comprises: displaying the indicator in the first temporal position such that the indicator is displayed at an end of a subset of parameters of the first set of parameters that correspond to the first PID.

EEE 15 is the method of any one of EEE 1 to 14, wherein displaying, by the computing system on the display interface, the graph of the first set of parameters corresponding to the first PID with the first indicator in the first temporal position comprises: displaying the first indicator in the first temporal position such that the first indicator is displayed in between a subset of parameters of the first set of parameters that correspond to the first PID.

EEE 16 is the method of any one of EEE 1 to 15, wherein the computing system is coupled to the vehicle via a wired connection.

EEE 17 is the method of any one of EEE 1 to 16, wherein receiving, at the computing system, the first set of parameters from the vehicle comprises: receiving the first set of parameters from an on-board diagnostics (OBD) reporting system of the vehicle operating in mode $01.

EEE 18 is the method of any one of EEE 1 to 17, wherein receiving, at the computing system, the first set of parameters from the vehicle comprises: receiving the first set of parameters from an on-board diagnostics (OBD) reporting system of the vehicle operating in mode $02, wherein the first set of parameters includes sensor data recorded at a given time of a detected fault of the vehicle.

EEE 19 is the method of any one of EEE 1 to 18, wherein receiving, at the computing system, the first input from the first source during operation of the vehicle comprises: receiving one or more thermal images from a thermal camera positioned to detect thermal radiation from a component of the vehicle during operation of the vehicle, and wherein responsive to receiving the first input, determining the time of reception for the first input comprises: determining that the time of reception for the one or more thermal images correspond to a given time when the computing system receives a first image of the one or more thermal images.

EEE 20 is the method of any one of EEE 1 to 19, wherein receiving, at the computing system, the first input from the first source during operation of the vehicle comprises: receiving audio from an external microphone positioned to measure a component of the vehicle during operation of the vehicle, and wherein responsive to receiving the first input, determining the time of reception for the first input comprises: determining that the time of reception for the audio corresponds to a given time when the external microphone started recording the audio.

EEE 21 is the method of any one of EEE 1 to 20, wherein receiving, at the computing system, the first input from the first source during operation of the vehicle comprises: receiving a video from an external camera positioned within an orientation inside of the vehicle configured to detect a driver of the vehicle during operation of the vehicle, and wherein responsive to receiving the first input, determining the time of reception for the first input comprises: determining that the time of reception for the video corresponds to a given time when the external camera initially started capturing the video.

EEE 22 is the method of any one of EEE 1 to 21, further comprising: receiving, at the computing system, a second input from a second source during operation of the vehicle: responsive to receiving the second input, determining a time of reception for the second input; based on the time of reception for the second input and the time of reception for each parameter of the first set of parameters, determining, by the computing system, a second temporal position for a second indicator configured to represent the second input on the graph of the first set of parameters corresponding to the first PID, and wherein displaying, by the computing system on the display interface, the graph of the first set of parameters corresponding to the first PID with the first indicator in the first temporal position further comprises: displaying the graph of the first set of parameters corresponding to the first PID with the first indicator in the first temporal position and the second indicator in the second temporal position.

EEE 23 is the method of EEE 22, wherein the first input from the first source corresponds to a user input from a user interface, and wherein the second input from the second source corresponds to sensor data from a sensor of the vehicle.

EEE 24 is a system comprising: a display interface; one or more processors; a non-transitory computer readable medium; and program instructions stored on the non-transitory computer readable medium and executable by the one or more processors to cause a set of functions to be performed, the set of functions comprising a method in accordance with any one of EEEs 1 to 23.

EEE 25 is the system of EEE 24, wherein the program instructions are further executable by the one or more processors to: receive a second input from a second source during operation of the vehicle; responsive to receiving the second input, determine a time of reception for the second input; based on the time of reception for the first input, the time of reception for the second input, and the time of reception for each parameter of the first set of parameters, determine a second temporal position for a second indicator configured to represent the second input on the graph of the first set of parameters corresponding to the first PID; and display, on the display interface, the graph of the first set of parameters corresponding to the first PID with the first indicator in the first temporal position and the second indicator in the second temporal position.

EEE 26 is a computer readable medium storing program instructions, that when executed by one or more processors, cause a set functions to be performed, the set of functions comprising a method in accordance with any one of EEEs 1 to 25.

EEE 27 is a method comprising: receiving, at a computing system from a first source operatively connected to the computing system, a first input captured by the first source during operation of a vehicle, wherein the first input corresponds to a particular system of the vehicle; responsive to receiving the first input, determining a first time range for the first input; receiving, at the computing system from a second source operatively connected to the computing system, a second input captured by the second source during operation of the vehicle, wherein the second input corresponds to the particular system of the vehicle, and wherein the second source differs from the first source; responsive to receiving the second input, determining a second time range for the second input; receiving, at the computing system, a first set of parameters from the vehicle, wherein the first set of parameters correspond to a first parameter identifier (PID) associated with operation of the particular system of the vehicle during a third time range, and wherein the third time range comprises the first time range and the second time range; determining a graph representing the first set of parameters corresponding to the first PID associated with operation of the particular system of the vehicle during the third time range and a set of indicators, wherein the set of indicators includes a first indicator that represents at least a portion of the first time range of the first input and a second indicator that represents at least a portion of the second time range of the second input; and displaying, by the computing system on a display interface, the graph representing the first set of parameters corresponding to the first PID with the set of indicators.

EEE 28 is the method of EEE 27, wherein receiving the first input captured by the first source during operation of the vehicle includes receiving an indication of the particular system of the vehicle.

EEE 29 is the method of EEE 28, further comprising: responsive to receiving the first input, transmitting, by the computing system, a signal to the second source to trigger capture of the second input, wherein the signal includes the indication of the particular system of the vehicle.

EEE 30 is the method of EEE 29, wherein receiving the second input captured by the second source includes receiving the indication of the particular system of the vehicle.

EEE 31 is the method of any one of EEE 27 to EEE 30, wherein receiving the first set of parameters from the vehicle comprises: receiving the first set of parameters from the vehicle during operation of the vehicle.

EEE 32 is the method of any one of EEE 27 to EEE 31, wherein the second source captures the second input in response to the first source capturing the first input.

EEE 33 is the method of any one of EEE 27 to EEE 32, wherein the first source is a temperature sensor; and wherein the second source is a thermal camera.

EEE 34 is a system comprising: a display interface and a computing system configured to: receive, from a first source operatively connected to the computing system, a first input captured by the first source during operation of a vehicle, wherein the first input corresponds to a particular system of the vehicle; responsive to receiving the first input, determine a first time range for the first input; receive, from a second source operatively connected to the computing system, a second input captured by the second source during operation of the vehicle, wherein the second input corresponds to the particular system of the vehicle, and wherein the second source differs from the first source; responsive to receiving the second input, determine a second time range for the second input; receive a first set of parameters from the vehicle, wherein the first set of parameters correspond to a first parameter identifier (PID) associated with operation of the particular system of the vehicle during a third time range, and wherein the third time range comprises the first time range and the second time range; determine a graph representing the first set of parameters corresponding to the first PID associated with operation of the particular system of the vehicle during the third time range and a set of indicators, wherein the set of indicators includes a first indicator that represents at least a portion of the first time range of the first input and a second indicator that represents at least a portion of the second time range of the second input; and display, on the display interface, the graph of the first set of parameters corresponding to the first PID with the first indicator and the second indicator.

EEE 35 is the system of EEE 34, wherein receiving the first input captured by the first source during operation of the vehicle includes receiving an indication of the particular system of the vehicle.

EEE 36 is the system of EEE 35, wherein the computing system is further configured to: transmit a signal to the second source to trigger capture of the second input based on receiving the first input, wherein the signal includes the indication of the particular system of the vehicle.

EEE 37 is the system of EEE 36, wherein receiving the second input captured by the second source includes receiving the indication of the particular system of the vehicle.

EEE 38 is the system of any one of EEE 34 to EEE 37, wherein the second source captures the second input in response to the first source capturing the first input.

EEE 39 is the system of any one of EEE 34 to EEE 38, wherein the second source captures the second input in response to the first source capturing the first input.

EEE 40 is the system of any one of EEE 34 to EEE 39, wherein the first source is a microphone system, and wherein the second source is a portable camera.

EEE 41 is the system of any one of EEE 34 to EEE 40, wherein the first source is a user interface; and wherein the second source is a vehicle sensor.

EEE 42 is a computer readable medium storing program instructions, that when executed by one or more processors, cause a set functions to be performed, the set of functions comprising a method in accordance with any one of EEEs 34 to 41.

What is claimed is:
1. A method comprising:
receiving, at a computing system from a temperature sensor operatively connected to the computing system, a first input output by the temperature sensor during operation of a vehicle, wherein the first input represents temperature data for a particular system of the vehicle;
responsive to receiving the first input, determining a first time range for the first input, wherein the first time range represents when the temperature sensor output the first input;
receiving, at the computing system from a thermal camera operatively connected to the computing system, a second input captured by the thermal camera during operation of the vehicle, wherein the second input represents one or more thermal images of the particular system of the vehicle;
responsive to receiving the second input, determining a second time range for the second input;
receiving, at the computing system, a first set of parameters from the vehicle, wherein the first set of parameters correspond to a first parameter identifier (PID) associated with operation of the particular system of the vehicle during a third time range, and wherein the third time range comprises the first time range and the second time range;

generating a graph representing the first set of parameters corresponding to the first PID associated with operation of the particular system of the vehicle during the third time range and a set of indicators, wherein the set of indicators includes a first indicator positioned on the graph at a first position that represents at least a portion of the first time range of the first input and a second indicator positioned on the graph at a second position that represents at least a portion of the second time range of the second input; and displaying, by the computing system on a display interface, the graph representing the first set of parameters corresponding to the first PID with the set of indicators, wherein selection of the first indicator causes the temperature data for the particular system of the vehicle to be displayed on the display interface and selection of the second indicator causes the one or more thermal images of the particular system of the vehicle to be displayed on the display interface.

2. The method of claim 1, wherein receiving the first input output by the temperature sensor during operation of the vehicle includes receiving an indication of the particular system of the vehicle.

3. The method of claim 2, further comprising:
responsive to receiving the first input, transmitting, by the computing system, a signal to the thermal camera to trigger capture of the second input, wherein the signal includes the indication of the particular system of the vehicle.

4. The method of claim 3, wherein receiving the second input captured by the thermal camera includes receiving the indication of the particular system of the vehicle.

5. The method of claim 1, wherein receiving the first set of parameters from the vehicle comprises:
receiving the first set of parameters from the vehicle during operation of the vehicle.

6. The method of claim 1, wherein the thermal camera captures the second input in response to the temperature sensor outputting the first input.

7. The method of claim 1, further comprising:
coupling the computing system to the vehicle, wherein the computing system is configured to operate as a vehicle diagnostic tool.

8. A system comprising:
a display interface;
a computing device configured to:
receive, from a temperature sensor operatively connected to the computing device, a first input output by the temperature sensor during operation of a vehicle, wherein the first input represents temperature data for a particular system of the vehicle;
responsive to receiving the first input, determine a first time range for the first input, wherein the first range represents when the temperature sensor output the first input;
receive, from a thermal camera operatively connected to the computing device, a second input captured by the thermal camera during operation of the vehicle, wherein the second input represents one or more thermal images of the particular system of the vehicle;
responsive to receiving the second input, determine a second time range for the second input;
receive a first set of parameters from the vehicle, wherein the first set of parameters correspond to a first parameter identifier (PID) associated with operation of the particular system of the vehicle during a third time range, and wherein the third time range comprises the first time range and the second time range;

generate a graph representing the first set of parameters corresponding to the first PID associated with operation of the particular system of the vehicle during the third time range and a set of indicators, wherein the set of indicators includes a first indicator positioned on the graph at a first position that represents at least a portion of the first time range of the first input and a second indicator positioned on the graph that represents at least a portion of the second time range of the second input; and display, on the display interface, the graph representing the first set of parameters corresponding to the first PID with the first indicator and the second indicator, wherein selection of the first indicator causes the temperature data for the particular system of the vehicle to be displayed on the display interface and selection of the second indicator causes the one or more thermal images of the particular system of the vehicle to be displayed on the display interface.

9. The system of claim 8, wherein receiving the first input output by the temperature sensor during operation of the vehicle includes receiving an indication of the particular system of the vehicle.

10. The system of claim 9, wherein the computing device is further configured to:
transmit a signal to the thermal camera to trigger capture of the second input based on receiving the first input, wherein the signal includes the indication of the particular system of the vehicle.

11. The system of claim 10, wherein receiving the second input captured by the thermal camera includes receiving the indication of the particular system of the vehicle.

12. The system of claim 8, wherein the thermal camera captures the second input in response to the temperature sensor outputting the first input.

13. A non-transitory computer readable medium having stored therein instructions executable by one or more processors to cause a computing system to perform functions comprising:
receiving, from a temperature sensor, a first input output by the temperature sensor during operation of a vehicle, wherein the first input represents temperature data for a particular system of the vehicle;
responsive to receiving the first input, determining a first time range for the first input, wherein the first time range represents when the temperature sensor output the first input;
receiving, from a thermal camera, a second input captured by the thermal camera during operation of the vehicle, wherein the second input represents one or more thermal images of the particular system of the vehicle;
responsive to receiving the second input, determining a second time range for the second input;
receiving a first set of parameters from the vehicle, wherein the first set of parameters correspond to a first parameter identifier (PID) associated with operation of the particular system of the vehicle during a third time range, and wherein the third time range comprises the first time range and the second time range;
generating a graph representing the first set of parameters corresponding to the first PID associated with operation of the particular system of the vehicle during the third time range and a set of indicators, wherein the set of indicators includes a first indicator positioned on the graph at a first position that represents at least a portion of the first time range of the first input and a second indicator positioned on the graph at a second position that represents at least a portion of the second time range of the second input; and displaying, on a display interface, the graph of the first set of parameters corresponding to the first PID with the first indicator and the second indicator, wherein selection of the first indicator causes the temperature data for the particular system of the vehicle to be displayed on the display interface and selection of the second indicator causes the one or more thermal images of the particular system of the vehicle to be displayed on the display interface.

14. The non-transitory computer readable medium of claim 13, wherein receiving the first input output by the temperature sensor during operation of the vehicle includes receiving an indication of the particular system of the vehicle.

15. The non-transitory computer readable medium of claim 14, wherein the functions further comprise:

responsive to receiving the first input, transmitting a signal to the thermal camera to trigger capture of the second input, wherein the signal includes the indication of the particular system of the vehicle.

16. The non-transitory computer readable medium of claim 15, wherein receiving the second input captured by the thermal camera includes receiving the indication of the particular system of the vehicle.

17. The non-transitory computer readable medium of claim 13, wherein the functions further comprise:

receiving a selection of the first indicator; and based on receiving the selection of the first indicator, displaying a representation of the first input on the display interface, wherein the representation of the first input includes an indication of the temperature sensor.

18. The non-transitory computer readable medium of claim 17, wherein the functions further comprise:

receiving a second selection of the second indicator; and based on receiving the second selection of the second indicator, displaying a second representation of the second input on the display interface, wherein the second representation of the second input includes a second indication of the thermal camera, and wherein the second representation of the second input is displayed simultaneously with the representation of the first input.

* * * * *